(12) United States Patent
Hymes

(10) Patent No.: US 8,014,763 B2
(45) Date of Patent: Sep. 6, 2011

(54) WIRELESS COMMUNICATIONS WITH PROXIMAL TARGETS IDENTIFIED VISUALLY, AURALLY, OR POSITIONALLY

(76) Inventor: Charles Martin Hymes, Eugene, OR (US)

( * ) Notice: Subject to any disclaimer, the term of this patent is extended or adjusted under 35 U.S.C. 154(b) by 1249 days.

(21) Appl. No.: 11/279,546

(22) Filed: Apr. 12, 2006

(65) Prior Publication Data

US 2006/0256959 A1    Nov. 16, 2006

Related U.S. Application Data

(63) Continuation-in-part of application No. 11/061,940, filed on Feb. 19, 2005.

(60) Provisional application No. 60/548,410, filed on Feb. 28, 2004, provisional application No. 60/603,716, filed on Aug. 23, 2004, provisional application No. 60/612,953, filed on Sep. 24, 2004, provisional application No. 60/654,345, filed on Feb. 19, 2005, provisional application No. 60/670,762, filed on Apr. 12, 2005.

(51) Int. Cl.
*H04M 3/42* (2006.01)
*H04M 3/493* (2006.01)
*H04W 24/00* (2009.01)

(52) U.S. Cl. .................................. 455/414.2; 455/456.3
(58) Field of Classification Search ................ 455/414.2
See application file for complete search history.

(56) References Cited

U.S. PATENT DOCUMENTS

| | | | |
|---|---|---|---|
| 2001/0046657 A1 | 11/2001 | Dorn | |
| 2004/0010608 A1 | 1/2004 | Piccionelli | |
| 2005/0054352 A1* | 3/2005 | Karaizman | 455/456.3 |
| 2005/0181803 A1* | 8/2005 | Weaver et al. | 455/456.1 |

* cited by examiner

*Primary Examiner* — Michael T Thier

(57) ABSTRACT

A method of exchanging data comprises specifying in a first electronic device a recipient via perceptual addressing, and sending information from the first electronic device indicating an intent to conditionally communicate with the recipient only upon an expression of interest from the recipient in communicating with a user of the first electronic device. In a further example, a conditional message is sent from the first electronic device to the specified recipient electronic device such that the conditional message is visible to a recipient device user only upon the expression of interest from the recipient in communicating with a user of the first electronic device.

30 Claims, 18 Drawing Sheets

WIRELESS COMMUNICATIONS WITH PROXIMAL TARGETS IDENTIFIED VISUALLY, AURALLY, OR POSITIONALLY

RELATED APPLICATIONS

This application claims priority to U.S. provisional patent application Ser. No. 60/670,762, filed on Apr. 12, 2005, entitled "WIRELESS COMMUNICATIONS WITH PROXIMAL TARGETS IDENTIFIED VISUALLY, AURALLY, OR POSITIONALLY".

This application is also continuation-in-part of U.S. patent application Ser. No. 11/061,940, filed on Feb. 19, 2005, entitled "WIRELESS COMMUNICATIONS WITH VISUALLY IDENTIFIED TARGETS"; which claims priority to U.S. provisional patent application Ser. No. 60/548,410, filed on Feb. 28, 2004, entitled "HANDHELD COMMUNICATIONS DEVICE FOR MAKING INITIAL CONTACT BASED ON VISUAL IDENTIFICATION"; and to U.S. provisional patent application Ser. No. 60/603,716, filed on Aug. 23, 2004, entitled "DEVICE AND SYSTEM FOR ELECTRONIC COMMUNICATIONS WITH VISUALLY IDENTIFIED TARGETS"; and to U.S. provisional patent application Ser. No. 60/612,953, filed on Sep. 24, 2004, entitled "DEVICE AND SYSTEM FOR WIRELESS COMMUNICATIONS WITH VISUALLY IDENTIFIED TARGETS"; and to U.S. provisional patent application Ser. No. 60/654,345, filed on Feb. 19, 2005, entitled "WIRELESS COMMUNICATIONS WITH VISUALLY IDENTIFIED TARGETS".

This application is also related to international patent application number PCT/US2005/006605, filed on Feb. 28, 2005, entitled "WIRELESS COMMUNICATIONS WITH VISUALLY IDENTIFIED TARGETS"; and to international patent application number PCT/US2006/013633, filed on Apr. 12, 2006, entitled "WIRELESS COMMUNICATIONS WITH PROXIMAL TARGETS IDENTIFIED VISUALLY, AURALLY, OR POSITIONALLY".

FIELD OF THE INVENTION

The present invention relates to telecommunications in general, and, more particularly, to mobile telecommunications.

BACKGROUND

All potentially compatible people can be separated into two categories based upon the criterion of whether or not one is aware of them. The first category consists of all the people that one is not aware of because one has not met them, seen them, or even heard of them. This is the group addressed by online dating services, newspaper personal ads, and match makers in that they alert the individual to the existence of specific other individuals who may be compatible. Newer technological developments that serve this same population are handheld devices such as the Japanese Lovegety and the Spotme device that alert the user to potentially compatible people in the user's immediate environment that would have otherwise gone unnoticed. Even more recently a cellular telephone company, AT&T Wireless, in conjunction with an online dating service, Match.com, has offered a profile matching service to cellular telephone users that are activated when users are in the same physical proximity. All of these services alert the user to potentially compatible partners that the user otherwise would not know about.

The second category of people consists of all the people that one does already know about because one has already met them, heard of them, or at least noticed them. This group includes friends, classmates, colleagues, acquaintances, and the largest group—strangers that one becomes aware of in the normal course of everyday activity in a grocery store, elevator, subway train, restaurant, etc. When it comes to having a relationship with someone among this group of people, one is aware of which individuals one is interested in and which individuals one is not interested in, the issue then is not who to date, but rather how to go about making that happen. Thus, among this group, there is little demand or need for services which offer to match people to each other. There is, however, a need to facilitate developing relationships with the people that one is already interested in.

Among this group of people that one has already noticed and has an interest in, the biggest hindrance to meeting for friendship or dating purposes is a reticence to acting on one's attraction by approaching the person of interest and expressing (directly or indirectly) one's feelings or intentions. There are three main obstacles that prevent people from approaching others that they are attracted to:

(1) If the person of interest is a stranger, it may be awkward to approach him or her because the social circumstance may not be appropriate, conducive, or convenient to physically approach the person. For example, the person of interest may be talking on the telephone, or talking to a group of friends.

(2) People are uncertain of whether or not the interest is mutual, and they are afraid of rejection. If the person of interest is already known, then the consequences of rejection can be quite significant.

(3) It may be awkward to approach a stranger simply because there is not a logical pretext to do so. In addition, conversation can be awkward until points of commonality are identified.

The first obstacle, awkwardness in approaching a stranger, could be largely overcome with simple text messaging. No matter what the social situation, a text message could be discreetly sent to the person of interest. But there is a problem: the contact information (telephone number or email address, for example) of the person of interest is not known.

The second obstacle, the risk of rejection and humiliation, could be overcome if there was a common third party known to both people to whom they could both safely and discreetly disclose their interest. Then, if the interest is mutual, the third party could tell them both about their mutual attraction. If, however, only the first person expresses interest in the second person, then the third party would say nothing to the second person, and the second person would never know that the first person was interested, and nothing would be risked or lost. Of course, it is highly improbable that a third party known to both people would be present when needed, especially if the two people are strangers.

As a substitute for a third person, it is possible to use a computer as the third party which mediates the interaction between people. There are at least a couple of services now that do this to some degree. A web site, SecretAdmirer.com offers a service whereby a person can have an anonymous email sent to a second person that simply tells that person that they have a secret admirer, and then prompts this second person to send an anonymous email to others. Then if the second person happens to send a "secret admirer email" to the first person, then both people will be notified of the other's interest. There also exists a similar service offered by a Swedish company, Blue Factory, called "Flirtylizer" that uses cellular telephones instead of the internet. However, both of these services have the same limitation: they require that the email address or telephone number of the target person be known. Thus, these services cannot be used with strangers.

The third obstacle, awkwardness in communicating with a stranger, can also be overcome with the help of a computerized third party. If users shared information about themselves with the third party, then the third party could reveal to both parties those commonalities to both parties. In this way, people could immediately talk about those people, places, or activities that they have in common. Having things in common with another person engenders trust and openness because "that person is like me". Online dating services also allow individuals to identify commonalities. But these services use the commonalities to match people to each other and then and alert them to each other's existence. These services therefore are of no help if one meets someone in the real world, outside the confines of cyberspace. There are also social networking web sites like Friendster or Orkut that allow users to identify other people, and networks of people, that users have in common. But again, these services are only valuable to identify other individuals online. For people who have already identified each other in the real world and are interested in meeting, these services are not helpful at all as tools for facilitating introductions and initiating conversation.

DETAILED DESCRIPTION

In the following detailed description of example embodiments of the invention, reference is made to the accompanying drawings which form a part hereof, and in which is shown by way of illustration specific sample embodiments in which the invention may be practiced. These example embodiments are described in sufficient detail to enable those skilled in the art to practice the invention, and it is to be understood that other embodiments may be utilized and that logical, mechanical, electrical, and other changes may be made without departing from the substance or scope of the present invention. The following detailed description is, therefore, not to be taken in a limiting sense, and the scope of the invention is defined only by the appended claims. More specifically, any description of the invention, including descriptions of specific order of steps, necessary or required components, critical steps, and other such descriptions do not limit the invention as a whole, but rather describe only certain specific embodiments among the various example embodiments of the invention presented herein. Further, terms may take on various definitions and meanings in different example embodiments of the invention. Any definition of a term used herein is inclusive, and does not limit the meaning that a term may take in other example embodiments or in the claims.

Section I

Figure 1:
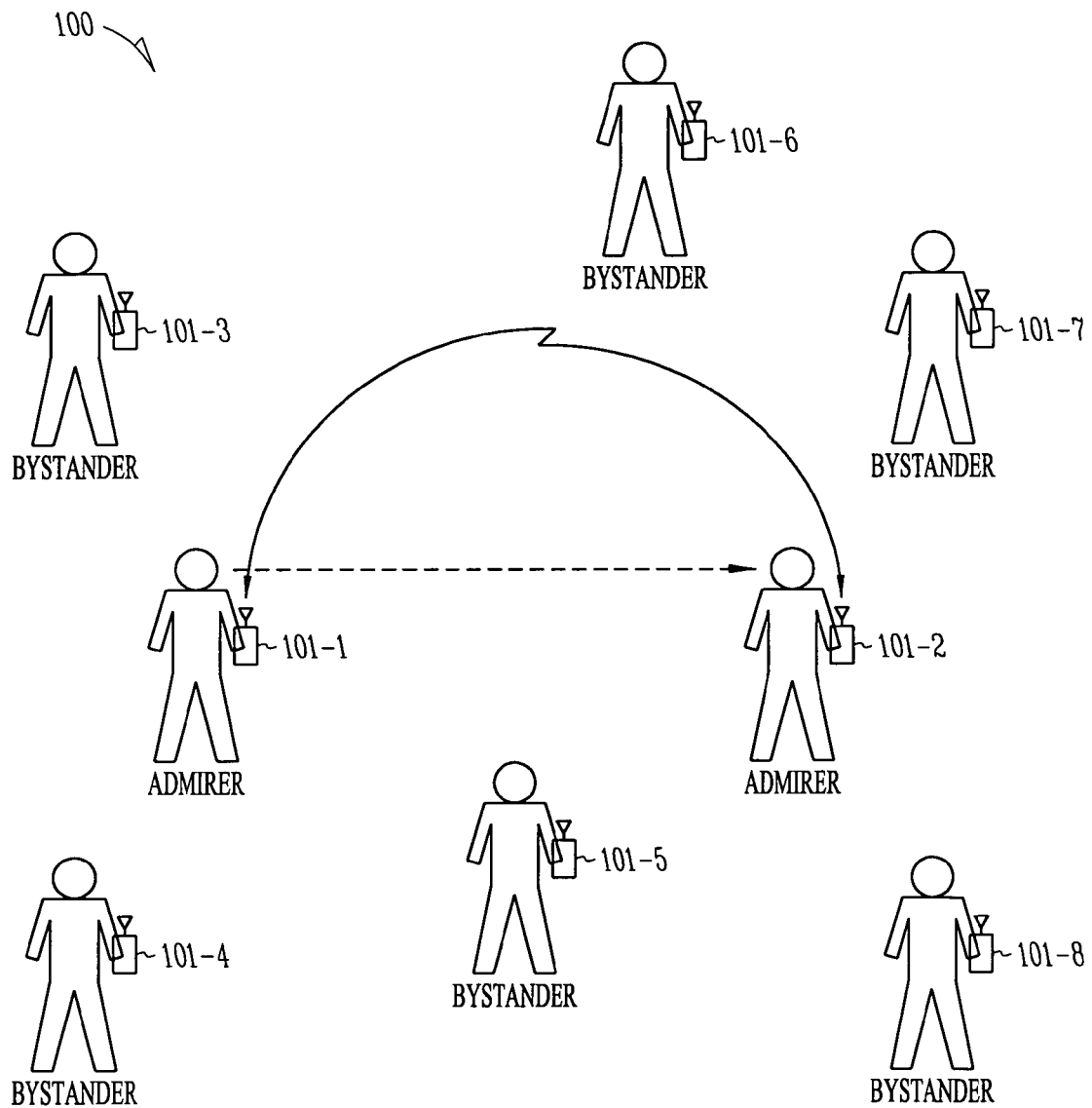
FIG. 1 depicts a diagram of an environment in which the first illustrative embodiment of the present invention operates.

FIG. 1 depicts a diagram of an environment in which the first illustrative embodiment of the present invention operates. Environment 100 is a gathering of eight people within line-of-sight proximity of each other. The fact that the people are within line of sight proximity of each other is a salient characteristic of the first illustrative embodiment because the embodiment facilitates the introduction of people who are in actual physical proximity to one another and can see each other.

One of the people in the gathering, the "First Person," sees another person, the "Second Person," and desires to anonymously initiate communications with him or her. The other people who are present at the gathering are merely bystanders.

In accordance with the first illustrative embodiment, each person carries a telecommunications terminal that facilitates the introduction of the First Person and the Second Person.

Figure 2:
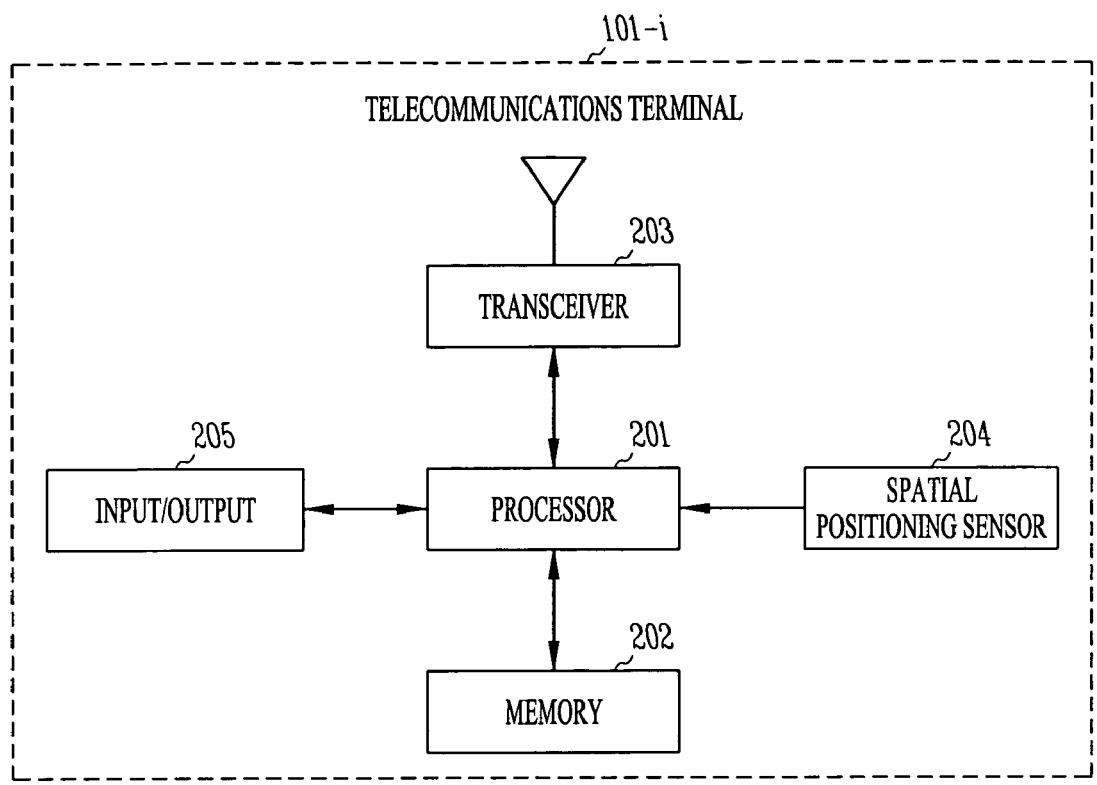
FIG. 2 depicts a block diagram of the salient components of wireless terminal 101$i$, for i=1 through 8.

FIG. 2 depicts a block diagram of the salient components of wireless terminal 101$i$, for i=1 through 8. In accordance with the first illustrative embodiment, wireless terminal 101$i$ is distinguishable and addressable by an address in the address space of the telecommunications system in which it functions. This is important because each user's terminal's address serves as an identifier for the user such that:

i. a message addressed to the address of a user's wireless terminal can be considered a message to the user, and
ii. a message from the address can be considered a message from the user.

Wireless terminal 101*i* comprises processor 201, memory 202, transceiver 203, spatial positioning sensor 204, and input/output 205.

Processor 201 is a general-purpose processor, in well-known fashion, that is capable of interacting with memory 202, transceiver 203, and spatial positioning sensor 204 in well-known fashion, and that is additionally capable of performing the functionality described below and with respect to FIGS. 3 through 5.

Memory 202 is a nonvolatile random-access memory, in well-known fashion that stores the operating system and application software for processor 201. In accordance with the first illustrative embodiment, memory 202 also stores an image (e.g., a picture, etc.) of the user associated with the terminal.

Transceiver 203 is a bidirectional radio transceiver, in well-known fashion, that enables wireless terminal 101*i* to communicate voice, text, and video with the other wireless terminals directly (e.g., through a Bluetooth network, etc.), through a base station (e.g., a Wi-Fi access point, etc.) (Not shown in FIG. 1), and with remote data processing systems that are accessible via a base station access point, etc.

Spatial positioning sensor 204 is a sensor (e.g., a Global Positioning System receiver, etc.), in well-known fashion, that is capable of ascertaining the spatial position (e.g., the latitude and longitude, etc.) of wireless terminal 101*i*.

Input/output 205 comprises a keypad, display, camera, and acoustic transducers, in well-known fashion, which enable a user to communicate via voice, text, and video.

It will be clear to those skilled in the art, after reading this disclosure, how to make and use alternative embodiments of the present invention in which one or both of the First Person's terminal and the Second Person's terminal are wireline terminals. Furthermore, it will be clear to those skilled in the art, after reading this disclosure, how to make and use alternative embodiments of the present invention that are part of a different system (e.g., a wireless local area network, the Internet, a Bluetooth network, etc.) and, therefore, are distinguishable and addressable by an address (e.g., an IPV6 address, a MAC address, etc.) in a different address space. And still furthermore, it will be clear to those skilled in the art how to make and use alternative embodiments of the present invention for purposes other than dating and romance (e.g., to facilitate business dealings, etc.).

In accordance with the first illustrative embodiment, the First Person's terminal communicates at the physical layer directly with the Second Person's terminal without the assistance of a base station or intermediary. Furthermore, in accordance with the first illustrative embodiment, the First Person's terminal communicates at the application layer directly with the Second Person's terminal without the assistance of a third-party data processing system. In contrast, the second illustrative embodiment of the present invention, which is described in detail below, operates in conjunction with a data processing system.

In accordance with the first illustrative embodiment, each person's terminal continually runs software that enables the person to be both:
i. an admirer (i.e., anonymously initiate contact with an admired person), and
ii. an admired person (i.e., receive an anonymous message from an admirer).

Figure 3:
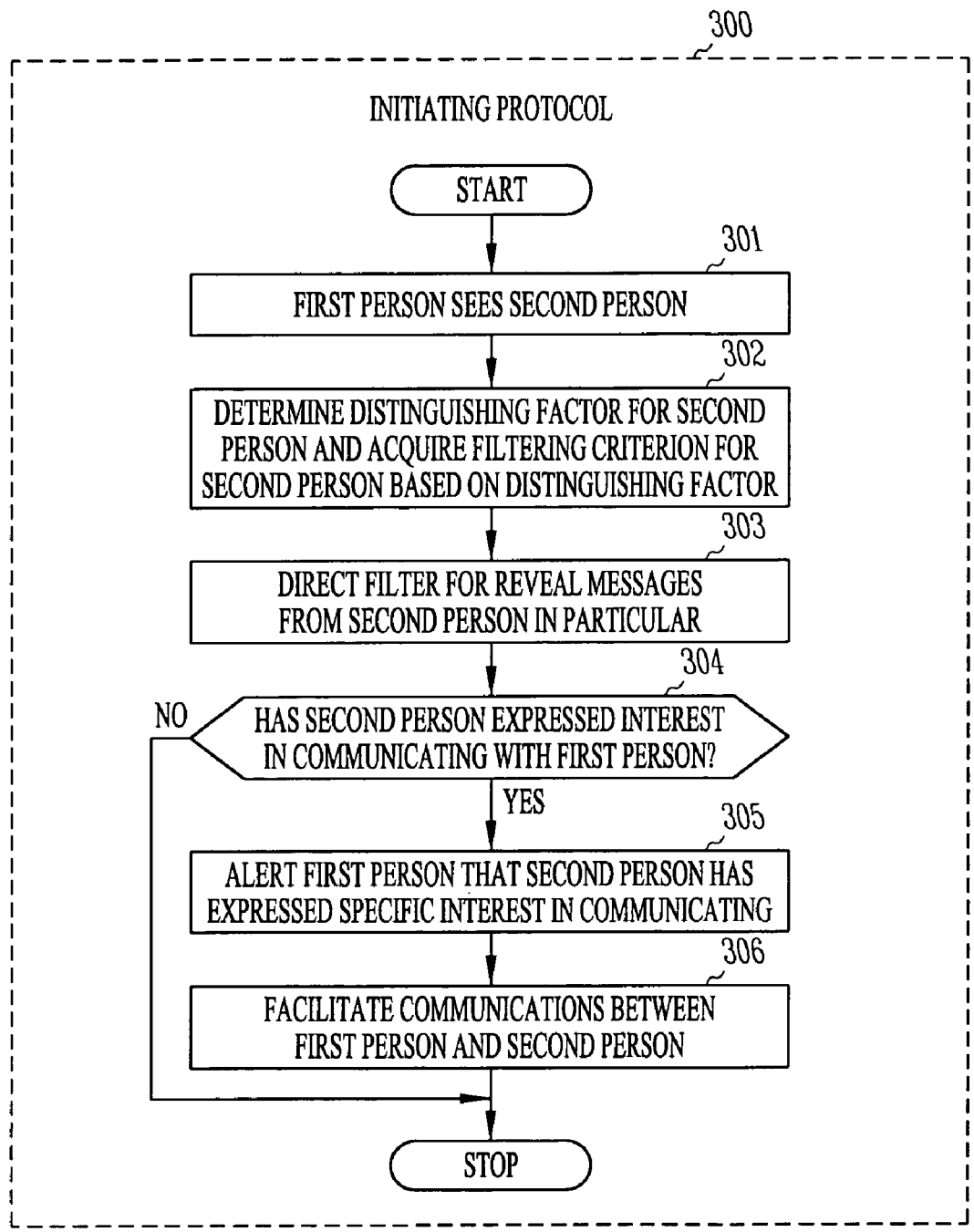
FIG. 3 depicts a flowchart of the salient tasks performed by a person's wireless terminal, in accordance with the first illustrative embodiment, to enable that person to be an admirer.
Figure 5:
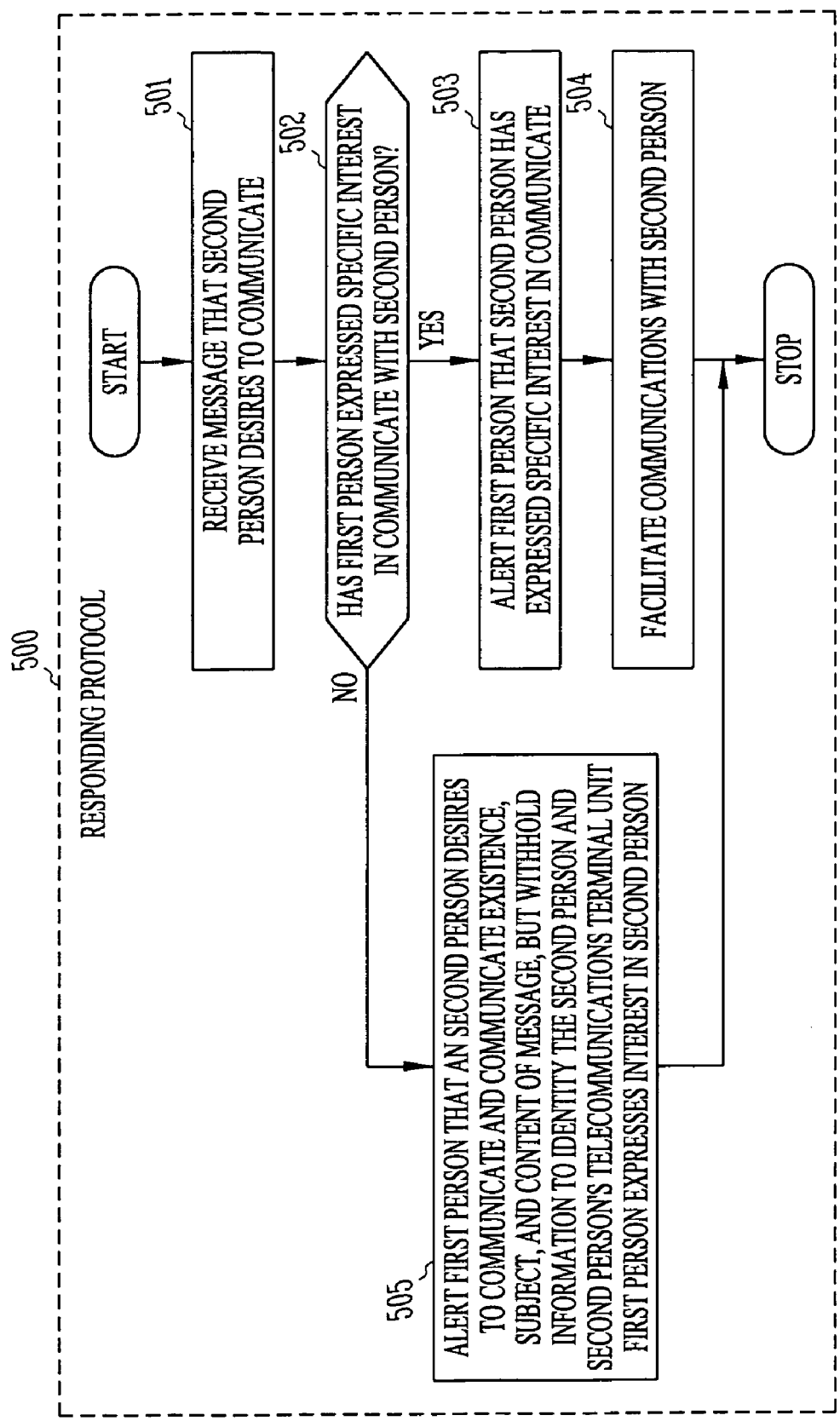
FIG. 5 depicts a flowchart of the salient tasks performed by a person's wireless terminal, in accordance with the first illustrative embodiment, to enable that person to be an admired person.

The functionality depicted in FIG. 3 enables a person, via his or her terminal, to be an admirer, and the functionality depicted in FIG. 5 enables a person, via his or her terminal, to be an admired person.

With respect to task 301 in FIG. 3, the First Person sees the Second Person.

At task 302, the First Person's terminal (i) acquires one or more distinguishing factors for the Second Person, and (ii) determines a filtering criterion based on the distinguishing factors.

For the purposes of this disclosure, a "distinguishing factor" is defined as information that distinguishes the Second Person from at least one other person. For example, the distinguishing factor includes, but is not limited to:
i. an indication of a physical trait of the Second Person (e.g., an image, a voiceprint, an iris scan, the person's genome, a fingerprint, a physical description, etc.), or
ii. an indication of the spatial position of the Second Person (e.g., the latitude and longitude of the Second Person, etc.), or
iii. an indication of the identity of the Second Person (e.g., a name, a social security number, a street address, etc.), or
iv. an address of the Second Person in the address space of a telecommunications network (e.g., a telephone number, a computer screen name, an email address, etc.), or
v. any combination of i, ii, iii, and iv.

For the purpose of this disclosure, a "filtering criterion" is defined as information that distinguishes a telecommunications message from the Second Person from a telecommunications message from at least one other person. For example, the filtering criterion includes, but is not limited to:
i. an address in the address space of a telecommunications network, or
ii. an indication of the identity of a person, and
iii. a combination of i and ii.

In accordance with the first illustrative embodiment, the distinguishing factor is an image of the user's face (i.e., a portrait of the user), and the filtering criterion is the telephone number of the terminal.

Figure 4:
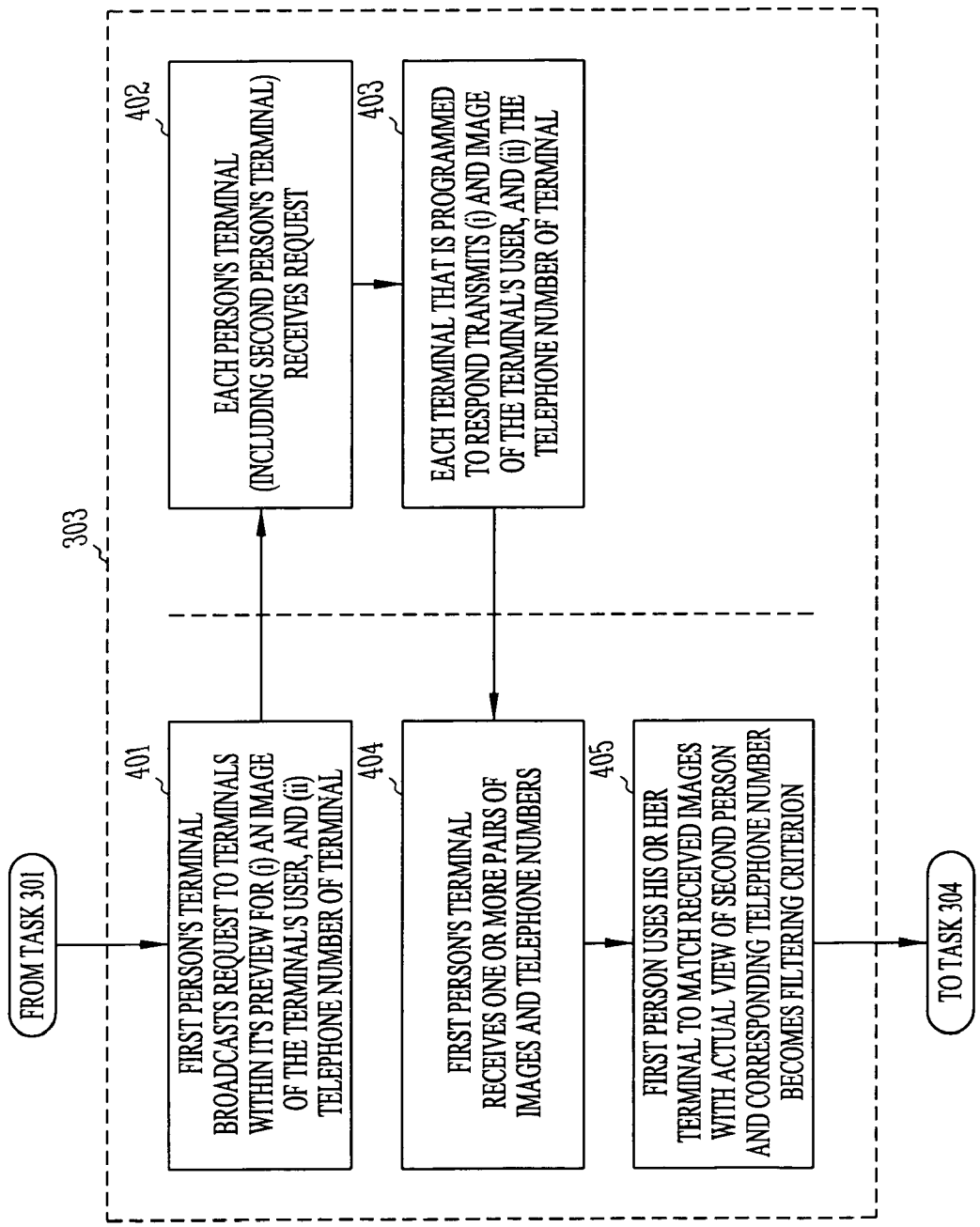
FIG. 4 depicts a flowchart of the salient tasks associated with task 302 in FIG. 3.

FIG. 4 depicts a flowchart of the salient subtasks associated with the performance of task 302 in accordance with the first illustrative embodiment At task 401, the First Person's terminal broadcasts a request to all of the other terminals for (i) one or more distinguishing factors, and (ii) one or more filtering criterion for that user. In accordance with the first illustrative embodiment, the First Person's terminal requests an image of the terminal's user as the distinguishing factor and the telephone number of the terminal as the filtering criterion.

At task 402, all of the other terminals within the purview of the First Person's terminal, including the Second Person's terminal, receive the request transmitted in task 401.

At task 403, all of the terminals that are programmed to respond to the request, including the Second Person's terminal, do so.

At task 404, the First Person's terminal receives a distinguishing factor filtering criterion pair from each of the responding terminals.

At task 405, the First Person compares the images he or she has received with his or her actual view of the Second Person and indicates to his or her terminal which of the images corresponds to the Second Person. The terminal then selects the telephone number that was received with that image as the filtering criterion for use in tasks 303 through 306.

Because the First Person's terminal was given the image address pairs, the task of determining the filtering criterion based on the distinguishing characteristic is simple. But as alluded to previously and as described below and in conjunction with the second illustrative embodiment, the task of determining the filtering criterion based on the distinguishing characteristic can be more complex. For example, it will be clear to those skilled in the art however, after reading this disclosure, how to make and use alternative embodiments of the present invention in which the First Person's terminal generates the distinguishing factor itself (e.g., with a camera to take the Second Person's picture, etc.) or acquires it from another entity (e.g., a remote data processing system, etc.). One example of this is described below and in conjunction with the second illustrative embodiment.

As part of task 302, the First Person compares, with his or her terminal, the images in the responses to the physical traits of the Second Person. When the First Person has determined which of the images corresponds to the Second Person, the First Person indicates that determination to the terminal. In accordance with the first illustrative embodiment the First Person's terminal is simply given the filtering criterion by the Second Person's terminal, and the association between the filtering criterion and the distinguishing factor. It will be clear to those skilled in the art however, after reading this disclosure, how to make and use alternative embodiments of the present invention in which the First Person's terminal uses the distinguishing factor to determine (e.g., through a pattern matching process, through a lookup process, etc.) the filtering criterion. This can, for example, involve the use of local or remote databases and can also, for example, involve the cooperation of remote data processing systems. One example of this is described below and in conjunction with the second illustrative embodiment.

At task 303, the First Person indicates to his or her terminal his or her interest in communicating with the Second Person and does this by directing the terminal to reveal to him or her the existence and complete content of any messages that have been sent, or might be sent, from the Second Person (as identified by his or her filtering criterion). In accordance with the first illustrative embodiment, the First Person expresses either:

(1) an active interest to communicate with the Second Person, or
(2) a passive interest to communicate with the Second Person.

When the First Person expresses an active interest in communicating with the Second Person, the First Person's terminal sends a message to the Second Person using the filtering criterion determined in task 302. The message comprises:
  i. an indication of the identity of the First Person (e.g., the identity of the First Person, an image of the First Person, etc.), and
  ii. the First Person's filtering criterion (e.g., Bluetooth network address, etc.),
  iii. a subject (e.g., "Message From An Admirer," etc.), and
  iv. content (e.g., "Can I buy you a drink?" etc.).

When, in contrast, the First Person expresses a passive interest to communicate with the Second Person, the First Person does not send a message to the Second Person but informs his or her terminal that he or she is willing to communicate with the Second Person if it receives a message from the Second Person.

As described below and with respect to FIG. 5, the advantage of active interest is that it alerts the Second Person that he or she has a suitor, and, therefore, might prompt the Second Person to express an interest (either active or passive) to communicate with the First Person when he or she might otherwise not. The disadvantage of active interest is that the pain of rejection is increased if the Second Person does not express an interest to communicate.

In contrast, the advantage of passive interest is that it lessens the pain of rejection if the Second Person does not express an interest to communicate. The disadvantage with passive interest is that if both the First Person and the Second Person indicate passive interest with respect to each other, a deadlock arises and nothing materializes even though both persons are interested in each other.

In either case, as part of task 303, the telephone number of the Second Person is stored in a List of Admired Persons that is permanently stored in the First Person's terminal. An example of such a list is depicted in Table 1. As described below and with respect to FIG. 5, this list is used by the terminal when messages arrive for the First Person to enable the terminal to discern which messages are from acceptable Second Persons and which are not.

TABLE 1

| List of Admired Persons |
| --- |
| Telephone Number (filtering criterion) |
| 201-555-2343 |
| 323-443-5523 |
| 345-646-3342 |
| 532-343-6681 |

At task 304, the First Person's terminal determines if the Second Person has previously expressed an interest in communicating with the First Person. This is necessary because the First Person's terminal might have previously received a message from the Second Person and which message was partially or wholly hidden from the First Person This situation is likely because the First Person might be performing this series of tasks in response to the receipt of a message from the Second Person. In either case, the Second Person's telephone number is searched for in a List of Admirers (i.e., those people who have sent the First Person a message that was partially or wholly hidden from the First Person) that is permanently stored in the First Person's terminal. An example of such a list is depicted in Table 2:

TABLE 2

| List of Admirers |
| --- |
| Telephone Number |
| 574-587-2541 |
| 965-852-3854 |
| 532-343-6681 |
| 201-587-6936 |
| 568-985-9699 |
| 542-875-8785 |

How and when Table 2 is populated is described below and with respect to FIG. 5. When the Second Person's telephone number is within the List of Admirers, control passes to task 306; otherwise control stops.

At task 305, the First Person's terminal alerts the First Person to the fact that the Second Person has previously sent the First Person a message, and, therefore, has previously expressed an interest to communicate. As part of task 305, the First Person's terminal reveals to the First Person the entire message that was received from the Second Person.

At task 306, the First Person's terminal initiates a voice call with the Second Person's terminal so that the First Person and the Second Person can freely communicate. It will be clear to those skilled in the art, after reading this disclosure, how to make and use alternative embodiments of the present invention in which the communication in task 306 is through text, voice, or video.

FIG. 5 depicts a flowchart of the salient tasks associated with the First Person and his or her terminal when the First Person receives a message of admiration transmitted from a Second Person.

At task 501, the First Person's terminal receives a message transmitted from a Second Person. The message comprises:
  i. an indication of the identity of the Second Person,
  ii. the Second Person's terminal's telephone number,
  iii. a subject, and
  iv. content.

At task 502, the First Person's terminal determines if the First Person has ever expressed an interest (either active or passive) in communicating with the Second Person. Task 502 is accomplished by searching for the Second Person's telephone number in the First Person's List of Admired Persons. If the Second Person's telephone number is in the List of Admired Persons, then control passes to task 503; otherwise control passes to task 505.

At task 503, the First Person's terminal alerts the First Person to the arrival of the message and provides the user with the message.

At task 504, the First Person's terminal initiates a text messaging session with the Second Person's terminal so that the First Person and the Second Person can freely communicate. It will be clear to those skilled in the art, after reading this disclosure, how to make and use alternative embodiments of the present invention in which the communication in task 504 is through voice or video.

At task 505, the First Person's terminal alerts the First Person to the arrival of the message, and provides the First Person with:
  i. the subject of the message, but withholds:
  ii. information that identifies the Second Person, and
  iii. the Second Person's terminal's telephone number, and
  iv. the content of the message.

Upon the receipt of the message from the Second Person, the First Person might be prompted to look around and consider sending a message to someone he or she admires. If that happens to be the Second Person, then a match is made. If not, another person might be prompted to look around and consider sending a message to someone he or she admires. In some alternative embodiments of the present invention, all of the message and also its existence are withheld from the admired person until the admired person expresses an interest in communicating with the admirer.

As part of task 505, the First Person's terminal adds the Second Person's terminal's telephone number to its List of Admirers, as depicted in Table 2. After task 505, control stops.

The first illustrative embodiment illustrates just one way in which the various telecommunications terminals can operate independently and without the assistance of a remote data processing system. Although there are advantages to this, there are disadvantages as well, and, therefore, the second illustrative embodiment illustrates one way in which the various telecommunications terminals can operate in conjunction with a data processing system.

Figure 6:
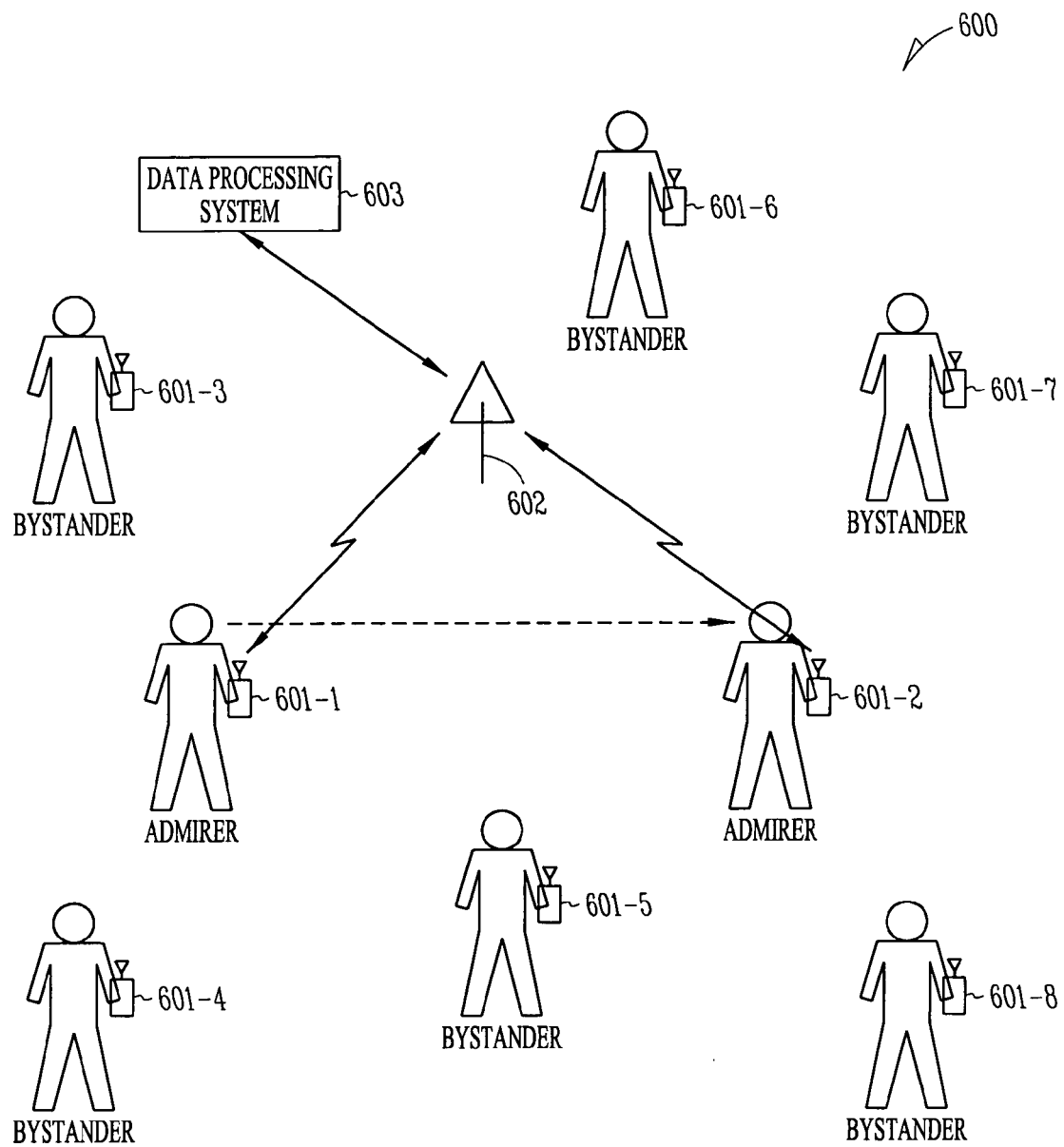
FIG. 6 depicts a diagram of an environment in which the second illustrative embodiment of the present invention operates.

FIG. 6 depicts a diagram of an environment in which the second illustrative embodiment of the present invention operates. Environment 600, like environment 100 in FIG. 1, is a gathering of eight people within line-of-sight proximity of each other. The fact that the people are within line-of-sight proximity of each other is a salient characteristic of the second illustrative embodiment because it, like the first illustrative embodiment, facilitates the introduction of people who are in actual physical proximity to one another and can see each other.

One of the people in the gathering, the "First Person," sees another person, the "Second Person," and desires to anonymously initiate communications with him or her. The other people who are present at the gathering are merely bystanders.

In accordance with the second illustrative embodiment, each person carries a telecommunications terminal that facilitates the introduction of the First Person and the Second Person.

Figure 7:
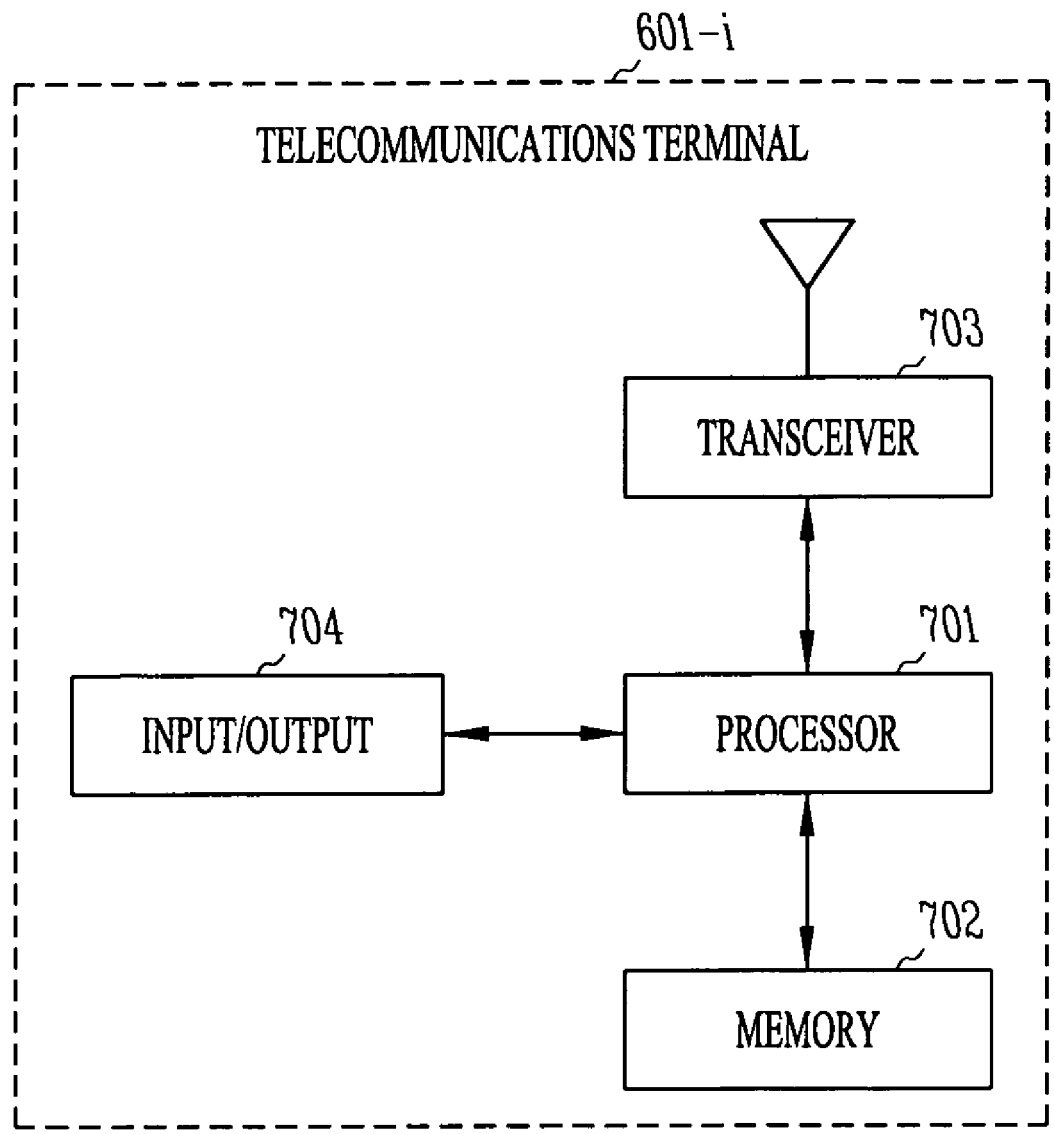
FIG. 7 depicts a block diagram of the salient components of wireless terminal 601$i$, for i=1 through 8.

FIG. 7 depicts a block diagram of the salient components of wireless terminal 601$i$, for i=1 through 8. In accordance with the second illustrative embodiment, wireless terminal 601$i$ is distinguishable and addressable by an address in the address space of the telecommunications system in which it functions. This is important because each user's terminal's address serves as an identifier for the user such that:
  i. a message addressed to the address of a user's wireless terminal can be considered a message to the user, and
  ii. a message from the address can be considered a message from the user.

Wireless terminal 601$i$ comprises processor 701, memory 702, transceiver 703, and input/output 705.

Processor 701 is a general-purpose processor, in well-known fashion, that is capable of interacting with memory 702, transceiver 703, and input/output 704 in well known fashion, and that is additionally capable of performing the functionality described below and with respect to FIGS. 8 and 9.

Memory 702 is a nonvolatile random-access memory, in well-known fashion that stores the operating system and application software for processor 701. In accordance with the first illustrative embodiment, memory 702 also stores an image (e.g., a picture, etc.) of the user associated with the terminal.

Transceiver 703 is a bidirectional radio transceiver, in well-known fashion, that enables wireless terminal 101$i$ to communicate voice, text, and video with the other wireless terminals directly (e.g., through a Bluetooth network, etc.), through a base station (e.g., a Wi-Fi access point, etc.) (not shown in FIG. 1), and with remote data processing systems that are accessible via a base station access point, etc. Input/output 704 comprises a keypad, display, camera, and acoustic transducers, in well-known fashion, which enable a user to communicate via voice, text, and video.

It will be clear to those skilled in the art, after reading this disclosure, how to make and use alternative embodiments of the present invention in which one or both of the First Person's terminal and the Second Person's terminal are wireline terminals. Furthermore, it will be clear to those skilled in the art, after reading this disclosure, how to make and use alternative embodiments of the present invention that are part of a different system (e.g., a wireless local area network, the Internet, a Bluetooth network, etc.) and, therefore, are distinguishable and addressable by an address (e.g., an IPV6 address, a MAC address, etc.) in a different address space. And still furthermore, it will be clear to those skilled in the art how to make and use alternative embodiments of the present invention for purposes other than dating and romance (e.g., to facilitate business dealings, etc.).

In accordance with the second illustrative embodiment, the First Person's terminal communicates at the physical layer with base station 602. Furthermore, in accordance with the second illustrative embodiment, the First Person's terminal communicates at the application layer with data processing system 603.

In accordance with the second illustrative embodiment, data processing system 603 continually runs software that enables each person to be both:
i. an admirer, and
ii. an admired person.

Figure 8:
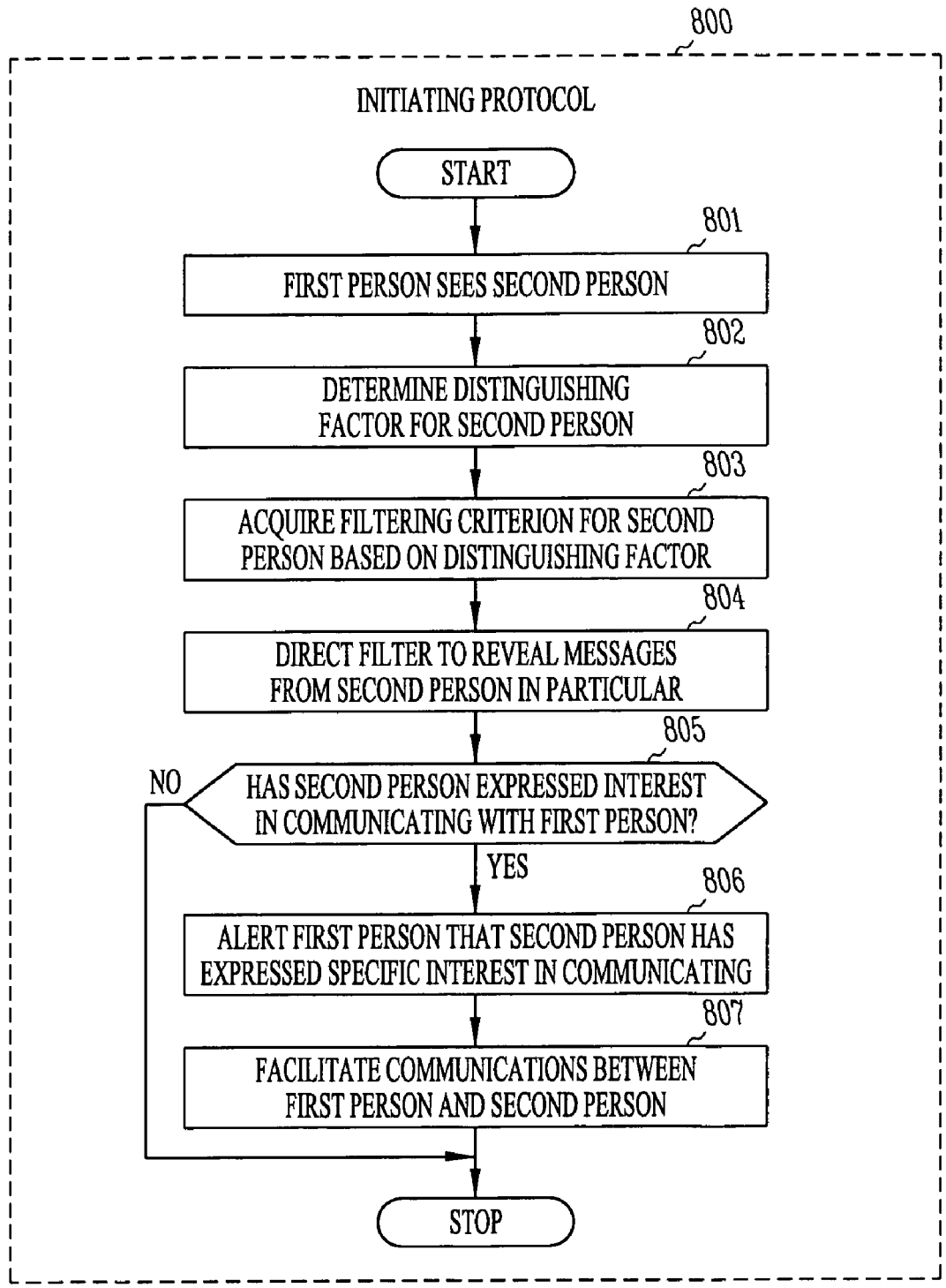
FIG. 8 depicts a flowchart of the salient tasks performed by a data processing system, in accordance with the second illustrative embodiment, to enable a person to be an admirer.
Figure 9:
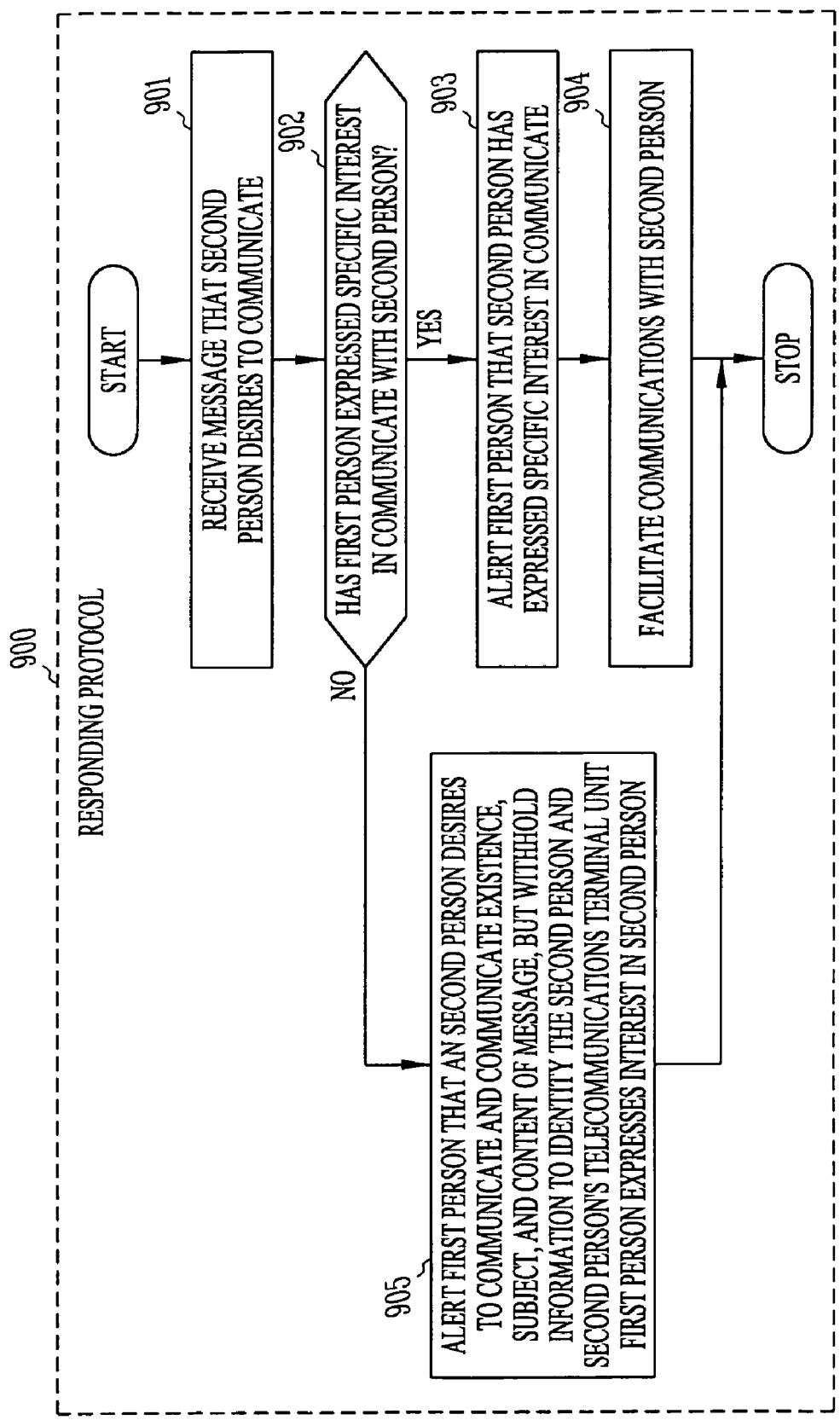
FIG. 9 depicts a flowchart of the salient tasks performed by a data processing system, in accordance with the second illustrative embodiment, to enable a person to be an admired person.

The functionality depicted in FIG. 8 enables a person, via his or her terminal, to be an admirer, and the functionality depicted in FIG. 9 enables a person, via his or her terminal, to be an admired person.

With respect to task 801 in FIG. 8, the First Person sees the Second Person.

At task 802, the First Person acquires one or more distinguishing factors for the Second Person by capturing an image (e.g., taking a picture, etc.) of the Second Person with his or her terminal.

At task 803, the First Person transmits the image to data processing system 603, which contains a database of image/username pairs. As part of task 803, data processing system 603 uses facial recognition software to match the received image to one of the images in its database, and, therefore determines the filtering criterion (e.g., username) for the Second Person. Data processing system 603 then notifies the First Person that it has successfully identified the Second Person.

At task 804, the First Person indicates to data processing system 603, via his or her terminal, his or her interest in communicating with the Second Person and does this by directing data processing system 603 to reveal to him or her the existence and complete content of any messages that have been sent, or might be sent, from the Second Person (as identified by his or her filtering criterion). In accordance with the second illustrative embodiment, the First Person expresses either:

(1) an active interest to communicate with the Second Person, or
(2) a passive interest to communicate with the Second Person.

When the First Person expresses an active interest in communicating with the Second Person, the First Person's terminal sends a message to the Second Person through data processing system 603 using the filtering criterion determined in task 802. The message comprises:
i. an indication of the identity of the First Person (e.g., the identity of the First Person, an image of the First Person, etc.), and
ii. the First Person's filtering criterion (e.g., Bluetooth network address, etc.),
iii. a subject (e.g., "Message From An Admirer," etc.), and
iv. content (e.g., "Can I buy you a drink?" etc.).

In either case, as part of task 803, the username of the Second Person is stored in a List of Admired Persons that is permanently stored in data processing system 603. An example of such a list is depicted in Table 3.

TABLE 3

| List of Admired Persons |
| --- |
| UserName (filtering criterion) |
| Emilee9 |
| Stormyrain |

TABLE 3-continued

| List of Admired Persons |
| --- |
| UserName (filtering criterion) |
| Supergirl175 |
| Shannas |

At task 805, data processing system 603 determines if the Second Person has previously expressed an interest in communicating with the First Person. This is necessary because the First Person's terminal might have previously received a message from the Second Person, which message was partially or wholly hidden from the First Person by data processing system 603. This situation is likely because the First Person might be performing this series of tasks in response to the receipt of a message from the Second Person. In either case, the Second Person's username is searched for in a List of Admirers (i.e., those people who have sent the First Person a message that was partially or wholly hidden from the First Person) that is permanently stored in the data processing system. An example of such a list is depicted in Table 4.

TABLE 4

| List of Admirers |
| --- |
| UserName |
| Almondpetal |
| Beany7 |
| WTX312 |
| Anitamina |
| Fatoumata |

How and when Table 4 is populated is described below and with respect to FIG. 9. When the Second Person's username is within the List of Admirers, control passes to task 806; otherwise control stops.

At task 806, data processing system 603 directs the First Person's terminal to alert the First Person to the fact that the Second Person has previously sent the First Person a message, and, therefore, has previously expressed an interest to communicate. As part of task 806, data processing system 603 transmits to the First Person's terminal the entire message that was received from the Second Person.

At task 807, data processing system 603 initiates a text messaging session between the First Person's terminal and the Second Person's terminal so that the First Person and the Second Person can freely communicate. It will be clear to those skilled in the art, after reading this disclosure, how to make and use alternative embodiments of the present invention in which the communication in task 806 is through text, voice, or video.

FIG. 9 depicts a flowchart of the salient tasks performed by data processing system when a message is sent from a Second Person to a First Person.

At task 901, data processing system 603 terminal receives a message transmitted from a Second Person to a First Person, wherein both persons are identified by their respective usernames. The message comprises:
i. an indication of the identity of the Second Person,
ii. the Second Person's username,
iii. a subject, and
iv. content.

At task 902, data processing system 603 determines if the First Person has ever expressed an interest (either active or passive) in communicating with the Second Person. Task 902 is accomplished by searching for the Second Person's username in the First Person's List of Admired Persons. If the Second Person's username is in the First Person's List of Admired Persons, then control passes to task 903; otherwise control passes to task 905.

At task 903, data processing system 603 transmits a message to the First terminal to alert the First Person to the arrival of the message and provides the user with the message.

At task 904, data processing system 603 initiates a text messaging session between the Second Person's terminal and the First Person's terminal so that the Second Person and the First Person can freely communicate. It will be clear to those skilled in the art, after reading this disclosure, how to make and use alternative embodiments of the present invention in which the communication in task 904 is through text, voice, or video.

At task 905, data processing system 603 transmits to the First'Person's terminal to alert the First Person to the arrival of the message and provides the First Person with:
i. the subject of the message.
Data processing system 603 withholds from the First Person's terminal:
i. information that identifies the Second Person, and
ii. the Second Person's terminal's username, and
iii. the content of the message.

Upon the receipt of the message from the Second Person, the First Person might be prompted to look around and consider sending a message to someone he or she admires. If that happens to be the Second Person, then a match is made. If not, another person might be prompted to look around and consider sending a message to someone he or she admires. As part of task 905, data processing system 603 adds the Second Person's terminal's username to its List of Admirers, as depicted in Table 4. After task 905, control stops. In some alternative embodiments of the present invention, all of the message and also its existence are withheld from the admired person until the admired person expresses an interest in communicating with the admirer.

It will be clear to those skilled in the art, after reading this disclosure, how to make and use alternative embodiments of the present invention in which the First Person's terminal withholds some or all of the subject or content of the message transmitted from the First Person.

It is to be understood that the illustrative embodiment of the present invention is merely one embodiment of the invention and that many variations of the illustrative embodiment can be made and used without departing from the scope of the invention. For this reason, these variations are to be included within the scope of the following claims and their equivalents.

Section V

Section Overview

Embodiments of the invention include methods of establishing and facilitating electronic communications between people that are in physical proximity to each other. Embodiments can include a small mobile device, either its own dedicated device, or as enhanced functionality to other mobile devices such as, for example, PDA's (personal digital assistants) or cellular telephones. The device can include a small digital camera which can record both single still images as well as video images, the means to enter text and record audio, the ability to transfer information (text, audio, image, or video) from a computer to the device as an alternative to entering information directly into the device, the ability to display text or images and playback audio or video, a programmable microprocessor, and memory storage and retrieval functions all commonly available features on today's cellular telephones and PDA's. In addition, the device may have additional hardware capabilities.

Embodiments of the invention can facilitate communication between people that are in physical proximity to each other. Some embodiments do this by providing a user with the following capabilities: (1) the ability to communicate electronically (text, voice, image, or video) to specific other individuals (or vehicles automobiles, motorcycles, etc.) in his or her environment that have been identified visually, but for whom contact information (telephone number, email address, etc.) may not be known, (2) the capability of discreetly communicating interest in other people without risk of rejection, while at the same time protecting recipients from unwelcome communications, and (3) the ability to mutually reveal commonalities that the user shares with particular other users. Embodiments can facilitate romantic relationships, although other social, business, civic or military applications can be foreseen.

Some embodiments of the invention include the following functions.

Function #1: Perceptual Addressing

Perceptual Addressing is the ability for one person, User #1, to establish a communications channel with another person, User #2, that User #1 can see in his or her environment but for whom no contact information is known. These communications can be in the form of messages sent from one person to another or can be in the form of live interactive two-way audio and/or video communications; and the content of these communications can consist of any form of digital media including text, images, video, and voice. Devices in the same vicinity can communicate with each other via direct device-to-device transmission, or alternatively, devices can communicate via a wireless connection to a network, the interne, cellular telephone network, or some other network.

Function #2: Discreet Messaging

"Discreet Messaging", is specialized form of messaging which uses an automated system as a "trusted third party" (either a system of two handheld devices those of the two individuals communicating, or a third-party server with which each handheld devices communicates) which will arbitrate the disclosure or nondisclosure of various portions of the content of messages, or even the disclosure or nondisclosure of the fact that a message was sent, according to agreed upon rules of the specific application of Discreet Messaging. Moreover, particular aspects of the content received by both users can be variable. In other words, User #1 could send a DM to User #2 and the content of the message actually received and viewed by User #2 could change depending upon the content of the DM sent from User #2 to User #1 and vice versa. As an example of particular implementation of Discreet Messaging applied to the field of dating, a more specific three-part description is offered:

Part (a) Discreet Messaging is the ability for User #1 to send a message indicating interest to User #2 and be assured that User #2 will never know that a message was sent, unless (i) User #2 independently sends a message indicating interest to User #1, and (ii) that User #2 meets minimal compatibility requirements specified by User #1, and (iii) User #1 meets minimal compatibility requirements specified by User #2. Restated another way: for either user to be aware of and view a Discreet Message (DM) from the other user, both users must send DM's to each other, and both users must meet minimal compatibility requirements specified by the other user.

Part (b) In the case that Part (a) above is satisfied and both users are able to view DM's sent by the other, Discreet Messaging provides for the optional disclosure of personal information to the other user only in the case that both users share that information in common. Examples of commonalities that may be disclosed are people that both users know and the specific social connections that link them together, places both users have lived or visited common religion, common languages spoken, common political or philosophical viewpoints, etc.

Part (c) In the case that Part (a) above is satisfied, the content of particular aspects of a message expressed to each user can depend upon the content expressed by both users. For example, if User #1 expressed her interest in User #2 as "interested", and User #2 expressed his interest in User #1 as "love at first sight", then the level of interest that would be actually communicated and received by both users is the lower of the two levels—"interested". In this way neither user is aware of an imbalance of interest. (Proper implementation of what contingencies are allowed in any particular application can solve any circularity problems.)

Example #1 of Perceptual Addressing

Bob is riding a city bus on his way to a dentist appointment. At the next stop he notices an attractive woman, Sarah, get on the bus and make eye contact with him before taking a seat a few rows in front of him. He knows he will never see her again unless he acts immediately. So using his handheld device, he sends to her a brief message which includes his contact information his telephone number, email address, and device network address. He immediately receives a confirmation message saying "message delivered". He hopes she will respond to his message.

Example #2 of Perceptual Addressing

John is driving from Seattle to San Francisco. It is getting late, and he needs to find a hotel for the night. He is driving behind a large semi and thinks that perhaps the driver can recommend a place to stay nearby. He takes out his mobile device and presses a button. He sees two license plate numbers displayed. He selects the one that corresponds to the truck in front of him. He then holds his device to his ear. Just then, Pete, in the pickup truck in front of John, picks up his mobile device and sees on its display, "call from license plate # AYK334". Pete then presses a button and says "how's it going?" They proceed to have a brief cellular telephone conversation in which John asks about hotels in the area and Pete makes a couple of recommendations.

Example of Discreet Messaging

A girl sitting in a cafe sees a guy walk in that she is attracted to and would like to meet. Using her handheld device, she sends him a DM that she is interested. Her device indicates that a message was successfully sent but not viewed. He is not aware that a message was sent to him because his device gives no indication that a message was received. She is glad that he is not aware of the message she sent because she would not want him to know that she liked him unless she was sure that he also liked her. In fact, she would not have sent the message at all unless she had that assurance. A few minutes later, her device alerts her that she has just received a DM, and that the DM that she sent to him was made viewable. She looks at her device and it indicates the date and time that she received his DM to her, as well as the date and time that she sent her DM to him. Also displayed is a small image of the guy who sent her the DM (so she can identify and/or remember him) as well as his first name, a message saying "contact: in person, telephone, email", and his cellular telephone number and email address. In addition, her device also displays things she has in common with him (they both have an ancestor from Italy and they both loved the movie "The Matrix"), and how they are connected socially (her friend Beth Johnson knows Peter Griffin who knows his friend David Gross). Meanwhile, because she has already sent a DM to him, the moment he sends a DM to her, the DM that she sent to him is displayed on his device. The display on his device includes her image, a fictitious first name that she uses to protect her identity, a message saying "contact: in person, email", an anonymous email address which she uses only for dating purposes, and the same commonality information which appeared on her device. He is normally shy, but thrilled that she is also interested in him, he approaches her and introduces himself. They immediately begin talking about their connection through Peter Griffin.

Features and Description

I. Unique Identification

Whenever one device makes a transmission to another device, regardless of whether that transmission is a broadcast to all nearby devices or a transmission addressed to one particular device, that transmission includes the unique address information of the sending device: a unique identification number (device ID#) and a network address (for example, telephone number, IP address, email address). It should be noted that, for security reasons, the device ID# and network addresses of other devices should be available only to the software system of each device and inaccessible to the user.

II. Transmission Methods

Embodiments of this invention are compatible with a wide variety of methods of transmitting information and, depending upon the method of Perceptual Addressing used, may include more than one mode of transmission. The modes of wireless transmission could include various technologies, frequencies and protocols for example, radio frequency (RF), infrared (IR), Ultra Wide Band (UWB), Wi-Fi (802.11) or any other suitable wireless technology in current use or yet to be invented. In addition to wireless means of transmission, non-wireless means may also be used.

The means of transmission between devices is transparent to users and may be either direct (device to device) or indirect via a wireless connection to a network such as the internet, cable networks, satellite networks, telephone networks, cellular telephone networks; or some combination. There may also be third-party devices mediating the communications between the users' devices. Transmissions between devices may be encrypted to prevent other devices, which are not sharing the same application, from having access to content that is intended to exist only temporarily and may be confidential.

Embodiments of this invention are agnostic with regard to the type of communication which is established between devices. For example, the communication can consist of sending and receiving individual messages and media files, or alternatively the communication can consist of a live streaming of audio and video in both directions simultaneously as in a telephone conversation or video conference.

III. Perceptual Addressing

If a user detects someone to whom they want to communicate electronically, there must be a way to target the intended receiver. The difficulty is that the user will not usually have an address for the intended recipient—no device ID#, no telephone number, no email address, etc. Typically, the only information the user has is the target individual's approximate location relative to the user and the target's visual appearance.

Once the correct device ID# and/or network address of the intended recipient have been obtained, the Perceptual Addressing task has been completed. There are no restrictions on the varieties of subsequent communication between devices.

Image Confirmation

Because visual appearance and relative spatial location are the primary ways (less common ways are distinctive voice quality and distinctive smell) in which a user specifies the target person (if that person is a stranger), image confirmation often plays an important role in the Perceptual Addressing process. The user initiating contact needs to verify that the individual that he or she intended to contact was indeed the individual that was actually contacted. For this reason, it is helpful for users to have a digital image stored on their device of either their face, their body showing the clothes they are currently wearing, the exterior of the car they are currently driving, or the license plate number (image or text) of the car they are currently driving. For many methods of Perceptual Addressing, devices automatically send this image to any other device (which is part of the same application) upon request. In some embodiments, it is important, that these images be used only for identification and confirmation purposes. For this reason, identification and confirmation images of other people which are stored on a user's device should have a very short lifetime (measured in seconds or minutes) after which time they are automatically deleted. The length of time that these images are stored on a device will depend on a number of factors including whether or not the image is of another person to whom a communication was actually made, and whether the image of another person was received as part of a communication from that person or received as part of the confirmation process when initiating a communication to that person.

For the process of visual confirmation, users need a method to input images of themselves into their device so that their images can be transmitted to other devices upon request. In order for users to input their own images into their devices, it is convenient for each device to be equipped with a digital camera similar to those currently in some cellular telephones. In order for users to effectively take photographs of themselves, it is helpful for the camera lens to be able to face the same direction as the display of the camera image. Having an integrated digital camera allows users to frequently update their image so that it closely matches their, current appearance—important in order for other people to correctly verify that they have contacted the person they intended to contact.

Determining Spatial Position

Several methods of Perceptual Addressing depend upon the ability to determine the spatial position of users and their potential targets. These methods may require the use of spatial position technology, either currently existing or yet to be invented, that allows the determination of position to an accuracy of several centimeters. The particular method of determining position is not central to embodiments of this invention and there are several methods that would suffice. (As an example, the method described in the paper "A High Performance Privacy-Oriented Location System" in Proceedings of the First IEEE International Conference on Pervasive Computing and Communications (PerCom2003), pages 216-223, would be adequate. Other positioning systems incorporating GPS, Wi-Fi, UWB, RF triangulation, infrared, ultrasound, RFID, or any other technologies which would allow the position of each device to be accurately determined within several centimeters would also be adequate.

Methods of Perceptual Addressing

Following are descriptions of several different methods of Perceptual Addressing. These methods may be used alone or in combination. Each description includes a step-by-step sequence of events for the successful execution of the method.

Method #1: Non-Directional Transmission

A non-directional signal is broadcast to all devices in the immediate area. The signal contains the device ID# and network address of the transmitting device (Device #1) as well as a request for all receiving devices to send their own device ID#'s and addresses as well as a thumbnail image of their user to the requesting device. The user initiating the request (User #1) reviews all the images received, and then by selecting the image of the person that she is trying to contact (User #2), the user is actually selecting the address of User #2's device (Device #2). With this method a user will receive as many images as there are users in the area. Some advantages of this method are: a) it doesn't require that the user be particularly close to the target; and b) it is currently viable everywhere because it doesn't require the existence of a location technology infrastructure. This method includes the following steps:

(1) User #1 sees someone, User #2, to whom she wants to communicate, and instructs her device using the device interface (she presses a button, for example) to contact all other devices in the immediate vicinity and obtain images of their users.

(2) User #1's device (Device #1) then broadcasts a non-directional unaddressed transmission to all other devices within range. The transmission includes User #1's device ID# and network address, as well as a request that images be sent to Device #1.

(3) Each device receiving the request responds automatically (without user awareness) with a transmission addressed to Device #1, sending its own device ID# and network address, as well as a image of its user. (Only Device #1 will receive these transmissions as other devices will ignore an addressed transmission it if it is not addressed to them.)

(4) User #1 reviews the images received from all devices and selects the image of User #2, thereby selecting Device #2's device ID# and network address.

(5) Device #1 initiates an addressed communication to Device #2. The means of transmission can be either direct (device to device, if the two devices are in the same general vicinity) or indirect (via a network to Device #2's network address).

Method #2: Non-Directional Transmission to Devices within a Limited Radius

This method is identical to Method #1 with the modification that the initial request for user images is made with a more limited signal strength, requiring User #1 to be within a few feet of the target person (User #2), thus limiting the number of other devices that will be contacted, and in turn limiting the number of images that will be received. There are two different user options for how to control signal strength: (a) the user specifies a desired radius of effectiveness (selection may be made in terms of a unit of distance, "5 feet", for example, or in terms of general ranges, "far", "medium", and "close", for example) which then determines the signal strength; or (b) the user specifies the maximum number of people (selection may be made in terms of specific numbers of people, "3 people", for example, or in terms of general numbers of people, "very few", "some", or "many", for example) that should be contacted: the signal strength then starts at a very low level and increases until the maximum number of people have been contacted (as measured by the number of responses received). The initial transmission requests device ID#'s, network addresses, and associated images. User #1 then selects the image corresponding to the intended recipient, thus selecting the device ID# and network address of the correct target.

This method includes the following steps:
(1) User #1 sets the default transmission distance on her device ("5 feet", for example).
(2) User #1 sees someone, User #2, to whom she wants to communicate. She walks to within five feet of User #2 and instructs her device (Device #1) via its user interface (she presses a button, for example) to contact all other devices within five feet, and obtain device ID#'s, network addresses, and images from each device. (Alternatively, User #1 could have controlled the signal strength of the initial broadcasted request by specifying the maximum number of people that should be contacted so that her device gradually increased signal strength until the maximum number of responses is received. If she had sent the maximum equal to one person, the result would be that only the person closest to her would be contacted.)
(3) Device #1 broadcasts a non-directional transmission to other devices with enough signal strength to effectively reach approximately 5 feet, under "normal" conditions". The transmission includes Device #11s device ID# and network address, as well as a request for the device ID#, network address, and image from other devices.
(4) Each device receiving the request responds with a transmission addressed to the device making the request, sending its own device ID# and network address as well as an image of its user.
(5) Device #1 receives the device ID#'s, network addresses, and images from all other users in the area.
(6) User #1 selects the image of User #2, thereby selecting User #2's device ID# and network address.
(7) Device #1 initiates an addressed communication to Device #2. The means of transmission can be either direct (device to device, if the two devices are in the same general vicinity) or indirect (via a network to Device #2's network address).

Method #3: Directional Transmission to Other Users' Devices

This method is identical to Method #1 except that instead of Device #1 making an initial transmission in all directions, the transmission is focused in a relatively narrow beam toward the target person (User #2), thus reducing the number of other users contacted by the transmission, while at the same time allowing User #1 to be at a relative distance from User #2. The transmission uses frequencies in the range of 100 GHz to sub-infrared in order to balance the dual needs of creating a highly directional transmission from a small handheld device with the need to penetrate barriers (such as clothing and bodies) between the transmitting device and receiving device. This method includes the following steps:
(1) User #1 sees someone, User #2, to whom she wants to communicate. She aims her device (Device #1) at User #2. User #1 instructs her device via its user interface (she presses a button, for example) to contact all other devices in the direction of User #2 and obtain device EDVs, network addresses, and confirmation images of those users.
(2) User #1s device (Device #1) sends a directional transmission to all other devices in the target user's direction. The transmission includes Device #1's device ID# and network address, as well as a request that confirmation images be sent to User #1.
(3) Each device receiving the transmission responds with a transmission addressed to Device #1, sending its own device ID# and network address, as well as a confirmation image of its user.
(4) Device #1 receives device ID#s, network addresses, and confirmation images from all other local users in the direction of User #2.
(5) From the confirmation images received, User #1 selects the image of User #2, thereby selecting the device ID# and network address of User #2's device, Device #2.
(6) Device #1 initiates an addressed communication to Device #2. The means of transmission can be either direct (device to device, if the two devices are in the same general vicinity) or indirect (via a network to Device #2's network address).

Method #4: Directional Transmission to RFID Tags

As an alternative to configuring a directional transmission that will penetrate obstructions, the emphasis is placed on a high frequency highly directional beam (infrared, for example) without regard for its penetration properties. It involves the use of one or more tiny Radio Frequency Identification Tags (RFID) tags clipped onto the outside of clothing of each user which, when scanned by the devices of other users, transmits the device ID# of the target user's own device to the interrogating device. In order to scan the RFID tag(s) of a target user, devices have highly directional scanning capability using a high-frequency signal (infrared, for example). User #1 points her device (Device #1) toward the person of interest (User #2). Then, depending on how highly focused the scan and how accurate the aim of User #1, the beam will contact the RFID tags of one or more individuals, including User #2, which will then transmit device ID#(s) back to Device #1. Device #1 then sends a non-directional transmission addressed to each of the devices contacted. The transmission contains User #1's device ID# and network address, and also a request for a confirmation image of the other users. After confirmation images are received from all the devices contacted, User #1 selects the image of the intended recipient, User #2, thus addressing a communication to only that individual. With this method a line of sight is required between User #1's device and the RFID tags of other users, and there is a range limitation as to how far passive RFID tags can transmit back to the scanning device.

This method includes the following steps:
(1) User #1 sees someone, User #2, to whom she wants to communicate. She aims her device (Device #1) at User #2. User #1 instructs her device via its user interface (she presses a button, for example) to contact all other devices in the direction of User #2.
(2) Device #1 transmits a high-frequency (infrared, for example) directional signal in the direction of User #2. This signal, containing Device #1's device ID# makes contact with the RFID tags of one or more users.

(3) Each RFID tag which receives the transmission from Device #1 then makes a transmission addressed to Device #1's device ID# and containing the device ID# of its user.
(4) Device #1 receives the device ID#'s from all RFID tags contacted and then sends a non-directional transmission addressed to each of those device Drs. These transmissions include Device #1's device ID# and network address as well as a request for a confirmation image of the user. If any of the other devices cannot be contacted with a direct transmission because they are now out of the immediate area, or for some other reason, then a transmission is made to the device's network address.
(5) Each device receiving a request for a confirmation image then transmits a user's image to Device #1.
(6) Device #1 receives all confirmation images and displays them. User #1 selects the image of the user she intended to contact, User #2, thereby selecting Device #2's device ID# and network address.
(7) Device #1 initiates an addressed communication to Device #2. The means of transmission can be either direct (device to device, if the two devices are in the same general vicinity) or indirect (via a network to Device #2's network address).

Method #5: Non-Directional Transmission to RFID Tags

This method is identical to Method #with two differences: (a) The transmission to scan the target person's RFID tag is non-directional; (b) Because the scanning is non-directional, scanning must be very short range. In order to select the person of interest, User #1 must stand very close to User #2 when activating the scanning transmission. It is also important that User #1 makes sure that there are not any other users within scanning distance.

Method #6: Directional Transmission to Intermediate RFID Tags

Similar to Method #4, RFID tags are worn by users who receive highly directional high-frequency transmissions from User #1's device (Device #1). But instead of transmitting a high frequency signal back to the Device #1, the RFID tag converts the incoming signal to a relatively low frequency radio frequency (RF) signal (that easily penetrates clothing and bodies) and then transmits this RF signal to its owner's device (at most only two or three feet away) by addressing it with the device's device ID#. As this signal carries Device #1 t s Device ID, network address, and a request for a confirmation image, after receiving the signal the target device makes a non-directional transmission addressed Device #1, sending its own device ID#, network address, and an image of its user. User #1 then needs only select the image of the person she intended to contact, User #2, in order to address subsequent transmissions to that person. Because the RFID tags do not transmit back to the initiating device, this solution does not have the range limitations of the previous method, although it still requires a line of sight between the device of the sender and the RFID tag of the receiver. This method includes the following steps:

(1) User #1 sees someone, User #2, to whom she wants to communicate. User #1 aims her device (Device #1) at User #2 and instructs her device via its user interface (she presses a button, for example) to contact all other devices in the direction of User #2.
(2) Device #1 transmits a high-frequency (infrared, for example) directional signal in the direction of User #2. This signal, containing Device #1's device ID# makes contact with the RFID tags of one or more users.
(3) Each RFID tag contacted then transforms the signal to a much lower RF frequency and then transmits the same information, addressed to its user's device ID#. A low power transmission is adequate as the signal has to travel only a few feet (for example, from the RFID tag on the target person's lapel to the device in the target person's pocket).
(4) After receiving the transmission, the receiving device makes a transmission addressed to Device #1's device ID# which includes the recipient device's device ID# as well as a confirmation image of the recipient.
(5) Device #1 will receive and display one confirmation image for every device contacted. User #1 selects the image of the user she intended to contact, User #2, thereby selecting Device #2's device ID# and network address.
(6) Device #1 initiates an addressed communication to Device #2. The means of transmission can be either direct (device to device, if the two devices are in the same general vicinity) or indirect (via a network to Device #2's network address).

Method #7: Server Managed Image Identification

This method is similar to Method #1 with the exception that the images of nearby users, instead of being sent from the nearby devices themselves, are sent from a central server which also mediates communication between devices. The central server of this application has access to location information of all users as well as a database of all users containing their addresses, device ID#'s, and facial images. Upon request the server is able to send images of proximal users to a requesting device. This method includes the following steps:

(1) User #1 sees someone, User #2, to whom she wants to communicate, and instructs her device, using the device interface (she presses a button, for example), to contact the central server and request images of other users currently in her proximity.
(2) User #1's device (Device #1) then transmits a request to the server. The transmission includes User #1's device ID# and network address, as well as a request that images be sent to Device #1.
(3) The server retrieves the location information and determines which other users are within viewing distance of User #1. The server then transmits the images of those other users along with their associated device ID#'s to Device #1.
(4) User #1 reviews the images received and selects the image of User #2, thereby selecting Device #2's device ID#.
(5) Device #1 initiates an addressed communication to Device #2 via the central server by specifying Device #2's device ID#.

Method #8: Location Identification & Spatial Mapping

In this method each user's device determines its own location coordinates periodically (at least once per second is recommended), and broadcasts periodically (at least once per second is recommended) those coordinates, along with the device's device ID#, to other devices sharing this application in the immediate vicinity. (It would also be an acceptable solution for a centralized system to track the location of all devices and transmit to all devices the locations, device ID#'s and network addresses of all devices local to each device, updating that information periodically.) Devices can have periodically updated position information about all local devices in order to take into account the motion of users. It should be noted that location coordinates need not be globally valid locally valid coordinates are sufficient. Each device is therefore aware of the positions of all other devices nearby both their device ID#'s and location coordinates. Devices then have the information to display a two dimensional self-updating map of all other users in the immediate vicinity in which each user is represented by a small symbol. A device ID# and network address is associated with each symbol so that a user need only select the symbol associated with a particular person to address a transmission to that person.

To contact a person of interest, User #1 first views the map on her device and compares the configuration of symbols on the map with the configuration of people before her. She then selects the symbol on the map which she believes corresponds to the intended recipient. Her device (Device #1) then makes a transmission to User #2's device (Device #2) containing Device #1 f s device ID# and network address and a request for a confirmation image of User #2. Device #2 then transmits an image of User #2 to Device #1. User #1 then compares the image received to the actual appearance of the person she intended to contact. If she determines that she has contacted the correct person, then she instructs her device via the user interface to initiate communications with User #2. If, on the other hand, the confirmation image that User #1 received does not correspond to the person that User #1 intended to contact, then User #1 may select another symbol which could possibly represent the person she wants to contact.

An alternate version of this method would not require the constant periodic updating of position information during periods in which there are no users in a local area performing perceptual addressing functions. Instead, this same process would operate only when initiated by a user via the user interface of his or her device (pressing a button, for example). Upon initiation, Device #1 would determine its own position (periodically for the next several minutes) and also broadcast a request for positions and addresses of all other devices in the vicinity. Upon receiving this request, each device would determine its own position (periodically for the next several minutes) and also broadcast (periodically for the next several minutes) its position and address. The rest of this alternate method is the same as the original method. The advantage of this alternate method is that it would save energy and bandwidth for devices not to be determining and broadcasting position when it is not needed or used. The disadvantage is that there is a short delay between the time User #1 initiates the positioning process and the time all user's positions are displayed on her device.

Yet another alternate version entails the above alternate method with the following changes: All devices maintain time synchronization to one second accuracy by means of periodic time broadcasts via a network from a central server. All devices constantly update their position at least once per second and record what position they are at each point in time. This data is saved for a trailing time period, 10 seconds for example. Then, when a device makes a request of other devices for positions and network addresses, the request specifies the precise time for which position information is sought. Using this second alternative method then, devices only transmit their positions when there is a request for position information, yet there is no inaccuracy in position information introduced as a result of potential movement of each user between the time the request for position is made and the time each device assesses its own position. Some advantages of this method are (a) it doesn't require a user to draw attention to himself or herself by aiming his or her device at another person; (b) it can precisely target just one person at a time; (c) it doesn't depend on making a "line-of-sight" connection; and (d) there are no range limitations other than the target person be in the same general vicinity. This method includes the following steps:

(1) All devices periodically (at least once per second is recommended) determine their own position coordinates and broadcast those coordinates along with their device ID#'s to other devices in the immediate vicinity.

(2) User #1's device (Device #1) receives frequently updated location information from all other devices in its immediate vicinity.

(3) User #1 sees someone, User #2, to whom she wants to communicate.

(4) User #1 instructs her device via its user interface (presses a button, for example) to display a 2-dimensional map of the locations of all other devices in the immediate vicinity in relation to itself. Each of the other devices are represented on the display by a small symbol (which can potentially represent useful distinctions such as the sex of the user, or whether the user is participating in the same "application" such as "dating", "business networking", etc.).

(5) The user selects the symbol on the display of her device which she believes corresponds to User #2, thereby selecting the device ID# of User #2's device (Device #2). If the user is not operating her device in a "confirmation mode", then at this point addressed communications are initiated with User #2 which includes the transmission of an image of User #1, Device #1's device ID#, and Device #1's network address.

(6) If the User #1 does wish to operate her device in a "confirmation mode", then Device #1 makes a transmission addressed to the target device that includes its own device ID#, network address, and a request for a confirmation image of the target user.

(7) Device #2 responds by sending a transmission addressed to Device #1 that includes its own device ID#, network address, and an image of User #2.

(8) User #1 views the image of User #2 on her display to confirm that it is the person she intended to contact.

(9) If the image received corresponds to the person she intended to contact, then she instructs her device (by pressing the "send" button, for example) to initiate an addressed communication to the target device. Device #1 also sends an image of User #1, Device #1's device ID#, and Device #1's network address to Device #2.

(10) If the confirmation image received from Device #2 does not correspond to the target user, then User #1 has the option of selecting a different symbol which could potentially belong to the target individual. If there is no symbol that corresponds to the target individual, then that individual either does not have a device which shares the same application, or that device is disabled, or that device is set in an "invisible mode" in which either it is not accepting communications at all, or it is not accepting communications from that particular sender.

Method #9: Virtual Beaming

This method is similar to method (6) except that it employs a different user interface, "virtual beaming", for selecting which devices will be contacted. In addition to incorporating the location positioning technology of Method #8 (with the additional provision that absolute direction must be incorporated into the position coordinates returned by the positioning system for example, given two position coordinates it must be possible to determine which position is further North and which position is further West), it also incorporates direction technology such as, for example, a digital fluxgate compass and/or a gyroscopic compass. Instead of a user targeting a person of interest by selecting a symbol on her display which she thinks corresponds to that person, she targets the person of interest by pointing her device at him and instructing her device via the user interface (pressing a button, for example) to contact that person.

Using the direction technology incorporated into the device in combination with the position technology already discussed, it can be determined with simple geometry which target individuals are positioned within a narrow wedge (in either two or three dimensions, depending on the sophistication of the positioning information) extending out from the user's position in the direction she is pointing her device:

User #1's device (Device #1) has already received information as to her own position and also the device ID#'s and position coordinates of all other devices in the immediate vicinity. The direction that User #1's device was pointing when she targeted the person of interest can be represented as the "target vector", which begins at User #1's position and extends in the direction determined by the direction technology in her device. For position information in 3-dimensions, a target volume can then be defined as the volume between four vectors, all extending from User #1's position—two lying in a horizontal plane and the other two lying in a vertical plane. In the horizontal plane, one vector lies X degrees counterclockwise to the target vector, and the other vector X degrees clockwise to the target vector, where X is a small value (5 degrees is recommended) which can be adjusted by the user. In the vertical plane, one vector extends in a direction X degrees above the target vector, and the other vector X degrees below the target vector When User #1 points her device and "presses the button", Device #1 then makes an addressed transmission to all other users within the target area (or volume). The transmission includes Device #1's device ID# and network address, and a request for a confirmation image of the recipient. After the confirmation images are received, the user then selects the image of the person (and the corresponding device ID# and network address) she is interested in. Further communication is addressed solely to the selected device.

One advantage of this method is that the user is not required to read a map on her device, trying to make an accurate correspondence between the person she is interested in and the corresponding symbol on her display. This is of particular value when the target individual is moving. Another advantage is that obstructions between the user and the target person are not an issue when targeting: a user may hold the device within a coat pocket or bag when targeting an individual. The only disadvantage in comparison with Method #8 is that the initial request for a confirmation image possibly may be made to more than one target device.

This method includes the following steps:

(1) All devices periodically (at least once per second is recommended) determine their own position coordinates and broadcast those coordinates along with their device ID#'s to other devices in the immediate vicinity.
(2) User #1's device (Device #1) receives frequently updated location information from all other devices in its immediate vicinity.
(3) User #1 sees someone, User #2, to whom she wants to communicate. She aims her device (Device #1) at User #2. User #1 instructs her device via its user interface (she presses a button, for example) to contact all other devices in the direction of User #2 and obtain confirmation images of those users.
(4) User #1's device (Device #1) makes a transmission addressed to all devices in the target area as defined above. The transmission includes Device #1's device ID# and network address, as well as a request that confirmation images be sent to Device #1.
(5) Each device receiving the transmission responds with a transmission addressed to Device #1, sending its own device ID# and network address, as well as a confirmation image of its user.
(6) Device #1 receives confirmation images from all users in the target area.
(7) From the confirmation images received, User #1 selects the image corresponding to User #2, thereby selecting the device ID# and network address of User #2's device, Device #2.
(8) Device #1 initiates addressed communications with Device #2 and transmits an image of User #1. The means of transmission can be either direct (device to device, if the two devices are in the same general vicinity) or indirect (via a network to Device #2's network address).

Method #10: Addressing with Spatial Position

In this method, User #1 notices the person to which she wants to send a message, User #2, and with her device, Device #1, determines the precise distance and direction that User #2 is from her own position. This can be accomplished with any compass and distance measuring capabilities built into Device #1. Device #1 then transmits a message to a central server with instructions to forward the message to whatever device is at that specific position relative to her own position. The central server has access to absolute positions of all users and can easily calculate the absolute position indicated by adding the submitted relative position to Device #1's absolute position. The central server then determines what user is nearest to the calculated position and forwards the message to that user.

Method #11: Visual Biometric Addressing

This method generally involves capturing an image of some aspect of the target person, analyzing the image to produce a unique biometric profile, and then associating the biometric profile with an address. The image analysis can be performed on either (1) the user's device or (2) on a central server. In the first case, the user's device would send the message and biometric profile to the central server to be forwarded to the user associated with that biometric profile. The server has access to a user database which associates user's addresses, device ID#'s, and biometric profiles. The server would then associate the biometric profile with an address, and forward the message to that address. In the second case, the user's device would send the message along with the captured image to the server. The server would then analyze the image, match the resulting biometric profile to an address, and forward the message to that address. There are several types of biometric profiles that this method could be applied to: facial recognition, outer (external) ear recognition, and retinal pattern, for example. Each type of biometric analysis may require a specialized camera for that purpose to be integrated into user's devices. However, embodiments of this invention are agnostic as to the specifics of what kind of biometric analysis is used, whether it is current or future biometric technology. The method of using a visually obtained biometric 'signature" to address a message remains the same.

In all of the above variations, the user selects the intended target person by aiming the user's device at the target person and capturing an image.

Method #12: Auditory Biometric Addressing

This method involves using the distinct vocal characteristics of people both as a means of targeting a specific person, and also as a means of determining the target person's address. First, a voice sample needs to be collected. This can be done by the user moving close to the intended target and recording a voice sample when the target is speaking. Sound recording and editing features can easily be incorporated into small devices and this is existing technology. Alternatively, a directional microphone integrated into the user's device could be aimed at the target person for recording their speech. (It may be easier for a blind person to aim a microphone than to maneuver close to the target.) After the voice sample is collected it can be analyzed either on the user's device or on a central server. If analyzed on the user's device, the message along with the biometric profile can be sent to the server, where the biometric profile will be associated in a database with an address, and the message will then be forwarded to the target person. If the voice sample is analyzed on the central server, then the user's device sends the message along with the voice sample itself to the server. The server then converts the voice sample to a biometric profile, associates the profile with the address, and then forwards the message to that address.

Method #13: Addressing with a Visible Alphanumeric String

The most common examples of strings of alphanumeric characters displayed visibly and obviously associated with people are sports jerseys and license plates. Using this method, the alphanumeric string is associated with an address using a database either on a central server (in which case a user's device addresses a message to an alphanumeric string and sends the message to the server) or on the user's device (in which case a user has the ability to send a message directly to the target person's address).

There are two distinct ways that a user can select the target person: (a) the user can copy the alphanumeric string into her device, or (b) the user can capture the image of the alphanumeric string with a camera on her device. In the later case, optical character recognition (OCR) needs to be performed on the image to determine the alphanumeric string. OCR can be performed either on the user's device or on a central server. If it is performed on the user's device, then the all of the above options for associating the string with the address are available. If, however, OCR is to be performed on a central server, then the device must send the message along with the image of the alphanumeric string to the server, to be forwarded to the target person's device.

Methods #14 & #15: Data to Image Mapping

In contrast with some previous methods involving macroscopic images for the selection of the target person, Methods #14 and #15 do not depend on the user's device receiving images of other users from a central server or other users' devices. Instead, it is the user's own device which generates any images of other users. In addition, in contrast with these previous methods, each image generated in Methods #14 and #15 by the user's own device may contain more than one person. Following is a description of the user's experience using these methods. Afterward, more technical descriptions will be given.

Figure 10:
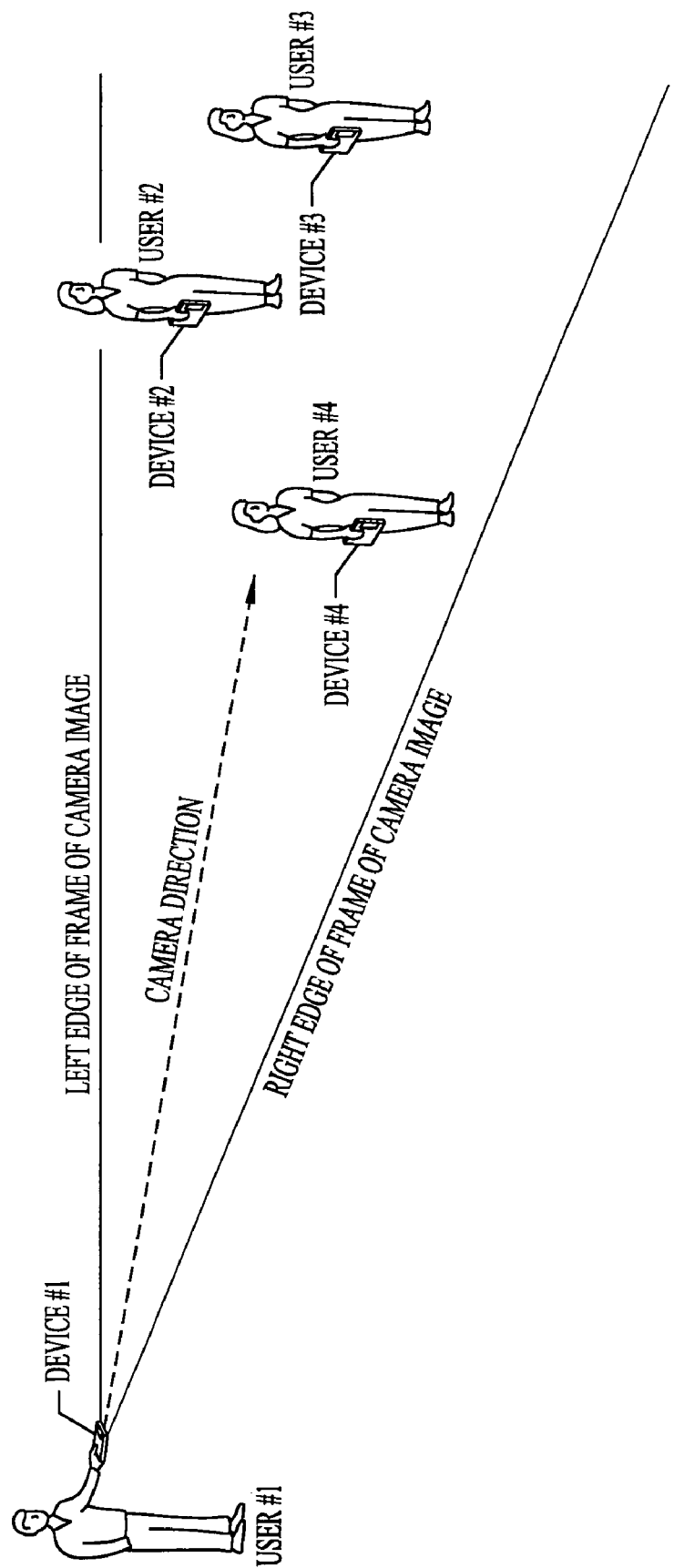
FIG. 10 depicts a user targeting other users in 3-dimensional space, according to example embodiments of the invention.

In order to use these methods, the user points the camera on her device at the person she would like to communicate with (see FIG. 10). She instructs her device (by pressing a button, for example) to either capture a still image, or to begin displaying live video. The camera generates an image of a person (or a group of people) from the user's point of view. The user views either a still image or a live video image on her device's display. Superimposed over the image of each person (only if that person is a user of the application) is a small graphic shape, a circle for example, which represents the location of that person's device. Alternatively, the name, country of origin, or other information could be superimposed over the image of each person. The user selects the person with whom she wants to communicate by tapping with a stylus the circle superimposed over that person's image. (Other user interfaces are compatible with embodiments of this invention: for example, the user could select the desired circle by toggling from circle to circle by turning a dial on her device). Each circle is associated with the device ID# and network address of the device belonging to the user whose image lies underneath the circle. The user's device then initiates communication with the device of the selected person either by sending a regular or Discreet message, or by initiating some other form of communication such as, for example, an instant messaging session, a telephone call, or a videophone call.

In order to achieve this operation, it must be possible to associate the device ID# and/or network address of a target person's device with the image of that person as represented on the display of a user's device. There are two alternative techniques for accomplishing this task: (1) mapping position data onto an image, and (2) focusing both light radiation from the target person and also data-carrying radiation from the target person's device onto the same imaging sensor (or two different imaging sensors and then overlay the data captured on each sensor).

Method #14: Data to Image Mapping Position Data onto an Image

The means of associating a graphic symbol (a circle, for example) that is linked to data (device ID# and network address, for example) with a particular portion of an image (likeness of a target person, for example) is accomplished by mapping position data received from another person's device onto the display of the user's device.

The process of mapping of objects that exist in 3-dimensional space onto the two-dimensional display of a user's device requires the following factors: (a) the position of the user's device, (b) the position of the target device(s), (c) the orientation of the user's device, (d) the focal length of the device's camera lens, (e) the size of the camera's image sensor, and (f) the pixel density of the sensor. The last three factors (d, e and f) are properties of the user's camera and are either fixed quantities, or at least, in the case of the lens's focal length, known quantities easily output from the camera.

In order to acquire the position data, factors (a) and (b), an infrastructure is required (1) to determine the precise location of each device with location coordinates which are valid at least locally, and (2) to provide time synchronization to all devices (at least locally) to sufficient accuracy (approximately 1/10 second accuracy is recommended for most situations). Time synchronization can be used in order to take into account movement by either the user or potential target persons. If the location history of each device is stored for a trailing period of about 5 seconds (or similar period of time short enough so that only a manageable amount of memory is required, yet long enough so that all devices are able to respond to a request for information within that time period), then the locations of all users may be determined for the moment an image is captured.

Each device stores its own location data, or alternatively, the location data for all local devices is stored by a single third-party server. If a user targets a person by capturing a still image, then when the user presses a button to capture the image, his device broadcasts [to other devices within a specific domain, where "specific domain" can be defined in any one of a variety of ways, for example, (a) any user which receives the broadcast, (b) any user with location coordinates within a designated quadrant relative to the user, etc.] its own device ID and network address accompanied by a request for other devices to transmit their position coordinates for a specified moment within the past five seconds (or other predetermined trailing period). When potential target devices receive this broadcasted request, they respond by transmitting to the network address of the requesting device (a) their device ID#, (b) their network address, and (c) their position coordinates for the time specified in the request. Alternatively, if the position data is stored on a third-party server, when the user captures an image, the request for position information is instead directed to the third-party server. The server then provides the requested position information of all eligible devices along with the associated device ID's and network addresses. The technology to accomplish both position and synchronization functions currently exists, and it is irrelevant to embodiments of this invention which location and synchronization technologies are used as long as they deliver the required information.

Additionally, this technique requires that each device have the capability of accurately determining its own orientation in three-dimensional space, factor (c).

Specifically, the information required is the orientation of the device's camera horizontally (direction as it is projected onto a horizontal plane), vertically (the degree in which its orientation deviates from the horizontal), and 'roll' (the degree to which the device is rotated about the axis defined by the direction that the device's camera is pointing). The technology for a device to determine its own orientation currently exists, and it is irrelevant to embodiments of this invention which technology is employed as long as it delivers the required output.

One adequate form of the required output describes the camera orientation with three angles: ($\phi$, $\theta$, $\psi$), where $\phi$ is the degree that the camera is rotated to the left in a horizontal plane from a reference direction; $\theta$ is the degree that the camera is tilted up or down from the horizontal; and $\psi$ is the degree that the camera is rotated in a clockwise direction about the axis defined by the direction it is pointing.

Following is a description of how the position of a target person's device may be mapped onto the display of a user's device.

Figure 11:
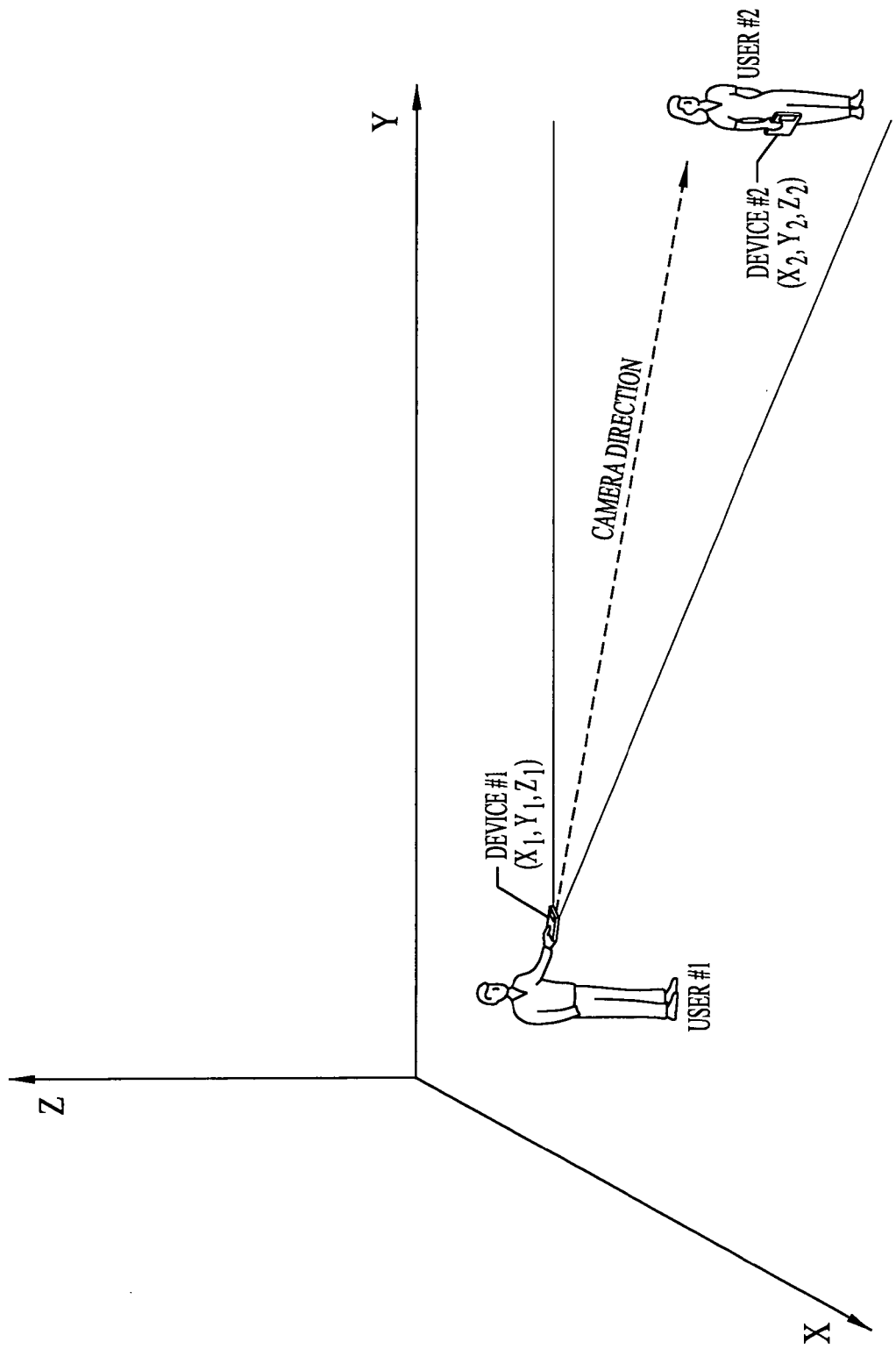
FIG. 11 depicts a first user targeting a second user in 3-dimensional space, according to example embodiments of the invention.

FIG. 11 illustrates two users in 3-dimensional space described by an x, y, z coordinate system in which the z-dimension represents the vertical dimension and the x and y coordinates describe the user's location with respect to the horizontal plane. The locations of Device #1 and Device #2 are represented by the coordinates (x1, y1, z1) and (x2, y2, z2) respectively. (More precisely, the location coordinates represent the location of each device's image sensor.) User #1 points his device in the general direction of User #2 and captures an image at a particular moment in time, t. Simultaneously, his device broadcasts its own device ID and network address and a request to nearby devices to send their position coordinates at time t along with their device ID's and network addresses. User #2's device (Device #2, in User #2's bag) responds to this request by transmitting the requested position coordinates (x2, y2, z2), device ID#, and network address to Device #1.

In order for Device #1 to represent on its display the location of Device #2 superimposed over the image of User #2, it must also have (in addition to the location coordinates of Device #2) its own location coordinates (x1, y1, z1) and the orientation of its camera in space ($\phi$, $\theta$, $\psi$). These values are returned by the location system employed and the device orientation system employed, respectively.

Figure 12:
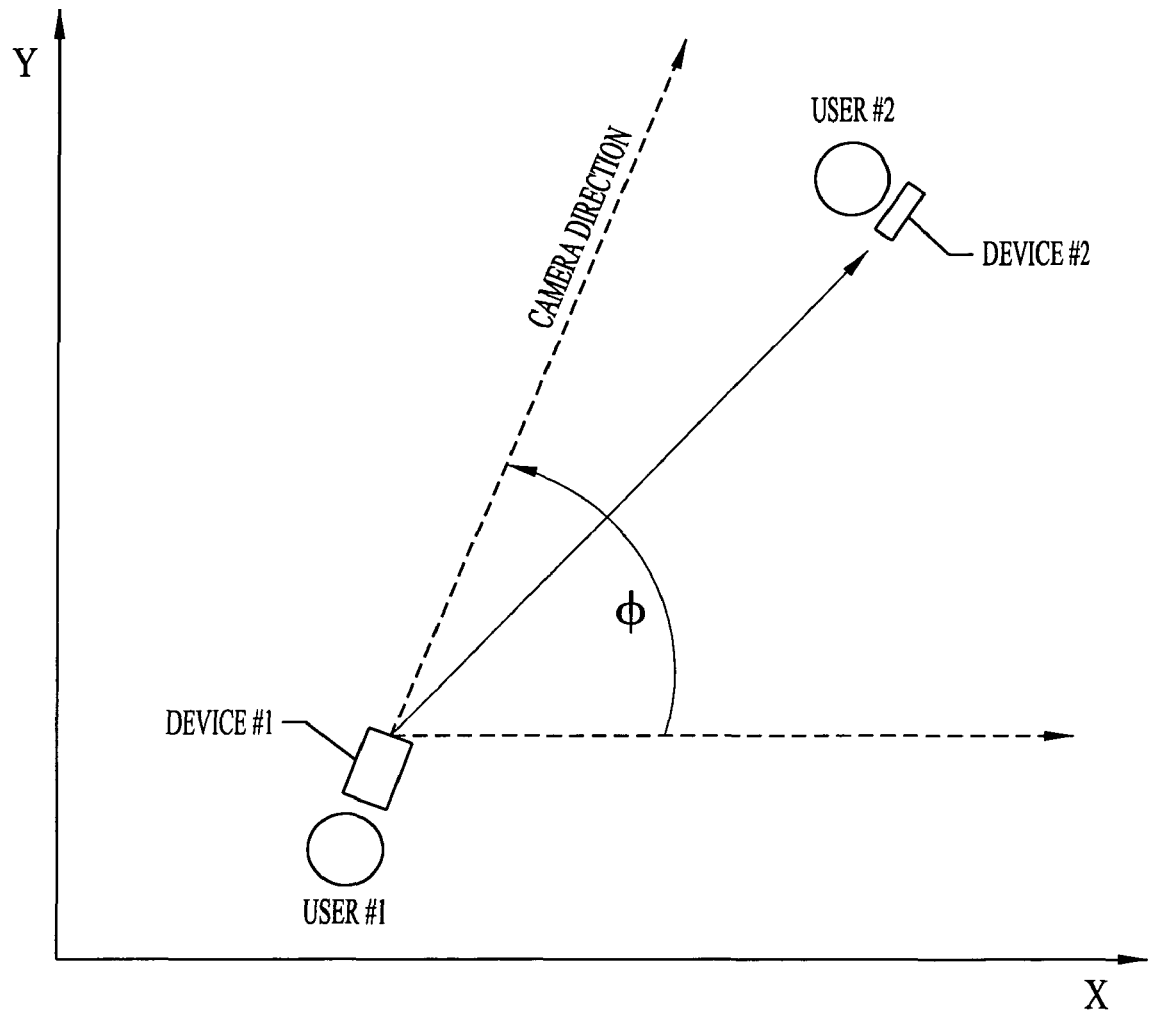
FIG. 12 depicts directional relationships in a horizontal plane, according to example embodiments of the invention.
Figure 13:
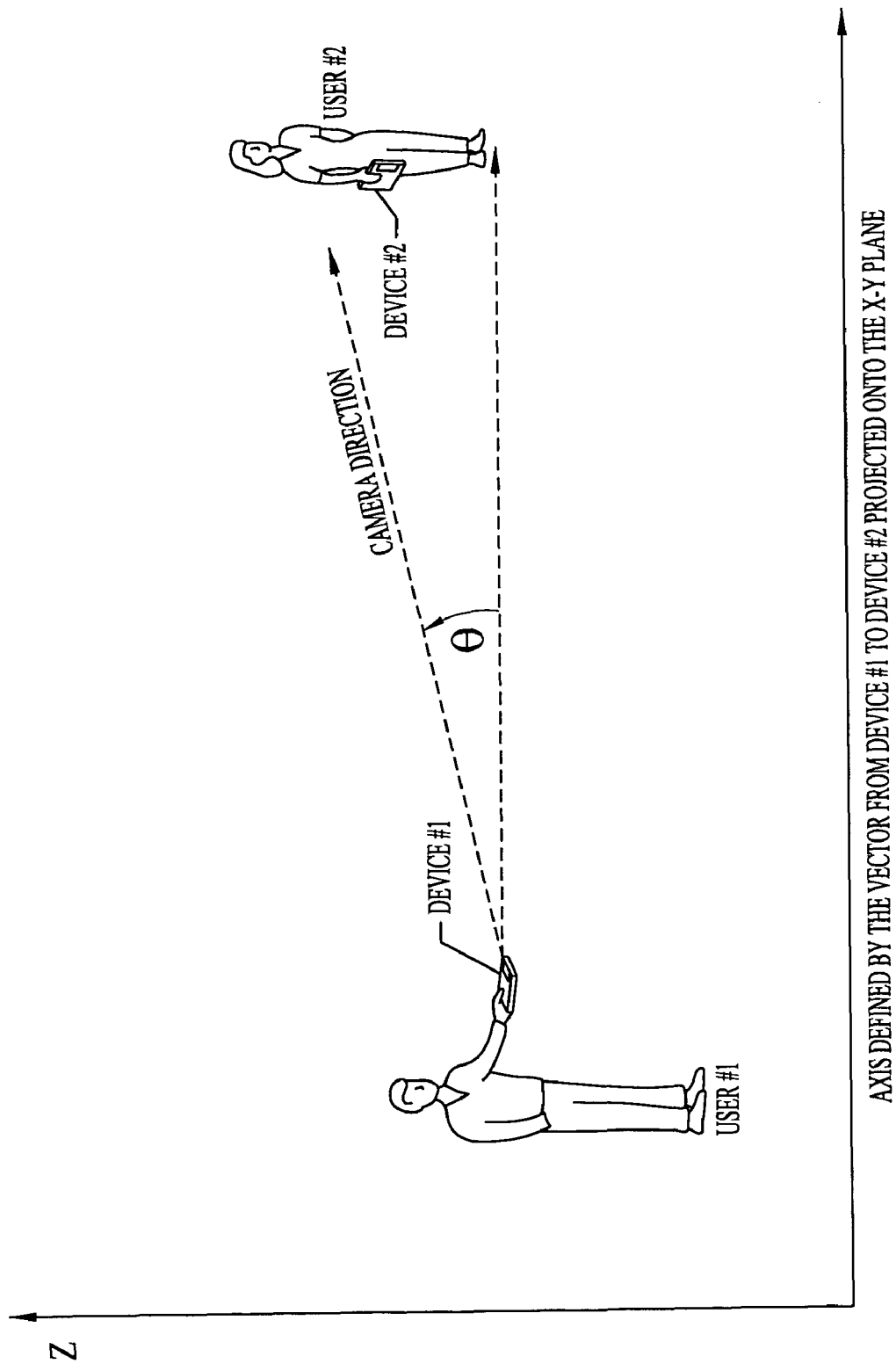
FIG. 13 depicts vertical relationships, according to example embodiments of the invention.
Figure 14:
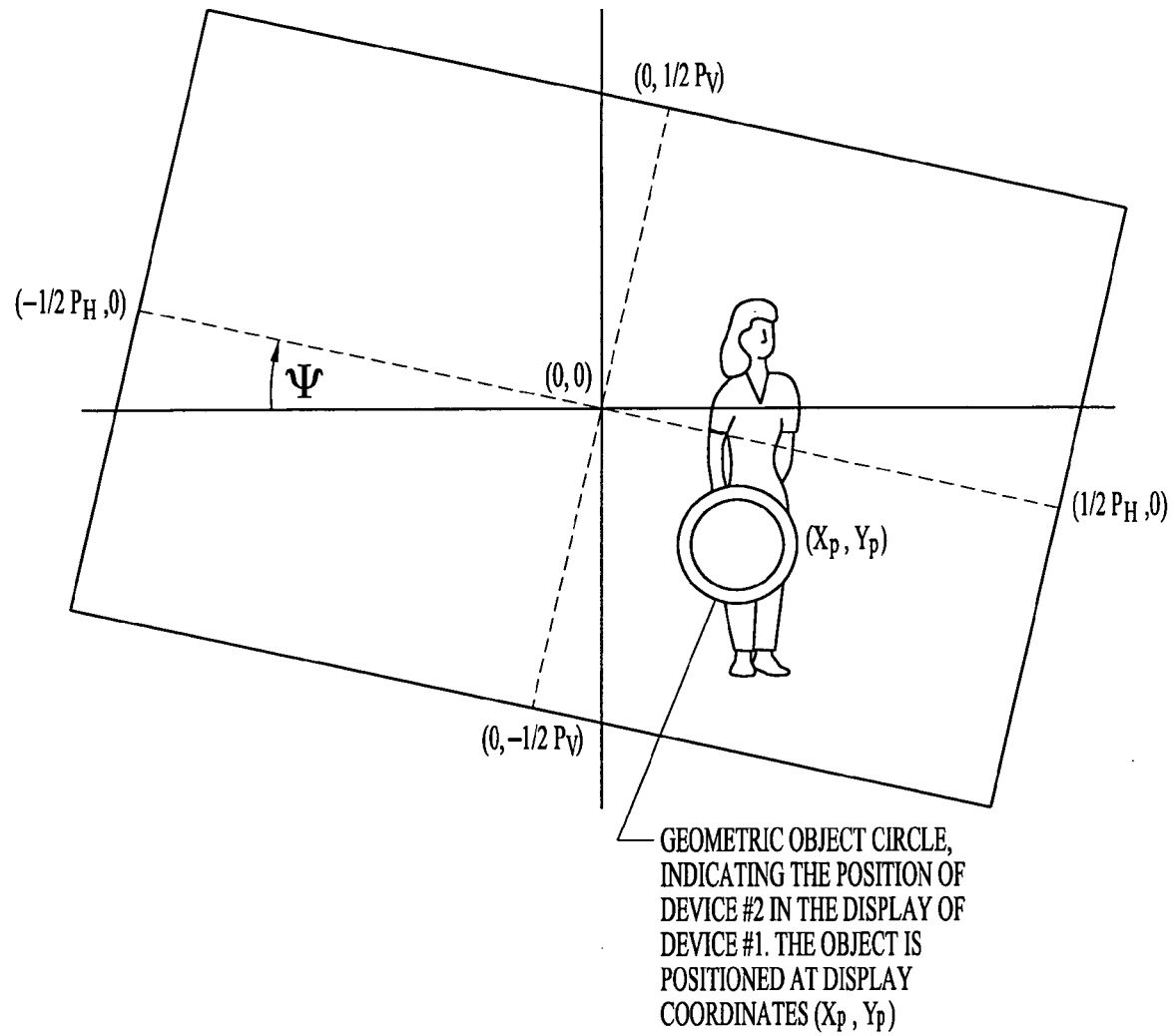
FIG. 14 depicts a device display, according to example embodiments of the invention.

FIG. 12 illustrates the same two users represented from an overhead viewpoint projected against the horizontal plane. The direction in which the camera is pointed in the horizontal plane is specified by a vector which is rotated cp degrees counterclockwise from the direction of the positive x-axis. In FIG. 13, the z-axis represents the vertical dimension and the horizontal axis represents the vector from Device #1 to Device #2 projected onto the x-y plane. The degree to which the camera orientation deviates from the horizontal is represented by the angle $\theta$. FIG. 14 illustrates the display of Device #1.

The camera has been rotated $\psi$ degrees in a clockwise direction about the axis defined by the direction the camera is pointing. This results in the rotation of the image in the display $\psi$ degrees in a counterclockwise direction.

In the device display in FIG. 14 is shown the image of User #2 as well as a circle indicating the location of User #2's device. units of pixels from the center point of the display and are determined as follows. The position coordinates, $x_p$ and (given in units of pixels from the center point of the display), specify the placement of the circle in the display are determined as follows.

$$x_P = -y_0'\left(\frac{P_H}{S_x}\right)\left(\frac{x_0' - \sqrt{x_0'^2 - 4x_0'^2 f}}{x_0' + \sqrt{x_0'^2 - 4x_0'^2 f}}\right)$$

and $$y_P = z_0'\left(\frac{P_V}{S_y}\right)\left(\frac{x_0' - \sqrt{x_0'^2 - 4x_0'^2 f}}{x_0' + \sqrt{x_0'^2 - 4x_0'^2 f}}\right)$$

where
$P_H$=total number of horizontal pixels on the image sensor
$P_V$=total number of vertical pixels on the image sensor
$S_x$=width of the image sensor
$S_y$=height of the image sensor
f=focal length of the camera lens
and $x_0'=\cos\theta(x_0\cos\phi+y_0\sin\phi)+z_0\sin\theta$ $y_0'=\cos\psi(-x_0\sin\phi+y_0\cos\phi)+\sin\psi[z_0\cos\theta-(x_0\cos\phi+y_0\sin\phi)\sin\theta]$ $z_0'=\sin\psi(-x_0\sin\phi+y_0\cos\phi)+\cos\psi[z_0\cos\theta-(x_0\cos\phi+y_0\sin\phi)\sin\theta]$ where $x_0=x_2-x_1$ Note that a simpler version of this technique is possible which uses 2-dimensional rather than 3-dimensional position analysis. In this simpler version, the user's device does not have information as to the elevation of the other user's device. It only knows its location in the horizontal plane. Thus, instead of a geometric shape appearing on the user's display at a point which corresponds to the point that the other user's device would appear if it was visible, a narrow vertical bar appears on the display which intersects the same point. Embodiments of the system are the same in all other respects. This simpler level of complexity comes at little cost. The only situation that would confound a 2-dimensional system is when two potential targets are in the same horizontal direction from the user's perspective, but one target is directly above or below the other.

Method #15: Data to Image Mapping Focusing Data Signals onto an Image Sensor

This method is the same as Method #14 with the exception that it uses a different technique for associating a graphic symbol (a circle, for example), which is linked to data (Device ID and network address, for example), with a particular portion of an image (likeness of a target person, for example). The technique used here is that each device broadcasts a signal which is directional and has a limited ability to penetrate solid objects (clothing, for example) the best frequencies being in the gigahertz to sub-infrared range.

The lens of the camera focuses this data-carrying radiation together with the visible light frequency radiation onto the same image sensor. [There are several lens materials that have the same index of refraction for both light radiation and other wavelengths in the range under discussion.] Intermingled with elements of the image sensor which are sensitive to light radiation are other elements which are sensitive to the data-transmitting wavelengths. These other elements are able to receive and decode data and also tag each signal with the place on the sensor in which it is received.

Because it is not important to determine shape from incoming sub-infrared radiation, but merely position, lower resolution, and hence lower pixel density is required for elements that are sensitive to these data-transmitting wavelengths. However, each of these elements in the image sensor is required to be able to receive and channel data from independent data streams as there may be more than one device "appearing" on the sensor which is transmitting its data. Each data stream is indexed and stored with the pixel number which receives the data. Because the data to be transmitted is very small one device ID or network address the time of transmission from the onset of the signal to the end of the signal is too short to result in any significant "blurring" across pixels.

A variation of this method is to focus the light radiation and the data transmitting radiation onto two separate sensors. Using this variation associating the relative positions on each of the sensors can be done so that for any given pixel on the data sensor, the corresponding location on the image sensor can be calculated, and thus a geometric shape can be displayed at that position superimposed over the image.

IV. Messaging System

One of the purposes of embodiments of this system is to allow users to communicate electronically with other users in their immediate environment even though no contact information is known about those individuals. A second purpose of embodiments of the system is to provide the powerful tool of Discreet Messaging which allows users to express interest in other users while at the same time (a) minimizing the risk of rejection and (b) minimizing unwanted advances.

Discreet Messaging can also be helpful in providing the basis for initial conversation and establishing personal connections.

Electronic, Non-Conditional Messaging

The means is provided of sending a message from one device to another device with no conditions attached. Messages are sent to specific individuals using the methods outlined above. When the intended receiver's device receives the message, the receiving device sends a confirmation signal to the sending device which assures the user that the message has been successfully delivered. Reasons that a message would not be delivered are: the receiver's device is turned off; they are out of physical range of either the user's device or any network; the receiver has chosen not to accept non-DM'S; or the receiver has blocked that particular sender from sending messages to that recipient. If the intended recipient is out of direct transmission range, messages will be transmitted via the internet.

The content of the message can be one of several "prepackaged" text, audio, image, or video messages such as "I'd like to meet", or a custom made message either text, audio, image, or video created by the user and used as needed. Alternatively, a new message can be created for each occasion or each recipient. To create a custom message, the user inputs the content of the message into the device using any method currently in existence, or yet to be invented, for example, writing on the display of the device while embodiments of the system's handwriting recognition system, similar to the Palm system, digitizes the input; or speaking into the device's microphone while embodiments of the system digitize the audio input as audio, or converts it to written form; or recording one or more frames of video using the device's camera; or a combination of the above.

Addressing a message, from the user's point of view, consists of using one of the methods outlined above under the section "Perceptual Addressing". When the user is presented with one or more confirmation images of other users in order to confirm the correct recipient, the user merely selects the image of choice (using any effective means of selection, for example, tapping on the image with a stylus), and then instructing the device to send the message (using for example, by pressing a button labeled "send non-DM"). The message is either transmitted directly to the other device, or transmitted via a network, depending on the proximity to the other device.

Discreet Messaging

Unlike regular messaging, a recipient of a Discreet Message (DM) is not permitted to read a message received, or (in this specific version of DM) even permitted to have any indication that a message has been received, unless the recipient meets certain conditions. (Other implementations of DM may include an additional user variable called level of notification which, in contrast with the above, the sender may have the option of allowing the recipient to know more than merely the fact that a DM was received. The sender may select which additional pieces of information may be included in the notification. For example, the sender may choose one or more of the following pieces of information to be included in the notification that a DM was received: (a) date and time DM was received, (b) location of sender when DM was sent, (c) mutual friends or acquaintances with the sender, (d) first name of the sender, or (e) custom message written by the sender which is not subject to the contingencies of a DM.)

Discreet Messaging can be implemented in one of two ways: (1) using a third-party server to mediate the transmission of information between users' devices, or (2) a peer-to-peer solution in which each user's device in association with another user's device acts as the "trusted third party" in mediating the revealing of information to the users. Whichever method is used, the logic of Discreet Messaging remains the same and is described as follows.

Conditions

In this particular example of Discreet Messaging, the first condition to be met for a DM to be viewable is: (a) the recipient (User #2) of a DM (sent by User #1) must also independently send a DM to the original sender (User #1) either before or after User #1 sends a DM to User #2. As an enhancement to Discreet Messaging, it is possible to incorporate profile matching technology (employed by various interne web sites and cellular telephone dating services) as an additional condition for a Discreet Message to be viewable.

If profile matching is incorporated, then, in this particular example of Discreet Messaging, there are two additional conditions placed upon whether or not a DM is viewable: (b) that User #2 have certain personal attributes (stored on his device as "Personal Data") that meet a set of criteria ("Match Criteria") specified by User #1, and (c) that User #1's Personal Data meets the Match Criteria of User #2. Condition (a)

ensures that the recipient will not see or be aware of a message at all (even though his or her device receives a transmission) unless he or she independently sends a DM to the original sender indicating some level of interest. Conditions (b) and (c) ensure that a recipient will not be aware that a message has been sent unless both users meet minimal requirements for mutual compatibility.

In comparing the Match Criteria of one user with the Personal Data of the other user, it must be possible to "match up" each condition specified by one user with the appropriate content from another user. This matching can be done by having the same standard categories for information about the user as there are for the selection criteria on that content. In this application, conditions placed by User #1 on the Personal Data of User #2 are specified in User #1's Match Criteria. The Match Criteria is then compared to the Personal Data, category by category. Users may enter their Personal Data and Match Criteria into their device in response to a menu-prompted multiple-choice questionnaire. Their responses are then stored and applied to all Discreet Messages sent and received.

The Personal Data of one user may meet the Match Criteria of another user to different degrees anywhere from all categories matching to no categories matching, in this particular example of a dating application, 100% matching is required. Therefore, only if all categories of Personal Data meet the criteria specified in all categories of the Match Criteria, does User #2 meet User #1's Match Criteria. This requirement, however, is much less stringent than it may seem because for any particular category in a user's Match Criteria, the user may specify several acceptable 'answers" or even "no preference'. In the extreme, a user may select "no preference" for all categories, which would effectively be a "null" Match Criteria, resulting in a match with any set of Personal Data.

Viewable Message Non-variable

If all of the conditions above are satisfied, then both users will be notified that they have received a DM from the other. What will actually be viewed by the recipient, say User #1, of a DM is: a message from the other user, User #2, which consists of some combination of text, image, audio, or video. This may be a default message which is prepared in advance, or a message prepared specifically for this DM. There are no restrictions on the content of this message, and it can be extensive or very brief. an image of User #2's face or if User #2 is in a vehicle, the license plate number vehicle, image of the license plate, or image of the vehicle. (There really is no restriction on the content of the image, except that it fulfills its purpose of identification and confirmation: this enables someone sending a message to this user to match the image to the visual appearance of the user.) the current location of User #2 indicated on a two-dimensional map on the device display, and direction of User #2 from User #1's position. This information is available only if either Method 6 or Method 7 of Perceptual Addressing is used in which location coordinates and directional orientation of devices are determined and only if the other user is in the immediate vicinity. User #2's preferred mode of being contacted (in person, via telephone, via email, etc.) and relevant contact information of User #2 (telephone number, email address, etc.).

Viewable Message Variable

In addition to the above message content, there is other viewable message content which is variable in the sense that the viewable content of the message received by User #1 from User #2 depends upon the content of the message sent from User #1 to User #2. The nature of the dependency, however, can vary, the only restriction being that the possibility of circularity must be avoided. In this example of Discreet Messaging, there are four varieties of variable content, each with its own kind of dependency:

Commonalities

As part of the setup process, users input information about themselves into their device in several predetermined categories, such as their date of birth, place of birth, religion, political affiliation, etc. If the Conditions are met for each user to view a DM from the other, then all of the Commonality Data is transmitted from each user's device to the other user's device. This information, however, is not accessible to the other user. Then on each user's device, the data of the two users is compared, category by category.

For each category, if the data of both users is similar or identical, then that data will be viewed as part of the DM received from the other user. If the data is not the same, then it will not be viewable. For example, if User #1 is Catholic, a Democrat, born in Duluth, Minn., USA, and has two cats; and User #2 is Jewish, a Democrat, born in Minneapolis, Minn., USA, and has a dog; then included in the DM sent to both users is the message that the other user is a Democrat from Minnesota, USA. No mention is made of their religion or pets. The preferred method is for users to enter data by means of a questionnaire in which they choose their answers from a list of options. Alternatively, users could input their data as freeform text in answer to a menu of questions, one question per category of data. Then users' data would be compared, category by category, using a fuzzy logic algorithm to decide if an answer given by one user is the same as the answer given by the other user.

Intersecting Social Circles

There are two levels of reporting to each user the social connections they share with the other user. The first method is advantageous in that it does not require the use of an external database, but it provides less information than the second method in which both devices access a database via their wireless connection to a network.

Intersecting Social Circles Method #1

As part of the setup process, users input the names of all of their friends, family, and acquaintances into their devices. If the Conditions are met for each user to view a DM from the other, then all of the names of the people in each user's social circle are transmitted from each user's device to the other user's device. This information, however, is not accessible to the other user. Then on each user's device, the list of names associated with each user is compared. If a name on the list of both users is similar or identical, then that name will be viewed as part of the DM received from the other user. If a name is not the same, then it will not be viewable. The determination of whether two names are the same can be problematic due to the use of nicknames, initials, etc. For this reason, a fuzzy logic algorithm is employed. Errors can be made not only in the vein of false positives and false negatives in the determination of whether two names are the same (is "Jack Smith" the same name as "John Smith"?), but also errors can be made because two different people have the same name. In either case, errors are not a significant problem in that a purpose of this application is to provide a basis for conversation, and determining that "John Smith" is actually two different people can be a useful conversation for "breaking the ice".

Intersecting Social Circles Method #2

As part of the setup process, users input the names of all of their friends, family, and acquaintances into their devices or into a computer. This information is transmitted over a network to a database on a computer which stores the social circle of each user and also integrates the social circles of many users to build a social network model of all users.

If the Conditions are met for each user to view a DM from the other, then the social network database is accessed by each user. Each device reports the User ID#'s of both users to the database, which in turn determines the relationships between the two users in terms of the social links between them. These sequences of links are then transmitted over the network back to both users' devices. This relationship between users is then shown in a graphical form on users' device displays. This relationship, however, can only be determined if the social network database is complete enough. If the relationship between users cannot be determined, then this information will not be included in the DM.

Level of Interest

Each user will input into his or her own device the Level of Interest they have in the other user. This information will be transmitted to the other user's device. But the degree of interest of User #1 in User #2 which is actually displayed to User #2 is contingent not only on the degree of interest in User #2 expressed by User #1, but also on the degree of interest in User #1 expressed by User #2. The degree interest actually displayed to both parties is always the same: the lowest common degree of interest expressed by either user. For example, if User #1 is "infatuated" with User #2, but User #1 is only "interested" in User #1, then User #2 views User #1 f's degree of interest as "interested". Rather than enter this information every time a message is to be sent, the user can choose a default level of interest (e.g. "interested") but for any given situation may select a different level of interest. The user may choose from the following levels of interest:

a) interested
b) attracted
c) captivated
d) infatuated
e) in love

[A variation of Discreet Messaging is that the sender (User #1) of a DM can specify, either as a default or for each specific DM sent, that the receiver (User #2) of a DM will receive a notification that an anonymous DM has been received even if the receiver (User #2) has not sent a DM to the original sender (User #1). (User #2 is not at this point able to view the DM.) The reason that users may not opt for anonymous notification is that it is possible that the timing and circumstances of a notification that a DM has been received will give clues as to the identity of the sender, and thus serve to increase the risk of rejection or embarrassment that the sender assumes.]

In some embodiments, with Discreet Messaging it is important that users feel confident that DM'S sent will absolutely not be revealed unless the interest is mutually expressed. For this reason two additional features are included in embodiments of this system. First, DM'S are assigned an expiration date either by default, or manually by the user for each DM sent. When a DM expires it is deleted on the user's device, and also, depending on the implementation of discrete Messaging, it is deleted on the third-party database or recipient's device. Second, users have the ability to transmit a deletion command which causes the immediate deletion of any unexpired DM'S that were previously sent by the user and now reside in a third-party database or on other users' devices. [A related security feature is user's (User #1) ability to send a deletion transmission to any other user (User #2) which causes the deletion of the user's (User #1) photo and associated device ID# and network address on the recipient's (User #2) device. At the same time, all of User #2's information would be deleted on User #1's device. (described below in the "Security" section)]

Content of Outgoing Transmissions

Sending a Discreet Message may actually consist of several interactive exchanges of information among devices, involving several transmissions. (Note: This will depend somewhat on whether a third-party server or a peer-to-peer system is implemented. This description is meant primarily for the peer-to-peer system.) In this example of a dating application, the information transmitted in Part 1 of a DM includes the following:

(1) device ID#
(2) network address
(3) location data
(4) flag that "this is a DM"
(5) expiration date of the DM
(6) image of user
(7) user's Match Criteria If both parties meet all conditions, then the following is also transmitted in Part 2 of a DM:

(8) preferred method of contact and contact information
(9) personal data from which commonality is determined
(10) social circle intersection: list of names in social circle if Method #1 is used. If Method #2 is used, no further information need be transmitted.
(11) Level of Interest
(12) text message, image, audio, or video clip Operation and Flow of Information in Discreet Messaging These descriptions of Discreet Messaging ignore the technicalities of Perceptual Addressing and the various methods of transmission (which are described above), and instead focus only on the mechanics of Discreet Messaging.

Third-Party Server Solution

Figure 15A:
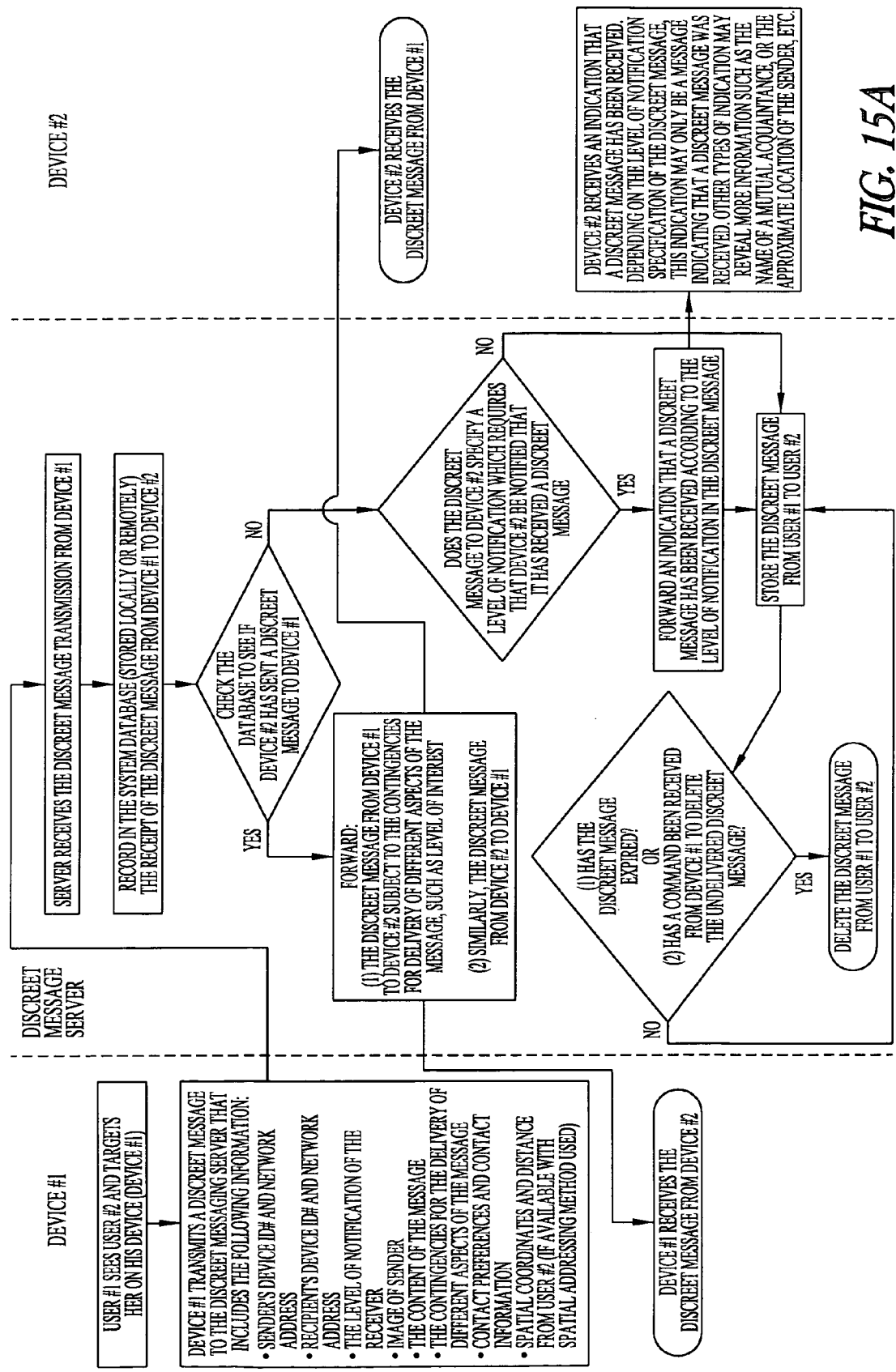
FIG. 15A depicts a flow diagram describing operations for discrete messaging between two devices using a third-party server, according to example embodiments of the invention.
Figure 15B:
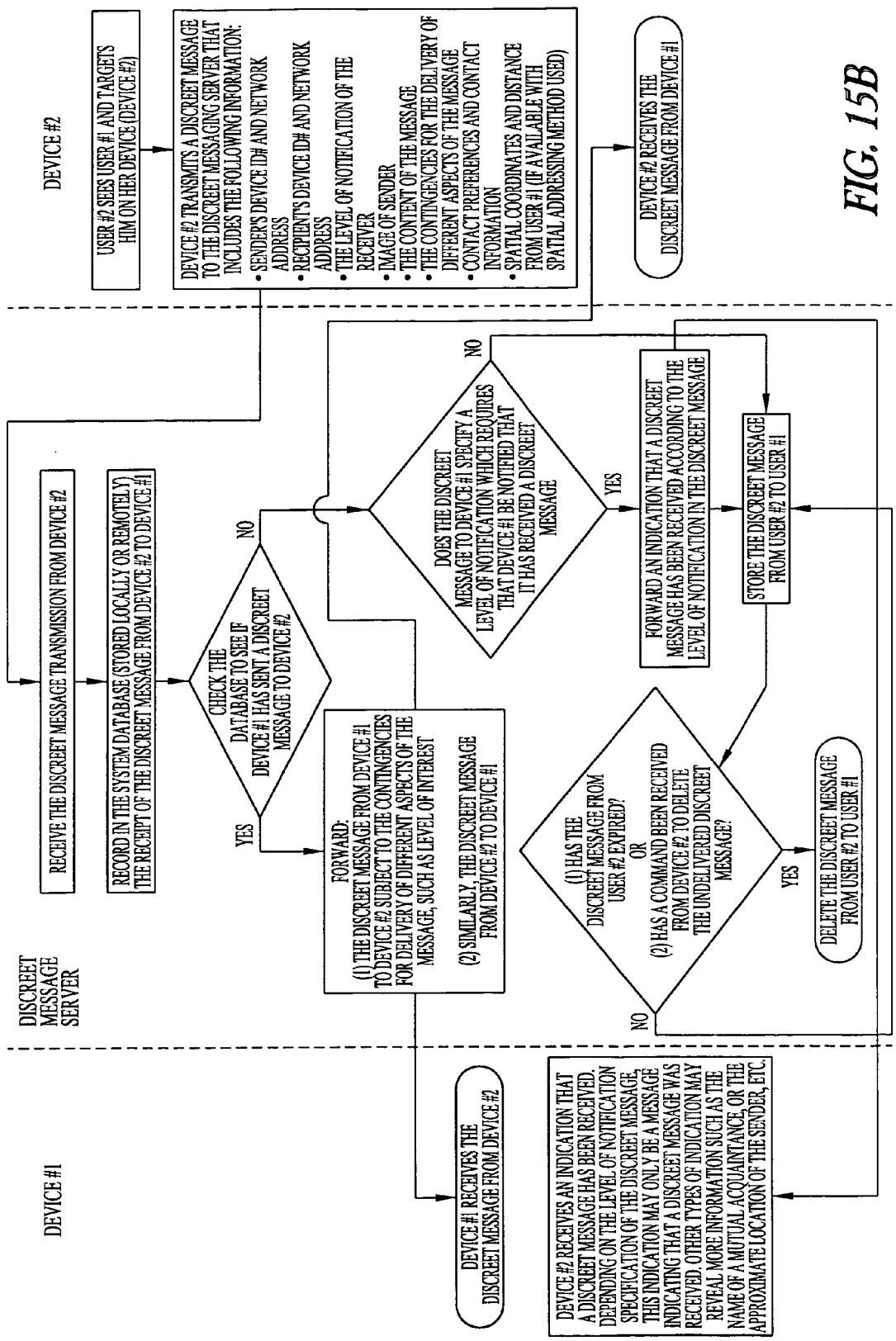
FIG. 15B depicts a flow diagram describing additional operations for discrete messaging between two devices using a third-party server, according to example embodiments of the invention.

FIGS. 15A & 15B describe in general the logical operation and flow of information among the devices of two users who send Discreet Messages to each other, together with an intermediate server and database. As stated earlier, electronic communication systems mediated by third-party servers are currently implemented for users whose email addresses or telephone numbers are already known by the senders. However, the combination of this capability of automated third-party mediated communications with Perceptual Addressing produces a powerful social communications tool because it allows mediated communications to be conducted with strangers in one's immediate environment.

Peer-to-Peer Solution

Figure 16A:
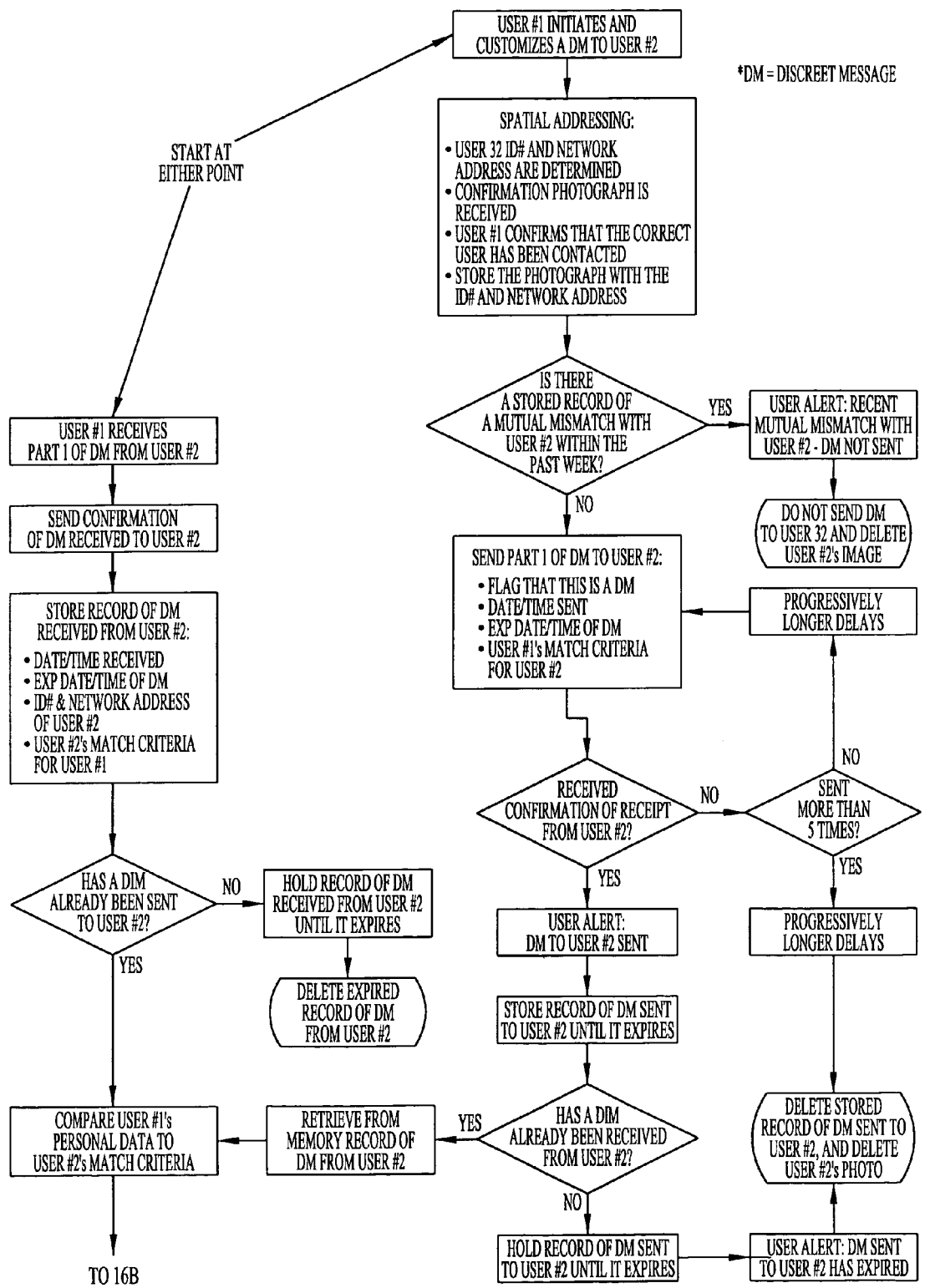
FIG. 16A depicts a flow diagram describing operations for discrete messaging in a peer-to-peer environment, according to example embodiments of the invention.
Figure 16B:
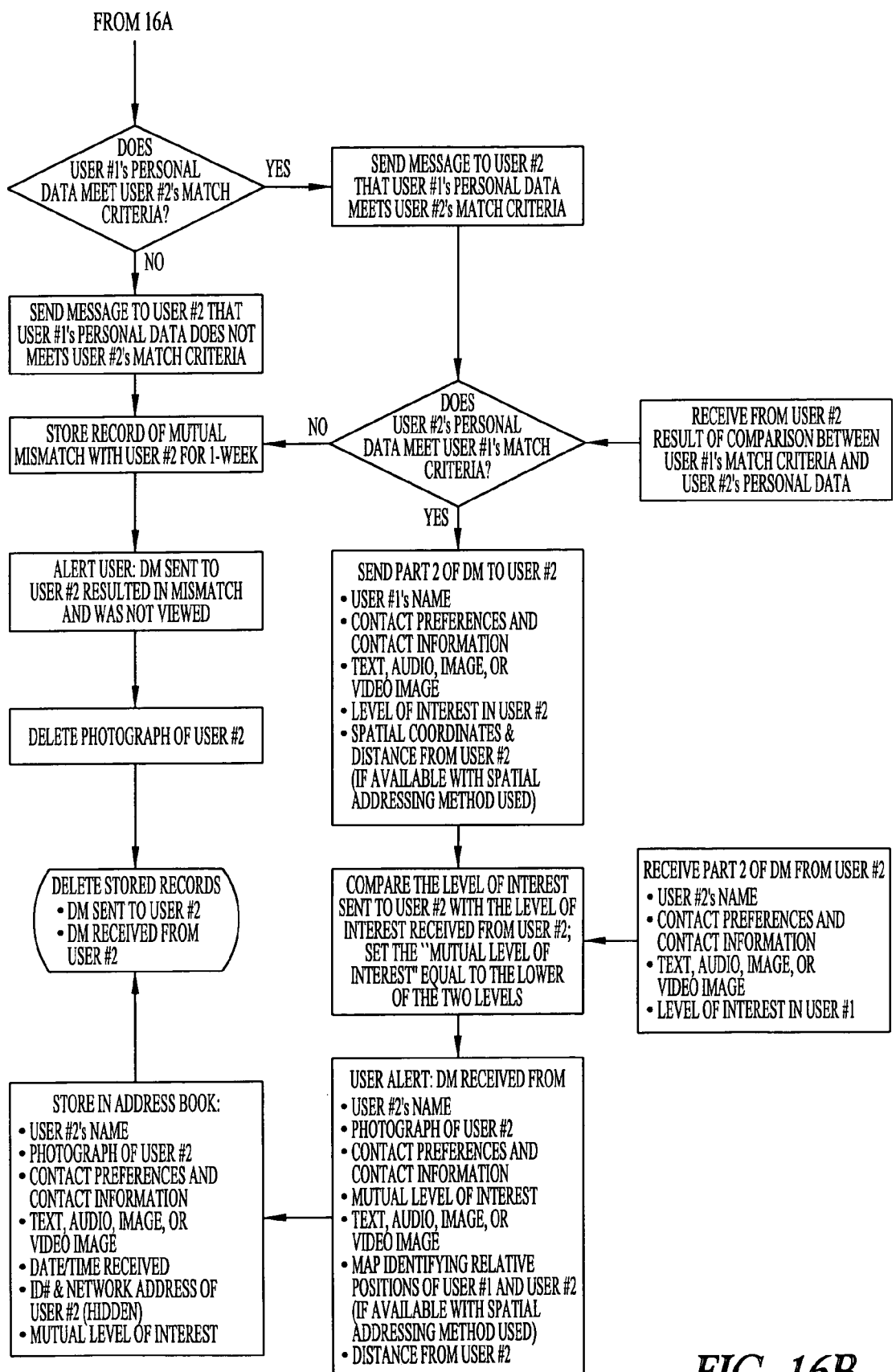
FIG. 16B depicts a flow diagram describing additional operations for discrete messaging in a peer-to-peer environment, according to example embodiments of the invention.

FIGS. 16A and 16B describe an example of the logical operation and flow of information of Discreet Messaging from the point of view of a single device. For a 2-device system, see the following step-by-step description of the operation and flow of information, in this particular application of the Discreet Messaging process. It is assumed, in this description, that the method of Perceptual Addressing used is Method #8: Location Identification & Spatial Mapping. (Note: in the following description, steps in the same horizontal level occur at approximately the same time.)

| User #1 | User #2 |
|---|---|
| 1. User #1 sees someone (User #2) that he is interested in. He targets her on his device (Device #1):<br>　(a) He looks at his device's display which shows a map of users (including himself) in the immediate area, each represented by a small symbol.<br>　(b) He selects a symbol that he believes corresponds to User #2.<br>2. Device #1 sends a transmission to the Device ID# associated with the symbol selected. The transmission includes:<br>　(a) Device #1's Device ID# and network address<br>　(b) request for image of User #2 | |
| | 3. User #2's device (Device #2) receives the request and transmits an image of User #2 to Device #1 |
| 4. Device #1<br>　(a) receives the image of User #2<br>　(b) stores the image of User #2 along with Device #2's Device ID# and network address<br>5. User #1<br>　(a) views the image of User #2 on the display of his device and confirms that the image does indeed represent the person he intended to contact<br>　(b) Because he has already prepared a default text message (which simply says "Hi, my name is David. Would you like to meet?"), and has set as a default that the recipient must satisfy his Match Criteria which he has also previously prepared, he does not need to prepare anything more.<br>　(c) He pushes a button labeled "send DM".<br>　(d) before sending the DM, Device #1 confirms that there is no record of a mutual mismatch between User #1 and User #2 created within the past week. (This is a security measure to prevent users from making systematic probes to determine the content of another user's Personal Data.)<br>6. Device #1 sends Part 1 of a DM to User #2 containing<br>　　flag that this is a DM<br>　　date and time sent<br>　　the expiration date and time of this DM, derived from the default lifetime of a DM previously set by User #1 added to the sending date/time. (User #1 could have chosen to customize the lifetime of the DM)<br>　　User #1's Match Criteria | |

-continued

| User #1 | User #2 |
|---|---|
| | 7. Device #2<br>(a) receives User #1's DM, but does NOT alert the user that a message has been received<br>(b) transmits a signal to Device #1 confirming receipt of the DM<br>(c) stores a record of the DM received including<br>    the date and time the DM was received<br>    the expiration date and time of the DM<br>    Device #1's Device ID# and network address<br>    User #1's Match Criteria<br>(d) checks it's memory to see if there is an unexpired DM that it had previously sent to User #1 and has yet to expire, and finds there is not. (The case, in which there is an unexpired record in memory of a DM previously sent to the same party from which a DM is just received, is explored from User #1's point of view in step 15.) |
| 8. Device #1<br>(a) receives the confirmation signal from Device #2<br>(b) displays an image of User #2, and a message that the DM was successfully sent<br>(c) stores a record of the DM sent to User #2, including<br>    the date and time the DM was sent<br>    the expiration date and time of the DM<br>    Device #2's Device ID# and network address<br>    Match Criteria sent to User #2<br>    image of User #2<br>(d) checks its memory to see if there is an unexpired DM that has been received from User #2, and finds that there is not. (The case in which there is already an unexpired DM in memory from the same party to whom a DM has just been sent is explored from User #2's point of view in step 16.) | |

From this point there are three possible outcomes:
i. User #2 never sends a DM to User #1, in which case
   1. User #1's DM to User #2 expires
   2. User #1's DM to User #2 stored on both Device #1 and Device #2 is deleted
   3. User #2 never knows that User #1 sent a DM to her
   4. Device #1 records in a log of DMs sent: (a) date sent, and (b) expired. (No information identifying the recipient is retained.)
ii. User #2 sends a DM to User #1 after User #1's DM to User #2 has expired. The result is the same as the previous case with the exception that after the deletion of records and creation of log entries described above, a new DM is initiated by User #2. The sequence of events that follows is accurately described beginning with step (1) above, with the exception that the names "User #1" and "User #2" are interchanged.
iii. User #2 sends a DM to User #1 before User #1's DM to User #2 expires.

This is the only case that continues beyond this point.

9. User #2 sees User #1 and is interested in him. She targets him on her device (Device #2):
   (a) She looks at her device's display which shows a map of users (including herself) in the immediate area, each represented by a small symbol.
   (b) She selects a symbol that she believes corresponds to User #1.
10. Device #2 sends a transmission to the Device ID # associated with the symbol selected. The transmission includes:
    (a) Device #2's Device ID # and network address
    (b) request for image of User #1
11. Device #1 receives the request and transmits an image of User #1 to Device #2
12. Device #2
    (a) receives the image of User #1
    (b) stores the image of User #1 along with Device #1's Device ID# and network address
13. User #2
    (a) views the image of User #1 on the display of her device and confirms that the image does indeed represent the person she intended to contact
    (b) Because she has already prepared a default text message (which simply says "Hi, my name is Michelle. I wondered if you might be interested in meeting sometime?"), and has set as a default that the recipient must satisfy her Match Criteria which she has also previously prepared, she does not need to prepare anything more.
    (c) She pushes a button labeled "send DM".
    (d) Before sending the DM, Device #2 confirms that there is no record of a mutual mismatch between User #2 and User #1 created within the past week.
14. Device #2 sends Part 1 of a DM to User #1 which contains the same type of data as User #1's message to User #2:
    flag that this is a DM
    date and time sent
    the expiration date and time of this DM
    User #2's Match Criteria
15. Device #1
    (a) receives User #2's DM, but does NOT alert User #1 that a message has been received
    (b) transmits a signal to Device #2 confirming receipt of the DM
    (c) stores a record of the DM received including
        the date and time the DM was received
        the expiration date and time of the DM
        Device #2's Device ID # and network address
        User #1's Match Criteria
    (d) checks in memory to see if there is an unexpired DM that it had previously sent to User #2, and finds that there is
    (e) compares User #2's Match Criteria with User #1's Personal Data, category by category, and determines whether or not User #1 meets User #2's match criteria.
16. Device #2
    (a) receives the confirmation signal that Device #1 received Device #2's DM
    (b) displays an image of User #1, and a message that the DM was successfully sent
    (c) stores a record of the DM sent to User #1, including
        date and time the message was sent
        expiration date and time of the message
        Device #2's Device ID # and network address
        Match Criteria sent to User #1
        image of User #1
    (d) checks memory to see if there is an unexpired DM that has been received from User #1, and finds that there is.
    (e) compares User #1's Match Criteria with User #2's Personal Data, category by category, and determines whether or not User #2 meets User #1's match criteria.

From here there are four possible outcomes:

i. User #1 does not meet User #2's Match Criteria, but User #2 does meet User #1's Match Criteria
ii. User #2 does not meet User #1's Match Criteria, but User #1 does meet User #2's Match Criteria
iii. Neither user meets the Match Criteria of the other iv. Both users meet the Match Criteria of the other These four possible outcomes are described in detail as follows:

| Device #1: | Device #2: |
|---|---|
| (i) User #1 does not meet User #2's Match Criteria, but User #2 does meet User #1's Match Criteria | |
| (a) alerts User #1 with a vibration or auditory signal | (a) sends a message to Device #1 that User #2's Personal Data meets User #1's Match Criteria |
| (b) displays an image of User #2, and a message that the DM User #1 sent to User #2 resulted in a mismatch and was not viewed. (NOTE: User #1 is not aware if the mismatch was a result of his data not meeting User #2's Match Criteria, or if it was the result of User #2's Personal Data not meeting his Match Criteria.) | |
| (c) sends a message to Device #2 that User #1's Personal Data does not meet User #2's Match Criteria. | |
| (d) stores a record of the mutual mismatch with User #2 for one week | |
| (e) deletes the image of User #2, deletes the record stored in memory of the DM sent to User #2, and deletes the record of the DM received from User #2 | |
| (a) ignore message from Device #2 that User #2's Personal Data meets User #1's Match Criteria | (a) receives a transmission from User #1 that User #1's Personal Data does not meet User #2's Match Criteria |
| | (b) alerts User #2 with a vibration or auditory signal |
| | (c) displays an image of User #1, and a message that the DM User #2 sent to User #1 resulted in a mismatch and was not viewed. (NOTE: User #2 is not aware if the mismatch was a result of her data not meeting User #1's Match Criteria, or if it was the result of User #1's Personal Data not meeting her Match Criteria.) |
| | (d) stores a record of the mutual mismatch with User #1 for one week |
| | (e) deletes the image of User #1, deletes the record stored in memory of the DM sent to User #1, and deletes the record of the DM received from User #1 |
| (ii) User #2 does not meet User #1's Match Criteria | |
| (a) sends a message to Device #2 that User #1's Personal Data meets User #2's Match Criteria | (a) alerts User #1 with a vibration or auditory signal |
| | (b) displays an image of User #1, and a message that the DM User #2 sent to User #1 resulted in a mismatch and was not viewed. (NOTE: User #2 is not aware if the mismatch was a result of her data not meeting User #2's Match Criteria, or if it was the result of User #2's Personal Data not meeting her Match Criteria.) |
| | (c) sends a message to Device #1 that User #2's Personal Data does not meet User #1's Match Criteria. |
| | (d) stores a record of the mutual mismatch with User #1 for one week |
| | (e) deletes the image of User #1, deletes the record stored in memory of the DM sent to User #1, and deletes the record of the DM received from User #1 |
| (a) receives a transmission from User #2 that User #2's Personal Data does not meet User #1's Match Criteria | (a) ignores message from Device #1 that User #1's Personal Data meets User #2's Match Criteria |
| (b) alerts User #1 with a vibration or auditory signal | |
| (c) displays an image of User #2, and a message that the DM User #1 sent to User #2 resulted in a mismatch and was not viewed. (NOTE: User #1 is not aware of whether the mismatch was a result of his data not meeting User #2's Match Criteria, or if it was the result of User #2's Personal Data not meeting his Match Criteria.) | |
| (d) stores a record of the mutual mismatch with User #2 for one week | |
| (e) deletes the image of User #2, deletes the record stored in memory of the DM sent to User #2, and deletes the record of the DM received from User #2 | |
| (iii) Neither user meets the Match Criteria of the other | |
| (a) alerts User #1 with a vibration or auditory signal | (a) alerts User #1 with a vibration or auditory signal |
| (b) displays an image of User #2, and a message that the DM User #1 sent to User #2 resulted in a mismatch and was not viewed (NOTE: User #1 is not aware if the mismatch was a result of his data not meeting User #2's Match Criteria, or if it was the result of User #2's Personal Data not meeting his Match Criteria.) | (b) displays an image of User #1, and a message that the DM User #2 sent to User #1 resulted in a mismatch and was not viewed. (NOTE: User #2 is not aware if the mismatch was a result of her data not meeting User #2's Match Criteria, or if it was the result of User #2's Personal Data not meeting her Match Criteria.) |
| (c) sends a message to Device #2 that User #1's Personal Data does not meet User #2's Match Criteria, | (c) sends a message to Device #1 that User #2's Personal |

-continued

| Device #1: | Device #2: |
|---|---|
| (d) stores a record of the mutual mismatch with User #2 for one week | Data does not meet User #1's Match Criteria. |
| (e) deletes the image of User #2, deletes the record stored in memory of the DM sent to User #2, and deletes the record of the DM received from User#2 | (d) stores a record of the mutual mismatch with User #1 for one week |
| | (e) deletes the image of User #1, deletes the record stored in memory of the DM sent to User #1, and deletes the record of the DM received from User #1 |
| (a) ignore message from Device #2 that User #2's Personal Data meets User #1's Match Criteria | (a) ignores message from Device #1 that User #1's Personal Data meets User #2's Match Criteria |
| (iv) Both users meet the Match Criteria of the other. This is the only case that continues beyond this point. ||
| (a) sends a message to Device #2 that User #1's Personal Data meets User #2's Match Criteria | (a) sends a message to Device #1 that User #2's Personal Data meets User #1's Match Criteria |
| (a) receives message from Device #2 that User #2's Personal Data meets User #1's Match Criteria | (a) receives message from Device #1 that User #1's Personal Data meets User #2's Match Criteria |
| (a) Sends Part 2 of User #1's DM to User #2<br>User #1's name or alias<br>User #1's spatial co-ordinates and distance from User #2 (if spatial coordinates are available with the method of Perceptual Addressing used, and also if User #1 is in the same vicinity as User #2)<br>User #1's contact preferences and contact information<br>text, audio, image, or video message<br>User #1's Level of Interest in User #2 | (a) sends Part 2 of User #2's DM to User #1<br>User #2's name or alias<br>User #2's spatial co-ordinates and distance from User #1 (if spatial coordinates are available with the method of Perceptual Addressing used, and also if User #2 is in the same vicinity as User #1)<br>User #2's contact preferences and contact information<br>text, audio, image, or video message<br>User #2's Level of Interest in User #1 |
| (a) receives Part 2 of User #2's DM to User #1 | (c) receives Part 2 of User #1's DM to User #2 |
| (b) compares User #1's Level of Interest in User #2 with User #2's Level of Interest in User #1, and sets the "Mutual Level of Interest" equal to the lower of the two levels | (d) compares User #2's Level of Interest in User #1 with User #1's Level of Interest in User #2, and sets the "Mutual Level of Interest" equal to the lower of the two levels |
| (a) alerts User #1 that a DM has been received with a signal (vibration or auditory tone, for example) | (c) alerts User #2 that a DM has been received with a signal (vibration or auditory tone, for example) |
| (b) displays:<br>image of User #2<br>User #2's name or alias<br>User #2's contact preferences and contact information<br>Mutual Level of Interest message (text or audio, for example) from User #2<br>distance from User #1 (if spatial coordinates are available with the method of Spatial Addressing used, and also if User #2 is in the same vicinity as User #1)<br>map identifying relative positions of Users #1 and #2 (if spatial coordinates are available with the method of Spatial Addressing used, and also if User #2 is in the same vicinity as User #1) | (d) displays:<br>image of User #1<br>User #1's name or alias<br>User #1's contact preferences and contact information<br>Mutual Level of Interest message (text or audio, for example) from User #1<br>distance from User #2 (if spatial coordinates are available with the method of Spatial Addressing used, and also if User #1 is in the same vicinity as User #2)<br>map identifying relative positions of Users #1 and #2 (if spatial coordinates are available with the method of Spatial Addressing used, and also if User #1 is in the same vicinity as User #2) |
| (a) store in "Address Book":<br>User #2's name or alias<br>image of User #2<br>User #2's contact preferences and contact information<br>Mutual Level of Interest message (text or audio, for example) from User #2<br>date/time DM received<br>Device ID#and network address of User #2 (hidden data) | (c) store in "Address Book":<br>User #1's name or alias<br>image of User #1<br>User #1's contact preferences and contact information<br>Mutual Level of Interest message (text or audio, for example) from User #1<br>date/time DM received<br>Device ID#and network address of User #1 (hidden data) |
| (b) delete stored records:<br>DM sent to User #2<br>DM received from User #2 | (d) delete stored records:<br>DM sent to User #1<br>DM received from User #1 |

V. Security

A user has the ability to ban all future communications from any particular user. This consists of a permanent non-response to all transmissions from that user's device.

Users don't have direct access to device ID#'s or network addresses of other users. They address communications to other users by selecting the image of the user with which they wish to communicate.

Images, device ID#'s, and network addresses that are received for confirmation purposes self-delete within a short time (measured in seconds or minutes) if not used to send a message.

User #1 has the ability to instruct her device (Device #1) to issue an "erase" command to any other device (Device #2) at any time, as long as Device #1 has Device #2's device ID# and network address. This erase command causes the erasure of User #1's image, device ID# and network address from Device #2. But at the same time, Device #2's information is also erased from Device #1.

Users are able to deactivate participation in any of the features offered independently. For example, a user may want to maintain the capability of receiving Discreet Messages while at the same time may not want to receive regular (non-Discreet) messages.

There is no capability of exporting from a device any information about other users.

All communications between devices is encrypted with a common system-wide key to prevent non-system devices from eavesdropping. This key is periodically changed, and the new key is automatically propagated and installed from device to device, whenever devices communicate. Devices retain previous keys in order to be able to communicate with other devices that have not yet been updated. The ability to automatically install a new encryption key is guarded by a system-wide password stored in the firmware of all devices, and invoked in all legitimate encryption key updates.

Section VI

Section Overview

A purpose of embodiments of this invention is to facilitate communication between people that are within "perceptual proximity" of each other, i.e. they are physically close enough to each other that one person can perceive the other, either visually or aurally. (The term, "recognition proximity", has been used in previous descriptions of perceptual proximity.) Embodiments of this invention are partially embodied in the form of a small mobile device, either its own dedicated device, or as enhanced functionality to other mobile devices such as, for example, PDA's (personal digital assistants) or cellular telephones. The device may include a small digital camera which can record both single still images as well as video images, the means to enter text and record audio, the ability to transfer information (text, audio, image, or video) from a computer to the device as an alternative to entering information directly into the device, the ability to display text or images and playback audio or video, a programmable microprocessor, and memory storage and retrieval functions—all commonly available features on today's cellular telephones and PDA's. In addition, the device may have additional hardware capabilities.

Embodiments of this invention work by providing a user with the ability to communicate electronically (text, voice, image, or video) to specific other individuals (or vehicles—automobiles, motorcycles, etc.) in his or her physical environment that have been identified visually or aurally, but for whom contact information (telephone number, email address, etc.) may not be known. It is expected that embodiments of invention will be to facilitate romantic relationships, although other social, business, civic or military applications can be foreseen.

Because embodiments of this invention allow one person to contact another electronically with only the knowledge of the other person given by the sight or sound of that person in the environment, this capability is referred to as "Perceptual Addressing". In previous patent applications this capability has also been referred to as "Spatial Addressing" or "Visual Addressing".

DEFINITION

Perceptual Addressing

Perceptual Addressing is the ability for one person, User #1, to establish an electronic communications channel with another person, User #2, that User #1 can perceive in his or her physical environment but for whom no contact information is known.

Example #1 of Perceptual Addressing

Bob is riding a crowded city bus. At the next stop he notices an attractive woman, Sarah, get on the bus and make eye contact with him before taking a seat a few rows in front of him. He knows he will never see her again unless he acts immediately. So using his handheld device, he sends to her a brief message which includes a photo of himself as well as his contact information—the telephone number of his mobile phone. He does this by first taking a picture of her with his mobile phone; then, viewing the image of her on the display of his phone, he circles her face and presses the send button. He immediately receives a confirmation message saying "message delivered". He hopes she will respond to his message.

Example #2 of Perceptual Addressing

John is driving from Seattle to San Francisco. It is getting late, and he needs to find a hotel for the night. He is driving behind a pickup truck and thinks that perhaps the driver can recommend a place to stay nearby. He takes out his mobile device and presses a button. He sees two license plate numbers displayed. He selects the one that corresponds to the truck in front of him. He then holds his device to his ear. Just then, Pete, in the pickup truck in front of John, picks up his mobile device and sees on its display, "call from license plate # AYK-334". Pete then presses a button and says "how's it going?" They proceed to have a brief cellular telephone conversation in which John asks about hotels in the area and Pete makes a couple of recommendations.

Modes of Communication

Once a communications channel between terminals is established, Perceptual Addressing is agnostic with respect to the form of the subsequent communications. These communications can be in the form of individual messages sent from one person to another or can be in the form of live interactive audio and/or video communications; and the content of these communications can consist of any form of media including text, images, video, and voice. Devices in the same vicinity can communicate with each other via direct device-to-device transmission, or alternatively, devices can communicate via a wireless connection to a network—the internet, cellular telephone network, or some other network. The communication may also be mediated by a remote data processing system (DPS).

Embodiments of this invention are compatible with a wide variety of methods of transmitting information and, depending upon the method of Perceptual Addressing used, may include more than one mode of transmission. The modes of wireless transmission could include various technologies, frequencies and protocols—for example, radio frequency (RF), infrared (IR), Bluetooth, Ultra Wide Band (UWB), WiFi (802.11) or any other suitable wireless transmission technology currently known or yet to be invented. In addition to wireless means of transmission, non-wireless means may also be used if practical.

Note Regarding Methods of Determining Spatial Position:

Several methods of Perceptual Addressing depend upon the ability to determine the spatial position of users and their potential targets. These methods sometimes require the use of a spatial position measurement technology that allows the determination of position to an accuracy of several centimeters. The particular method of determining position is not central to embodiments of this invention and any method currently known or yet to be invented that meet the basic criteria would suffice. (As an example, the method described in the paper "A High Performance Privacy-Oriented Location System" in *Proceedings of the First IEEE International Conference on Pervasive Computing and Communications (PerCom*2003), pages 216-223, would be adequate. Other positioning systems, for example, incorporating GPS, WiFi, UWB, RF triangulation, infrared, ultrasound, RFID, or any other technologies which would allow the position of each device to be accurately determined within several centimeters would also be adequate.

Theory of Perceptual Addressing

There are two essential, non-sequential tasks that are central to Perceptual Addressing.

1. The user of a device embodying embodiments of the present invention specify one target person or target vehicle, out of potentially many possible target persons/vehicles in the user's perceptual proximity, by expressing one or more of the target's distinguishing characteristic(s).

Perceptual proximity is here defined as a range of physical distances such that one person is in the perceptual proximity of another person if he or she can distinguish that person from another person using either the sense of sight or the sense of hearing. A distinguishing characteristic is a characteristic of the target person or target vehicle, as experienced by the user, that distinguishes the target person or target vehicle from other people or vehicles in the user's perceptual proximity. There are three types of distinguishing characteristics of a target person or target vehicle: visual appearance, spatial position relative to the user and other objects in the observer's perceptual field, and voice quality.

The user of embodiments of this invention specify the target by expressing his or her perception of the distinguishing characteristic in one of two ways: (1) Direct expression of a distinguishing characteristic of the target person/vehicle, or (2) Selection from presented descriptions of distinguishing characteristics of people/vehicles in the user's perceptual proximity. Examples of Direct Expression are: (a) the user expresses the target's relative position by pointing the camera on his or her device and capturing an image of the target; or (b) the user expresses the appearance of a license plate number by writing that number. Examples of Selection are: (a) the user selects one representation of position, out of several representations of position that are presented, that is most similar to the way the user perceives the target's position; (b) the user selects one image out of several presented that is most similar to the appearance of the target; (c) the user selects one voice sample out of several presented that is most similar to the sound of the target's voice.

The selection of a target person based upon distinguishing characteristics can occur in one or more stages, each stage possibly using a different distinguishing characteristic. Each stage will usually reduce the pool of potential target people/vehicles until there is only one person/vehicle left—the target person/vehicle.

2. An association is made between the expression of the distinguishing characteristic(s) of the target person/vehicle and the address of the target's telecommunications terminal.

Examples of this association: (a) The act of pointing a camera (integrated in a user's device) at a target person (to capture biometric data) associates the relative position of the target person (distinguishing characteristic) as expressed by the user with the biometric profile of the target person. Then using a database, the biometric profile is found to be associated with the address of the target's terminal. (b) A data processing system sends to the user's device ten images linked with ten addresses of ten people in a user's perceptual proximity. The user compares his or her visual experience of the target person (distinguishing characteristic) with his or her visual experience of each of the ten images displayed on his or her device, and then expresses his or her experience of the appearance of the visual appearance of the target by choosing an image that produces the most similar visual experience. Because the ten images were already associated with ten telecommunication addresses, by selecting the image of the target, an association can immediately be made to the target's address. (c) A user points a camera at a target person and takes a picture, thus associating the experienced relative position of the target (distinguishing characteristic) with the captured image. But because there are several people in the image just captured, the user circles the portion of the image that produces a visual experience that is most similar to the experience of viewing the face of the target person (distinguishing characteristic). The image or the target person's face is subjected to a biometric analysis to produce a biometric profile. This profile is then found to be associated with the target person's telecommunications address in a database.

This associative process may occur on the user's terminal, on the terminals of other users, on a data processing system, or any combination. Once the correct address of the intended recipient has been determined, the Perceptual Addressing task has been completed. There are no restrictions on the varieties of subsequent communication between terminals.

Methods of Perceptual Addressing

Following are descriptions of several different methods of Perceptual Addressing. These methods may be used alone or in combination.

Method #1: Non-Directional Transmission

A non-directional signal is broadcast to all devices in perceptual proximity. The signal contains the device ID# and network address of the transmitting device (Device #1) as well as a request for all receiving devices to send their own device ID#'s and addresses as well as a thumbnail image (or voice sample) of their user to the requesting device. The user initiating the request (User #1) reviews all the images (or voice samples) received, and then by selecting the image (or voice sample) of the person that she is trying to contact (User #2), the user is actually selecting the address of User #2's device (Device #2). With this method a user will receive as many images (or voice samples) as there are users in the area. Some advantages of this method are: a) it doesn't require that the user be particularly close to the target; and b) it is currently viable everywhere because it doesn't require the existence of a location technology infrastructure. This method includes the following steps:

(1) User #1 sees (or hears) someone, User #2, to whom she wants to communicate, and instructs her device using the device interface (she presses a button, for example) to contact all other devices in the perceptual proximity and obtain images (or voice samples) of their users.

(2) User #1's device (Device #1) then broadcasts a non-directional unaddressed transmission to all other devices within range. The transmission includes User #1's device ID# and network address, as well as a request that images (or voice samples) be sent to Device #1.

(3) Each device receiving the request responds automatically (without user awareness) with a transmission addressed to Device #1, sending its own device ID# and network address, as well as an image (or voice sample) of its user. (Only Device #1 will receive these transmissions as other devices will ignore an addressed transmission if it is not addressed to them.)

(4) User #1 reviews the images (or voice samples) received from all devices and selects the image (or voice sample) of User #2, thereby selecting Device #2's device ID# and network address.

(5) Device #1 can now initiate communications with User #2 using Device #2's network address.

Method #2: Non-Directional Transmission to Devices within a Limited Radius

This method is identical to Method #1 with the modification that the initial request for user images (or voice samples) is made with a more limited signal strength, requiring User #1 to be within a few feet of the target person (User #2), thus limiting the number of other devices that will be contacted, and in turn limiting the number of images (or voice samples) that will be received. There are two different user options for how to control signal strength: (a) the user specifies a desired radius of effectiveness (selection may be made in terms of a unit of distance, "5 feet", for example, or in terms of general ranges, "far", "medium", and "close", for example) which then determines the signal strength; or (b) the user specifies the maximum number of people (selection may be made in terms of specific numbers of people, "3 people", for example, or in terms of general numbers of people, "very few", "some", or "many", for example) that should be contacted: the signal strength then starts at a very low level and increases until the maximum number of people have been contacted (as measured by the number of responses received). The initial transmission requests device ID#'s, network addresses, and associated images (or voice samples). User #1 then selects the image (or voice sample) corresponding to the intended recipient, thus selecting the device ID# and network address of the correct target. This method includes the following steps:

(1) User #1 sets the default transmission distance on her device ("5 feet", for example).
(2) User #1 sees (or hears) someone, User #2, to whom she wants to communicate. She walks to within five feet of User #2 and instructs her device (Device #1) via its user interface (she presses a button, for example) to contact all other devices within five feet, and obtain device ID#'s, network addresses, and images (or voice samples) from each device. (Alternatively, User #1 could have controlled the signal strength of the initial broadcasted request by specifying the maximum number of people that should be contacted so that her device gradually increased signal strength until the maximum number of responses is received. If she had sent the maximum equal to one person, the result would be that only the person closest to her would be contacted.)
(3) Device #1 broadcasts a non-directional transmission to other devices with enough signal strength to effectively reach approximately 5 feet, under "normal" conditions. The transmission includes Device #1's device ID# and network address, as well as a request for the device ID#, network address, and image (or voice sample) from other devices.
(4) Each device receiving the request responds with a transmission addressed to the device making the request, sending its own device ID# and network address as well as an image (or voice sample) of its user.
(5) Device #1 receives the device ID#'s, network addresses, and images (or voice samples) from all other users in the area.
(6) User #1 selects the image (or voice sample) of User #2, thereby selecting User #2's device ID# and network address.
(7) Device #1 can now initiate communications with User #2 using Device #2's network address.

Method #3: Non-Directional Transmission to Devices within a Specified Radius

This method is identical to Method #2 with the modification that the number of other users contacted is not governed by modulating signal strength, but rather by measuring the distance between users and requiring that the recipient of the initial communication is within a specified distance from the requesting device. This feature allows the user (User #1 using Device #1) to limit the number of other devices that are contacted, and therefore limit the number of images (or voice samples) that will be received. There are two different user options for how to regulate the radius of contact (i.e. the distance from the user beyond which another person will not be contacted): (a) User #1 specifies a desired radius of effectiveness (selection may be made in terms of a unit of distance, "5 feet", for example, or in terms of general ranges, "far", "medium", and "close", for example); or (b) User #1 specifies the maximum number of people (selection may be made in terms of specific numbers of people, "3 people", for example, or in terms of general numbers of people, "few", "some", or "many", for example) that should be contacted: the radius of contact then starts at a small distance and increases until the specified number of people have been contacted (as measured by the number of responses received), or until a maximum distance has been reached (approximately corresponding to the limit of the user's perceptual proximity). In configuring embodiments of this system, the distance between terminals can be measured by either the instigating terminal or the receiving terminals. If measured by the receiving terminals, then they will respond only if the distance is within the communicated radius of contact. The particular method of measuring the distance between terminals is not central to this method, but one that will suffice is for each terminal to determine its own position (via GPS or some other means) and then to compare with the reported position of the other terminal. The initial broadcasted transmission reports Device #1's ID, address, position, and radius of contact; and requests of receiving terminals within the radius of contact their device [Mrs, network addresses, and associated images (or voice samples). Receiving devices respond with the requested information if within the radius of contact. After receiving the requested images (or voice samples), User #1 then selects the image (or voice sample) corresponding to the intended target person or vehicle, thus selecting the device ID# and network address of the correct target.

Method #4: Directional Transmission to Other Users' Devices

This method is identical to Method #1 except that instead of Device #1 making an initial transmission in all directions, the transmission is focused in a relatively narrow beam toward the target person (User #2), thus reducing the number of other users contacted by the transmission, while at the same time allowing User #1 to be at a relative distance from User #2. The transmission uses frequencies in the range of 100 GHz to sub-infrared in order to balance the dual needs of creating a highly directional transmission from a small handheld device with the need to penetrate barriers (such as clothing and bodies) between the transmitting device and receiving device. This method includes the following steps:

(1) User #1 sees someone, User #2, to whom she wants to communicate. She aims her device (Device #1) at User #2. User #1 instructs her device via its user interface (she presses a button, for example) to contact all other devices in the direction of User #2 and obtain device ID#'s, network addresses, and images of those users.
(2) User #1's device (Device #1) sends a directional transmission to all other devices in the target user's direction. The transmission includes Device #1's device ID# and network address, as well as a request that images be sent to User #1.
(3) Each device receiving the transmission responds with a transmission addressed to Device #1, sending its own device ID# and network address, as well as an image of its user.

Device #1 receives device ID#'s, network addresses, and images from all other local users in the direction of User #2.

(4) From the images received, User #1 selects the image of User #2, thereby selecting the device ID# and network address of User #2's device, Device #2.
(5) Device #1 can now initiate communications with User #2 using Device #2's network address.

Method #5: Directional Transmission to RFID Tags

As an alternative to configuring a directional transmission that will penetrate obstructions, the emphasis is placed on a high frequency highly directional beam (infrared, for example) without regard for its penetration properties. It involves the use of one or more tiny Radio Frequency Identification Tags (RFID) tags clipped onto the outside of clothing of each user which, when scanned by the devices of other users, transmits the device ID# of the target user's own device to the interrogating device. In order to scan the RFID tag(s) of a target user, devices have highly directional scanning capability using a high-frequency signal (infrared, for example). User #1 points her device (Device #1) toward the person of interest (User #2). Then, depending on how highly focused the scan and how accurate the aim of User #1, the beam will contact the RFID tags of one or more individuals, including User #2, which will then transmit device ID#(s) back to Device #1. Device #1 then sends a non-directional transmission addressed to each of the devices contacted. The transmission contains User #1's device ID# and network address, and also a request for an image of the other users. After images are received from all the devices contacted, User #1 selects the image of the intended recipient, User #2, thus addressing a communication to only that individual. With this method a line of sight is required between User #1's device and the RFID tags of other users, and there is a range limitation as to how far passive RFID tags can transmit back to the scanning device. This method includes the following steps:

(1) User #1 sees someone, User #2, to whom she wants to communicate. She aims her device (Device #1) at User #2. User #1 instructs her device via its user interface (she presses a button, for example) to contact all other devices in the direction of User #2.
(2) Device #1 transmits a high-frequency (infrared, for example) directional signal in the direction of User #2. This signal, containing Device #1's device ID# makes contact with the RFID tags of one or more users.
(3) Each RFID tag which receives the transmission from Device #1 then makes a transmission addressed to Device #1's device ID# and containing the device ID# of its user.
(4) Device #1 receives the device ID#'s from all RFID tags contacted and then sends a non-directional transmission addressed to each of those device ID#'s. These transmissions include Device #1's device ID# and network address as well as a request for an image of the user. If any of the other devices cannot be contacted with a direct transmission because they are now out of the immediate area, or for some other reason, then a transmission is made to the device's network address.
(5) Each device receiving a request for an image then transmits a user's image to Device #1.
(6) Device #1 receives all user images and displays them. User #1 selects the image of the user she intended to contact, User #2, thereby selecting Device #2's device ID# and network address.
(7) Device #1 can now initiate communications with User #2 using Device #2's network address.

Method #6: Non-Directional Transmission to RFID Tags

This method is identical to the previous method (Method #5) with two differences: (a) The transmission to scan the target person's RFID tag is non-directional; (b) Because the scanning is non-directional, scanning must be very short range. In order to select the person of interest, User #1 must stand very close to User #2 when activating the scanning transmission. It is also important that User #1 makes sure that there are not any other users within scanning distance.

Method #7: Directional Transmission to Intermediate RFID Tags

Similar to Method #5, RFID tags are worn by users who receive highly directional high-frequency transmissions from User #1's device (Device #1). But instead of transmitting a high frequency signal back to the Device #1, the RFID tag converts the incoming signal to a relatively low frequency radio frequency (RF) signal (that easily penetrates clothing and bodies) and then transmits this RF signal to its owner's device (at most only two or three feet away) by addressing it with the device's device ID#. As this signal carries Device #1's Device ID, network address, and a request for a user image, after receiving the signal the target device makes a non-directional transmission addressed Device #1, sending its own device ID#, network address, and an image of its user. User #1 then needs only select the image of the person she intended to contact, User #2, in order to address subsequent transmissions to that person. Because the RFID tags do not transmit back to the initiating device, this solution does not have the range limitations of the previous method, although it still requires a line of sight between the device of the sender and the RFID tag of the receiver. This method includes the following steps:

(1) User #1 sees someone, User #2, to whom she wants to communicate. User #1 aims her device (Device #1) at User #2 and instructs her device via its user interface (she presses a button, for example) to contact all other devices in the direction of User #2.
(2) Device #1 transmits a high-frequency (infrared, for example) directional signal in the direction of User #2. This signal, containing Device #1's device ID# makes contact with the RFID tags of one or more users.
(3) Each RFID tag contacted then transforms the signal to a much lower RF frequency and then transmits the same information, addressed to its user's device ID#. A low power transmission is adequate as the signal has to travel only a few feet (for example, from the RFID tag on the target person's lapel to the device in the target person's pocket).
(4) After receiving the transmission, the receiving device makes a transmission addressed to Device #1's device ID# which includes the recipient device's device ID# as well as an image of the recipient.
(5) Device #1 will receive and display one image for every device contacted. User #1 selects the image of the user she intended to contact, User #2, thereby selecting Device #2's device ID# and network address.
(6) Device #1 can now initiate communications with User #2 using Device #2's network address.

Method #8: DPS Managed Image Identification

This method is similar to Method #1 with the exception that the images of nearby users, instead of being sent from the nearby devices themselves, are sent from a data processing system (DPS) which also mediates communication between devices. The DPS of this application has access to location information of all users (using GPS or some other means) as well as a database of all users containing their addresses, device ID#'s, and facial images. Upon request the DPS is able to send images of proximal users within a pre-defined distance to a requesting device. This method includes the following steps:

(1) User #1 sees someone, User #2, to whom she wants to communicate, and instructs her device, using the device interface (she presses a button, for example), to contact the DPS and request images of other users currently in her proximity.
(2) User #1's device (Device #1) then transmits a request to the DPS. The transmission includes User #1's device ID# and network address, as well as a request that images be sent to Device #1.
(3) The DPS retrieves the location information and determines which other users are within viewing distance of User #1. The DPS then transmits the images of those other users along with their associated device ID#'s to Device #1.

(4) User #1 reviews the images received and selects the image of User #2, thereby selecting Device #2's device ID#.

(5) Device #1 initiates an addressed communication to Device #2 via the DPS by specifying Device #2's device ID#.

Method #9: Location Identification & Spatial Mapping

In this method each user's device determines its own location coordinates periodically (at least once per second is recommended), and broadcasts periodically (at least once per second is recommended) those coordinates, along with the device's device ID#, to other devices sharing this application in the perceptual proximity. (It would also be an acceptable solution for a centralized system to track the location of all devices and transmit to all devices the locations, device ID#'s and network addresses of all devices local to each device, updating that information periodically.) Devices can have periodically updated position information about all local devices in order to take into account the motion of users. It should be noted that location coordinates need not be globally valid—locally valid coordinates are sufficient. Each device is therefore aware of the positions of all other devices nearby—both their device ID#'s and location coordinates. Devices then have the information to display a two dimensional self-updating map of all other users in the perceptual proximity in which each user is represented by a small symbol. A device ID# and network address is associated with each symbol so that a user need only select the symbol associated with a particular person to address a transmission to that person.

To contact a person of interest, User #1 first views the map on her device and compares the configuration of symbols on the map with the configuration of people before her. She then selects the symbol on the map which she believes corresponds to the intended recipient. Her device (Device #1) then makes a transmission to User #2's device (Device #2) containing Device #1's device ID# and network address and a request for an image of User #2. Device #2 then transmits an image of User #2 to Device #1. User #1 then compares the image received to the actual appearance of the person she intended to contact. If she determines that she has contacted the correct person, then she instructs her device via the user interface to initiate communications with User #2. If, on the other hand, the image that User #1 received does not correspond to the person that User #1 intended to contact, then User #1 may select another symbol which could possibly represent the person she wants to contact.

[An alternate version of this method would not require the constant periodic updating of position information during periods in which there are no users in a local area performing perceptual addressing functions. Instead, this same process would operate only when initiated by a user via the user interface of his or her device (pressing a button, for example). Upon initiation, Device #1 would determine its own position (periodically for the next several minutes) and also broadcast a request for positions and addresses of all other devices in the vicinity. Upon receiving this request, each device would determine its own position (periodically for the next several minutes) and also broadcast (periodically for the next several minutes) its position and address. The rest of this alternate method is the same as the original method. The advantage of this alternate method is that it would save energy and bandwidth for devices not to be determining and broadcasting position when it is not needed or used. The disadvantage is that there is a short delay between the time User #1 initiates the positioning process and the time all user's positions are displayed on her device.

Yet another alternate version entails the above alternate method with the following changes: All devices maintain time synchronization to one-second accuracy by means of periodic time broadcasts via a network from a DPS. All devices constantly update their position—at least once per second—and record what position they are at each point in time. This data is saved for a trailing time period, 10 seconds for example. Then, when a device makes a request of other devices for positions and network addresses, the request specifies the precise time for which position information is sought. Using this second alternative method then, devices only transmit their positions when there is a request for position information, yet there is no inaccuracy in position information introduced as a result of potential movement of each user between the time the request for position is made and the time each device assesses its own position.]

Some advantages of this method are (a) it doesn't require a user to draw attention to himself or herself by aiming his or her device at another person; (b) it can precisely target just one person at a time; (c) it doesn't depend on making a "line-of-sight" connection; and (d) there are no range limitations other than the target person be in the same general vicinity. This method includes the following steps:

(1) All devices periodically (at least once per second is recommended) determine their own position coordinates and broadcast those coordinates along with their device ID#'s to other devices in the perceptual proximity.

(2) User #1's device (Device #1) receives frequently updated location information from all other devices in its perceptual proximity.

(3) User #1 sees someone, User #2, to whom she wants to communicate.

(4) User #1 instructs her device via its user interface (presses a button, for example) to display a 2-dimensional map of the locations of all other devices in the perceptual proximity in relation to itself. Each of the other devices are represented on the display by a small symbol (which can potentially represent useful distinctions such as the sex of the user, or whether the user is participating in the same "application" such as "dating", or "business networking", etc.).

(5) The user selects the symbol on the display of her device which she believes corresponds to User #2, thereby selecting the device ID# of User #2's device (Device #2). If the user is not operating her device in a "confirmation mode", then at this point addressed communications are initiated with User #2 which includes the transmission of an image of User #1, Device #1's device ID#, and Device #1's network address.

(6) If the User #1 does wish to operate her device in a "confirmation mode", then Device #1 makes a transmission addressed to the target device that includes its own device ID#, network address, and a request for an image of the target user.

(7) Device #2 responds by sending a transmission addressed to Device #1 that includes its own device ID#, network address, and an image of User #2.

(8) User #1 views the image of User #2 on her display to confirm that it is the person she intended to contact.

(9) If the image received corresponds to the person she intended to contact, then she instructs her device (by pressing the "send" button, for example) to initiate an addressed communication to the target device. Device #1 also sends an image of User #1, Device #1's device ID#, and Device #1's network address to Device #2.

(10) If the image received from Device #2 does not correspond to the target user, then User #1 has the option of selecting a different symbol which could potentially belong to the target individual. If there is no symbol that corresponds to the target individual, then that individual either does not have a device which shares the same application, or that device is disabled, or that device is set in an "invisible mode" in which either it is not accepting communications at all, or it is not accepting communications from that particular sender.

Method #10: Virtual Beaming

This method is similar to method (6) except that it employs a different user interface, "virtual beaming", for selecting which devices will be contacted. In addition to incorporating the location technology of Method #9 (with the additional provision that absolute direction must be incorporated into the position coordinates returned by the positioning system—for example, given two position coordinates it must be possible to determine which position is further North and which position is further West), it also incorporates direction technology such as, for example, a digital flux-gate compass and/or a gyroscopic compass. Instead of a user targeting a person of interest by selecting a symbol on her display which she thinks corresponds to that person, she targets the person of interest by pointing her device at him and instructing her device via the user interface (pressing a button, for example) to contact that person.

Using the direction technology incorporated into the device in combination with the position technology already discussed, it can be determined with simple geometry which target individuals are positioned within a narrow wedge (in either two or three dimensions, depending on the sophistication of the positioning information) extending out from the user's position in the direction she is pointing her device:

User #1's device (Device #1) has already received information as to her own position and also the device ID#'s and position coordinates of all other devices in the perceptual proximity. The direction that User #1's device was pointing when she targeted the person of interest can be represented as the "target vector", which begins at User #1's position and extends in the direction determined by the direction technology in her device. For position information in 3-dimensions, a target volume can then be defined as the volume between four vectors, all extending from User #1's position—two lying in a horizontal plane and the other two lying in a vertical plane. In the horizontal plane, one vector lies X degrees counterclockwise to the target vector, and the other vector X degrees clockwise to the target vector, where X is a small value (5 degrees is recommended) which can be adjusted by the user. In the vertical plane, one vector extends in a direction X degrees above the target vector, and the other vector X degrees below the target vector.

When User #1 points her device and "presses the button", Device #1 then makes an addressed transmission to all other users within the target area (or volume). The transmission includes Device #1's device ID# and network address, and a request for an image of the recipient. After the images are received, the user then selects the image of the person (and the corresponding device ID# and network address) she is interested in. Further communication is addressed solely to the selected device.

One advantage of this method is that the user is not required to read a map on her device, trying to make an accurate correspondence between the person she is interested in and the corresponding symbol on her display. This is of particular value when the target individual is moving. Another advantage is that obstructions between the user and the target person are not an issue when targeting: a user may hold the device within a coat pocket or bag when targeting an individual. The only disadvantage in comparison with Method #9 is that the initial request for an image possibly may be made to more than one target device.

This method includes the following steps:

(1) All devices periodically (at least once per second is recommended) determine their own position coordinates and broadcast those coordinates along with their device ID#'s to other devices in the perceptual proximity.

(2) User #1's device (Device #1) receives frequently updated location information from all other devices in its perceptual proximity.

(3) User #1 sees someone, User #2, to whom she wants to communicate. She aims her device (Device #1) at User #2. User #1 instructs her device via its user interface (she presses a button, for example) to contact all other devices in the direction of User #2 and obtain images of those users.

(4) Device #1 determines which of the positions reported by other devices lie in the target area defined by its own position and the direction it was pointing when User #1 instructed her device to initiate contact. If there was only one device in the target area, then Device #1 is now able to communicate with that device using its network address.

If more than one device is in the target area, then Device #1 must determine which of those devices is the intended target. User #1 can either repeat the same process, hoping that there will be only one person in the target area the second time, or hoping that only one person will appear in both the first and second attempts. Alternatively, User #1 can use a different distinguishing factor—appearance—to determine which of the addresses obtained belong to the intended target. Following is the later procedure:

(5) Device #1 makes a transmission addressed to all devices in the target area as defined above. The transmission includes Device #1's device ID# and network address, and a request that user images be sent to Device #1.

(6) Each device receiving the transmission responds with a transmission addressed to Device #1, sending its own device ID# and network address, as well as an image of its user.

(7) Device #1 receives images from all users in the target area.

(8) From the images received, User #1 selects the image corresponding to User #2, thereby selecting the device ID# and network address of User #2's device, Device #2.

Method #11: Addressing with Spatial Position via a DPS

In this method, User #1 notices the person to which she wants to send a message, User #2, and with her device, Device #1, determines the precise distance and direction that User #2 is from her own position. This can be accomplished with any compass and distance measuring capabilities (for example, a flux gate compass and an ultrasonic or laser distance sensor) built into Device #1. Device #1 then transmits a message, along with the relative position of the intended target, to a DPS with instructions to forward the message to whatever device is at the specified position. The DPS has access to absolute positions of all users (via GPS or some other means) and can easily calculate the absolute position indicated by adding the submitted relative position to Device #1's absolute position. The DPS then determines which user is nearest to the calculated position of the target and forwards the message to that user.

[Variation: Device #1 has access to its own absolute position (via GPS or some other means), and with the known relative position of the target person, is then able to calculate the absolute position of the target person. This being the case, Device #1 submits to the DPS the targets absolute position, rather than the target's position relative to itself.]

Method #12: Visual Biometric Addressing Via a DPS

This method generally involves capturing an image of the target person's face, analyzing the image to produce a unique biometric profile, and then associating the biometric profile with a similar biometric profile and address in a database. The image analysis can be performed on either (1) the user's device or (2) on a data processing system (DPS). In the first case, the user's device (Device #1) would send its own ID/address, any message, and the biometric profile to the DPS, where the biometric profile would be matched with a biometric profile stored in a database along with an associated address, and then facilitate communication with that address (forward a message or report the address to Device #1, for example). In case (2), the user's device would send its own ID/address, any message, and the captured image to the DPS. The DPS would then analyze the image; match the resulting biometric profile to a biometric profile and address stored in its database; and facilitate communication with that address.

There are several types of biometric profiles that this method could be applied to: facial recognition, outer (external) ear recognition, and retinal pattern, for example. The retinal analysis would may require a specialized camera for that purpose to be integrated into users' devices. However, embodiments of this invention are agnostic as to the specifics of what kind of biometric analysis is used, whether it is current or future biometric technology. The method of using a visually obtained biometric "signature" to address a message remains the same. In all of the above variations, the user selects the intended target person by aiming the user's device at the target person and capturing an image.

Method #13: Auditory Biometric Addressing Via a DPS

This method is analogous to Method #12, but instead of using an image of person's face to address a communication, it uses a person's distinct vocal characteristics as a means of determining the target person's address. First, a voice sample needs to be collected. This can be done by the user moving close to the intended target and recording a voice sample when the target is speaking. Sound recording and editing features can easily be incorporated into small devices and this is existing technology. Alternatively, a directional microphone integrated into the user's device could be aimed at the target person for recording their speech. (It may be easier for a blind person to aim a microphone than to maneuver close to the target.) After the voice sample is collected it can be analyzed either on the user's device or on a DPS. If analyzed on the user's device, the message along with the biometric profile can be sent to the DPS, where the biometric profile will be matched with a biometric profile that is stored in a database along with an address. Once the association is made to the address, the message is then forwarded to the target person. Alternatively, if the voice sample is analyzed on the DPS, then the user's device sends the message along with the voice sample itself to the DPS. The DPS then converts the voice sample to a biometric profile, finds a match for the biometric profile using a database, associates the biometric profile with an address, and then forwards the communication to that address.

Method #14: Addressing Directly to Target Terminals Using Image, Voice Quality, or Position This method is analogous to the three previous methods (Method #'s 11, 12, and 13) in which the information describing the distinguishing characteristic was sent to a DPS where it was associated with an address, and then forwarded to that address. However in this method, the information describing the distinguishing factor is not sent to a DPS, but rather, it is broadcast to all proximal terminals. Each terminal receiving the broadcast compares the expression of the distinguishing characteristic with the distinguishing characteristics of its user. If there is a match, then the terminal accepts the communication and responds if appropriate. For example, User #1 using Device #1 expresses a distinguishing characteristic of a target person (captures an image of the target's face and transforms this image into a biometric profile) and broadcasts this information together with Device #1's ID/address and a brief message. Device #2, along with several other devices, receives the broadcast from Device #1. Device #2 has stored in its memory the biometric profile of the image of its user's (User #2) face. It compares the two biometric profiles. If they do not match then it ignores the communication from Device #1. If they do match, then it responds according to User #2's wishes.

This method has three main variations—one for each type of distinguishing characteristic which is used to specify the target person or vehicle. The distinguishing characteristics of targets may be expressed by User #1 as described in Method #'s 11, 12, and 13. This method includes the following steps:

(1) User #1 using Device #1 captures an image or a voice sample or the target person/vehicle, or else determines the position of the target using techniques described in Method #'s 11, 12, and 13.

(2) Device #1 broadcasts message, Device #1's ID/address, and captured image of target (or biometric abstraction thereof) or voice sample of target (or biometric abstraction thereof), or position of target.

(3) If a raw image or voice sample is broadcast, then receiving devices analyze them to create a biometric profile. Receiving devices then compare the features of biometric profile or position w/features of their user's biometric profile or position. A device with a close enough match receives the communication. It knows the address of the sender and can respond if appropriate.

Variation: Another distinguishing characteristic related to appearance of the target person/vehicle may be used. Because it is only necessary to distinguish the target from other people or vehicles in the perceptual proximity of User #1, the level of specificity required in expressing the characteristics of the target is less stringent than if the target was to be distinguished from millions of other people in a database. In addition, the profiles stored on each terminal describing their user may be updated frequently—possibly daily, ensuring a higher degree of similarity than if the information was kept on a DPS and updated less frequently. These two preceding factors allow for another type or category of visual profile of the target— one that is descriptive of the visual quality of their clothing. For example, a color profile, or pattern profile, or contrast profile could be created which would allow for adequate specificity, could be obtained from any angle, and would not require facial information to be obtained.

Advantage: Easier to frequently update image of self stored on own device, so can compare with captured images with even temporary features such as color of shirt, jacket, & tie. Biometric profile need not be unique among large database of users, but only need be unique among relatively small number of proximal users. Would not require that user's of such a communication system submit information about their voice or their appearance to a database or to other users.

Methods #15 & #16: Data to Image Mapping

In contrast with some previous methods involving images for the selection of the target person, Methods #15 and #16 do not depend on the user's device receiving images of other users from a DPS or other users' devices. Instead, it is the user's own device which generates any images of other users. In addition, in contrast with these previous methods, each image generated in Methods #15 and #16 by the user's own device may contain more than one person. Following is a description of the user's experience using these methods. Afterward, more technical descriptions will be given.

In order to use these methods, the user points the camera on her device at the person she would like to communicate with (see FIG. 10). She instructs her device (by pressing a button, for example) to either capture a still image, or to begin displaying live video. The camera generates an image of a person (or a group of people) from the user's point of view. The user views either a still image or a live video image on her device's display. Superimposed over the image of each person (only if that person is a user of the application) is a small graphic shape, a circle for example, which represents the location of that person's device. The user selects the person with whom she wants to communicate by tapping with a stylus the circle superimposed over that person's image. (Other user interfaces are compatible with embodiments of this invention: for example, the user could select the desired circle by toggling from circle to circle by turning a dial on her device). Each circle is associated with the device ID# and network address of the device belonging to the user whose image lies underneath the circle. The user's device then initiates communication with the device of the selected person—either by sending a regular or Discreet message, or by initiating some other form of communication such as, for example, an instant messaging session, a telephone call, or a videophone call.

In order to achieve this operation, it must be possible to associate the device ID# and/or network address of a target person's device with the image of that person as represented on the display of a user's device. There are two alternative techniques for accomplishing this task: (1) mapping position data onto an image, and (2) focusing both light radiation from the target person and also data-carrying radiation from the target person's device onto the same imaging sensor (or two different imaging sensors and then overlay the data captured on each sensor).

Method #15: Data to Image Mapping—Mapping Position Data onto an Image

The means of associating a graphic symbol (a circle, for example) that is linked to data (device ID# and network address, for example) with a particular portion of an image (likeness of a target person, for example) is accomplished by mapping position data received from another person's device onto the display of the user's device.

The process of mapping of objects that exist in 3-dimensional space onto the two-dimensional display of a user's device requires the following factors: (a) the position of the user's device, (b) the position of the target device(s), (c) the orientation of the user's device, (d) the focal length of the device's camera lens, (e) the size of the camera's image sensor, and (f) the pixel density of the sensor. The last three factors (d, e, and f) are properties of the user's camera and are either fixed quantities, or at least, in the case of the lens's focal length, known quantities easily output from the camera.

In order to acquire the position data, factors (a) and (b), an infrastructure is required (1) to determine the precise location of each device with location coordinates which are valid at least locally, and (2) to provide time-synchronization to all devices (at least locally) to sufficient accuracy (approximately 1/10 second accuracy is recommended for most situations). Time synchronization can be used in order to take into account movement by either the user or potential target persons. If the location history of each device is stored for a trailing period of about 5-seconds (or similar period of time short enough so that only a manageable amount of memory is required, yet long enough so that all devices are able to respond to a request for information within that time period), then the locations of all users may be determined for the moment an image is captured.

Each device stores its own location data, or alternatively, the location data for all local devices is stored by a single third-party DPS. If a user targets a person by capturing a still image, then when the user presses a button to capture the image, his device broadcasts [to other devices within a specific domain, where "specific domain" can be defined in any one of a variety of ways, for example, (a) any user which receives the broadcast, (b) any user with location coordinates within a designated quadrant relative to the user, etc.] its own device ID and network address accompanied by a request for other devices to transmit their position coordinates for a specified moment within the past five seconds (or other predetermined trailing period). When potential target devices receive this broadcasted request, they respond by transmitting to the network address of the requesting device (a) their device ID#, (b) their network address, and (c) their position coordinates for the time specified in the request. Alternatively, if the position data is stored on a third-party DPS, when the user captures an image, the request for position information is instead directed to the third-party DPS. The DPS then provides the requested position information of all eligible devices along with the associated device ID's and network addresses. The technology to accomplish both position and synchronization functions currently exists, and it is irrelevant to embodiments of this invention which location and synchronization technologies are used as long as they deliver the required information.

Additionally, this technique requires that each device have the capability of accurately determining its own orientation in three-dimensional space, factor (c). Specifically, the information required is the orientation of the device's camera—horizontally (direction as it is projected onto a horizontal plane), vertically (the degree in which its orientation deviates from the horizontal), and "roll" (the degree to which the device is rotated about the axis defined by the direction that the device's camera is pointing). The technology for a device to determine its own orientation currently exists, and it is irrelevant to embodiments of this invention which technology is employed as long as it delivers the required output. One adequate form of the required output describes the camera orientation with three angles: ($\phi$, $\theta$, $\psi$), where $\phi$ is the degree that the camera is rotated to the left in a horizontal plane from a reference direction; $\theta$ is the degree that the camera is tilted up or down from the horizontal; and $\psi$ is the degree that the camera is rotated in a clockwise direction about the axis defined by the direction it is pointing.

Following is a description of how the position of a target person's device may be mapped onto the display of a user's device.

FIG. 11 illustrates two users in 3-dimensional space described by an x,y,z coordinate system in which the z-dimension represents the vertical dimension and the x and y coordinates describe the user's location with respect to the horizontal plane. The locations of Device #1 and Device #2 are represented by the coordinates $(x_1, y_1, z_1)$ and $(x_2, y_2, z_2)$, respectively. (More precisely, the location coordinates represent the location of each device's image sensor.) User #1 points his device in the general direction of User #2 and captures an image at a particular moment in time, t. Simultaneously, his device broadcasts its own device ID and network address and a request to nearby devices to send their position coordinates at time t along with their device ID's and network addresses. User #2's device (Device #2, in User #2's bag) responds to this request by transmitting the requested position coordinates ($x_2$, $y_2$, $z_2$), device ID#, and network address to Device #1.

In order for Device #1 to represent on its display the location of Device #2 superimposed over the image of User #2, it must also have (in addition to the location coordinates of Device #2) its own location coordinates ($x_1$, $y_1$, $z_1$) and the orientation of its camera in space ($\phi$, $\theta$, $\psi$). These values are returned by the location system employed and the device orientation system employed, respectively.

FIG. 12 illustrates the same two users represented from an overhead viewpoint projected against the horizontal plane. The direction in which the camera is pointed in the horizontal plane is specified by a vector which is rotated $\phi$ degrees counterclockwise from the direction of the positive x-axis. In FIG. 13, the Z-axis represents the vertical dimension, and the horizontal axis represents the vector from Device #1 to Device #2 projected onto the x-y plane. The degree to which the camera orientation deviates from the horizontal is represented by the angle, $\theta$. FIG. 14 illustrates the display of Device #1. The camera has been rotated $\psi$ degrees in a clockwise direction about the axis defined by the direction the camera is pointing. This results in the rotation of the image in the display $\psi$ degrees in a counterclockwise direction.

In the device display in FIG. 14 is shown the image of User #2 as well as a circle indicating the location of User #2's device. The position coordinates, and $x_y$ and $y_y$ (given in units of pixels from the center point of the display), specify the placement of the circle in the display and are determined as follows.

$$x_P = -y_0' \left( \frac{P_H}{S_x} \right) \left( \frac{x_0' - \sqrt{x_0'^2 - 4x_0'^2 f}}{x_0' + \sqrt{x_0'^2 - 4x_0'^2 f}} \right)$$

and $$y_P = z_0' \left( \frac{P_V}{S_y} \right) \left( \frac{x_0' - \sqrt{x_0'^2 - 4x_0'^2 f}}{x_0' + \sqrt{x_0'^2 - 4x_0'^2 f}} \right)$$

where
$P_H$=total number of horizontal pixels on the image sensor
$P_V$=total number of vertical pixels on the image sensor
$S_x$=width of the image sensor
$S_y$=height of the image sensor
f=focal length of the camera lens
and $x_0'=\cos \theta (x_0 \cos \phi + y_0 \sin \phi) + z_0 \sin \theta$ $y_0'=\cos \psi(-x_0 \sin \phi + y_0 \cos \phi) + \sin \psi[z_0 \cos \theta - (x_0 \cos \phi + y_0 \sin \phi) \sin \theta]$ $z_0'=\sin \psi(-x_0 \sin \phi + y_0 \cos \phi) + \cos \psi[z_0 \cos \theta - (x_0 \cos \phi + y_0 \sin \phi) \sin \theta]$ where $x_0 = x_2 - x_1$ $y_0 = y_2 - y_1$ $z_0 = z_2 - z_1$ Note that a simpler version of this technique is possible which uses 2-dimensional rather than 3-dimensional position analysis. In this simpler version, the user's device does not have information as to the elevation of the other user's device. It only knows its location in the horizontal plane. Thus, instead of a geometric shape appearing on the user's display at a point which corresponds to the point that the other user's device would appear if it was visible, a narrow vertical bar appears on the display which intersects the same point. Embodiments of the system are the same in all other respects. This simpler level of complexity comes at little cost. The only situation that would confound a 2-dimensional system is when two potential targets are in the same horizontal direction from the user's perspective, but one target is directly above or below the other.

Method #16: Data to Image Mapping—Focusing Data Signals onto an Image Sensor

This method is the same as Method #15 with the exception that it uses a different technique for associating a graphic symbol (a circle, for example), which is linked to data (Device ID and network address, for example), with a particular portion of an image (likeness of a target person, for example). The technique used here is that each device broadcasts a signal which is directional and has a limited ability to penetrate solid objects (clothing, for example)—the best frequencies being in the gigahertz to sub-infrared range. The lens of the camera focuses this data-carrying radiation together with the visible light-frequency radiation onto the same image sensor. [There are several lens materials that have the same index of refraction for both light radiation and other wavelengths in the range under discussion.] Intermingled with elements of the image sensor which are sensitive to light radiation are other elements which are sensitive to the data-transmitting wavelengths. These other elements are able to receive and decode data and also tag each signal with the place on the sensor in which it is received.

Because it is not important to determine shape from incoming sub-infrared radiation, but merely position, lower resolution, and hence lower pixel density is required for elements that are sensitive to these data-transmitting wavelengths. However, each of these elements in the image sensor is required to be able to receive and channel data from independent data streams as there may be more than one device "appearing" on the sensor which is transmitting its data. Each data stream is indexed and stored with the pixel number which receives the data. Because the data to be transmitted is very small—one device ID or network address—the time of transmission from the onset of the signal to the end of the signal is too short to result in any significant "blurring" across pixels.

A variation of this method is to focus the light radiation and the data-transmitting radiation onto two separate sensors. Using this variation associating the relative positions on each of the sensors can be done so that for any given pixel on the data sensor, the corresponding location on the image sensor can be calculated, and thus a geometric shape can be displayed at that position superimposed over the image.]

Method #17: Determine Exact Direction to Target by Touching Target in Image

This method involves a two-stage method of expressing distinguishing factors of the target person/vehicle, and combines some of the techniques introduced in Methods 10, 11 and 16. In the first stage a user (User #1 using Device #1) expresses position by pointing a camera. In the second stage User #1 expresses a combination of visual appearance and position by touching the image of the target within the image displayed on his or her terminal.

Initially, User #1 points the camera in his or her terminal at the target to acquire an image—either a captured still image or a live video image. Using any type of accurate compass technology the direction the camera is pointing can be determined. Thus the object in the center of the image on the viewing screen, assuming accurate calibration, lies precisely in the direction that the camera is pointing. But objects not in the center of the image will lie in a different direction corresponding to the degree of displacement from the center. Using the same known mathematical methods described in Method #15, the precise deviation in direction from the camera direction can be calculated for each point on the image. Thus for any given image displayed on the user's terminal, assuming the precise direction the camera was pointing (when it produced that image) is known, it can be determined what direction vector from the user corresponds to every point in the image. (This assumes that certain properties of the camera are known such as the size and pixel density of the image sensor and the focal length of the lens.) Thus, if a user touches a target person in an image displayed on his or her terminal, then the terminal can determine the precise direction of the target from the user's position.

If the user is viewing a live image when he or she designates a target by touching the screen, then the terminal will sample the direction and position of the camera at the same moment the screen is touched to use in its calculation of the target's direction. However, if the user is viewing a captured and stored image of the target, then the terminal should sample and store with the image the direction and position of the camera at the time the image was captured. In that way, the orientation of the camera may be changed after the image is captured but before the target is selected. Assuming that the target has not moved, even if the user has moved, the determination of the direction vector from the user's previous position to the target will still be valid.

This method has the additional capability of determining the position of the target in the following way: assuming the target does not move, if User #1 moves even a small amount and repeats the procedure of defining a vector to the same target from a different position, the position of the target can be determined as the intersection of the two vectors.

The determination of position could also be accomplished by combining this method with a distance measuring technology (a type of radar, for example). The position of the target would simply be the distance of the nearest object in the specified direction from the position of the user.

Given this method for expressing the targets direction from a specified position, or alternately the targets position, there are a number of methods that can be used to associate these known quantities with the address of the target's terminal.

Following are a sampling of methods by which the direction from the user's position could be associated with a target's address:

(1) Device #1 forwards the target vector (the vector pointing from its own position toward the target's position) to a DPS. The DPS independently determines the positions (using GPS or some other means) of all proximal users, and then determines which of those positions lie along the position vector specified by Device #1 and is the closest to Device #1. Knowing the ID's and network addresses of all devices in the network, the DPS then provides Device #1 with the means to communicate with the target by providing either the target's ID, or address, or temporarily assigned ID, or alternatively, by simply forwarding Device #1's initial communication (which could include Device #1's ID and address) to the target device.

(2) Device #1 broadcasts its address, its position, and the direction vector of its intended target. Each terminal receiving the broadcast determines its own position and responds if it lies on the specified vector.

(3) All proximal devices send their positions and addresses to Device #1 in response to a broadcasted request. Device #1 then determines the address of the nearest device that is positioned along the direction vector to the intended target.

Following are a sampling of methods by which the position of the target could be associated with a target's address:

(1) Device #1 forwards the target's position to a DPS, which associates the position with the same independently determined position of a device whose address is known to the DPS. The DPS then provides Device #1 with the target's ID, or address, or temporarily assigned ID, or alternatively, simply forwards Device #1's initial communication (which could include Device #1's ID and address) to the target device.

(2) Device #1 broadcasts the position of its intended target. Each receiving terminal determines its own position and responds if its position is the same as the specified target position.

(3) All proximal devices send their positions and addresses to Device #1 in response to a broadcasted request. Device #1 then determines the address of the device that reports a position that is the same as the determined target position.

Method #18: Determine Which Devices Are in Perceptual Proximity by Sending or Receiving Broadcast This method is similar to Method #1 with one important difference: Instead of a user's device (Device #1) receiving images of other users in perceptual proximity from their devices, only device ID's and/or network addresses are received from other users' devices. The images of those other users are received from a data processing system (DPS).

There are two main variations of this method. In the first variation, Device #1 broadcasts a request for device ID's and/or network address with a signal strength sufficient to reach all devices within perceptual proximity. If this request includes Device #1's device ID and/or network address, then the devices receiving this request may either send the requested information in an addressed transmission to Device #1, or alternatively, devices may respond by simply broadcasting the requested information.

In the second variation; all devices constantly, or intermittently (for example, once per second), broadcast their device ID and/or network address with signal strength for reaching other devices within perceptual proximity. Device #1 would then obtain the device ID's and/or network addresses of other devices in perceptual proximity simply by "listening".

The device ID's and/or network addresses obtained by Device #1 are then transmitted to a data processing system with a request for an image(s) of each of the associated users. The data processing system then transmits to Device #1 the requested images paired with their respective device ID's and/or network addresses. The user (User #1) of Device #1 views the images received and selects the image which corresponds to the intended target person or target vehicle, thus selecting the target's device ID and/or network address.

Device #1 can then initiate addressed communication with the target person/vehicle. The means of transmission can be either direct (device to device) or indirect (via a network). The communication may or may not be mediated by a DPS.

ALTERNATIVE 1: Identical method with one exception: a different distinguishing characteristic of the target is used—voice quality—instead of appearance. Instead of User #1 viewing a series of images sent from the DPS (each linked to an ID/address), User #1 listens to a series of voice samples sent from the DPS (each linked to an ID/address). User #1 selects the voice sample that is most similar to the sound of the target's voice, thus at the same time selecting the ID/address of the target.

ALTERNATIVE 2: Identical method with one exception: a different distinguishing characteristic of the target is used—relative position—instead of appearance. Instead of User #1 viewing a series of images sent from the DPS (each linked to an ID/address), User #1 views a 2-dimensional floor map sent from the DPS. The map displays the positions of all other users in the perceptual proximity such that each user is represented by a small symbol. An ID/address is associated with each symbol. User #1 selects the symbol that corresponds to the position of the target, thus at the same time selecting the ID/address of the target.

Method #19: Determine Which Devices Are in Perceptual Proximity by Scanning RFID Tags This method is a variation of the previous method (Method #18), differing only in the manner in which the user's device (Device #1) obtains the device ID's and network addresses of other devices in perceptual proximity of the user (User #1). In this method the ID/addresses are obtained from RFID tags (active or passive) that represent other user's devices and that may or may not be physically incorporated within the devices they represent. In order to obtain other devices' device ID's and network addresses, Device #1 transmits a non-directional signal interrogating all RFID tags within perceptual proximity of User #1. In response to this interrogation, all RFID tags transmit (broadcast) the device ID and/or network address of the devices they represent. Device #1 thus receives the RFID transmissions carrying the device ID and/or network addresses of all devices in perceptual proximity. From this point on, Method #19 is identical with Method #18.

Method #20: Proximal Devices Transmit ID's and/or Addresses Directly to DPS Instead of to the Proximal Requesting Device This method is identical to Method #18 with the only difference being the manner in which the DPS obtains the ID/addresses of the proximal devices to Device #1. In this method, as in Method #18, Device #1 broadcasts a request for device ID's and/or network address with a signal strength sufficient to reach all devices within perceptual proximity. In this Broadcasted request, Device #1 includes its own device ID/address and a "Request Event ID", a number which uniquely identifies this particular attempt at a Perceptually Addressed communication from this particular user. When proximal devices receive this broadcasted request, instead of sending their ID/addresses to Device #1 as they did in Method #18, they send their ID/addresses to the DPS along with Device #1's ID/address and the Request Event ID. For each of the ID/addresses reported to the DPS by Device #1's proximal devices, the DPS sends to Device #1 a representation of a distinguishing characteristic (image, voice sample, or position—depending upon the configuration of embodiments of the system) of the user of that device paired with that device's ID/address. From this point on, this method is identical to Method #18.

Method #21: Visual Identification on DPS in which Alternatives Limited to Proximal Users This method is similar to Method #12 in that the user (User #1) of a terminal (Device #1) captures an image of the target with a camera on his or her terminal and then transmits that image, or the portion of the image that includes only the specific target of interest, to a DPS. But in Method #12 the image needs to contain enough information about the target's visual features, and the analysis of the image needs to be sufficiently thorough, that the person in the image can be distinguished among the many (possibly thousands or millions) other users in the DPS's database. In contrast, the current method assumes knowledge of which other people/vehicles are in the user's perceptual proximity. Consequently, the image of the target submitted by Device #1 need not contain as much information about the target's visual features and the analysis of the submitted image need not be as thorough because the result of the analysis need only discriminate among the relatively few people/vehicles present. (A variation on this method is that Device #1, instead of the DPS, would analyze the captured image of the target to produce a biometric profile, and then transmit to the DPS the biometric profile instead of the image on which it is based.)

There are two general methods for determining the identities of the people/vehicles in the User #1's perceptual proximity:

The DPS uses GPS or some other method to determine the location of user's, and determines which user's are within a predetermined radius of User #1.

Techniques applied in Methods #18, #19 or #20 in which the ID's or addresses of proximal users are reported to the DPS:

Device #1 broadcasts its ID/address along with a request to other devices in the perceptual proximity that their ID/addresses are sent to Device #1. Then Device #1 forwards the ID/addresses of proximal users to the DPS.

Device #1 receives the broadcasted ID/addresses of other devices in its perceptual proximity, then forwards those ID/addresses to the DPS.

Device #1 broadcasts its ID/address, a Request Event ID, and a request to other devices in the perceptual proximity that their ID/addresses are sent directly to the DPS attached to Device #1's ID/address and the Request Event ID.

Device #1 scans the RFID tags of proximal devices to obtain the ID/addresses of their associated terminals. Then Device #1 forwards the ID/addresses of proximal users to the DPS.

There are several types of visual biometric profiles that this method could be applied to: facial recognition, outer (external) ear recognition, and retinal pattern, for example. The retinal analysis may require a specialized camera for that purpose to be integrated into users' devices. However, embodiments of this invention are agnostic as to the specifics of what kind of biometric analysis is used, whether it is current or future biometric technology. The method of using a visually obtained biometric "signature" to address a message remains the same. In all of the above variations, the user selects the intended target person by aiming the user's device at the target person and capturing an image.

This method includes the following steps:
(1) User #1 captures an image of a target that he or she wants to communicate with
(2) If necessary, User #1 crops the image to include only the target.
(3) Device #1 either produces a biometric profile of the target image and transmits this profile to a DPS, or Device #1 transmits the target image itself to the DPS.
(4) The DPS acquires the ID/addresses of all other users in Device #1's perceptual proximity using one of the methods outlined above.
(5) The DPS compares the image (or its biometric profile) of the target received from Device #1 to the images (or their biometric profiles) of the other users present which the DPS has stored in a database along with their ID/addresses. The DPS determines which proximal user has image (or biometric profile of an image) that is most similar to the image (or biometric profile of an image) submitted by Device #1.

(6) The DPS facilitates communication between Device #1 and its target (for example, by forwarding a communication attached to the submitted image, by transmitting to Device #1 the ID/address of its target, or by communicating the ID/address of Device #1 to the target, or by some other means).

Advantages of this Method:

The DPS does not need to positively identify the submitted image, but only find the greatest similarity among the other users present.

Protects confidentiality of users in that it is not require them to allow strangers to access images of themselves. In addition, depending upon the method used for the DPS to know the ID/addresses of proximal users, it is possible for the instigating user (Device #1) to not have access to any ID/addresses.

Method #22: Voice Quality Identification on DPS in which Alternatives Limited to Proximal Users This method is identical to the previous method (Method #21) with the only exception being that a different distinguishing characteristic of the target is used—voice quality—instead of visual appearance. Instead of the target's image being captured by a camera, the target's voice is recorded by a microphone on the user's Device (Device #1). Device #1 transmits the captured voice sample (or biometric profile of the voice sample created on Device #1) to a DPS. In the same way as the previous method, the DPS determines which other users are in the perceptual proximity to Device #1, and compares their voice samples to the sample submitted by Device #1. Once the best match is determined, the DPS facilitates communication between the two devices.

Method #23: Position Identification on DPS in which Alternatives Limited to Proximal Users This method is identical to the previous two methods (Methods #21 and #22) with the only exception being that a different distinguishing characteristic of the target is used—position—instead of visual appearance or voice quality. Instead of the target's image being captured by a camera, the target's relative position is determined by the user's Device (Device #1). Any of the previously describe techniques for expressing the relative position of a target will suffice: determining the direction vector of the target from the Device #1's position, determining both the direction and distance of the target from the Device #1's position, or determining the absolute position of the target.

Device #1 transmits the relative position of the target to a DPS. The DPS determines which other users are in the perceptual proximity to Device #1 by using one of the following techniques:

(1) Techniques applied in Methods #18, #19 or #20 in which the ID's or addresses of proximal users are reported to the DPS:

(2) Device #1 broadcasts its ID/address along with a request to other devices in the perceptual proximity that their ID/addresses are sent to Device #1. Then Device #1 forwards the ID/addresses of proximal users to the DPS.

(3) Device #1 receives the broadcasted ID/addresses of other devices in its perceptual proximity, then forwards those ID/addresses to the DPS.

(4) Device #1 broadcasts its ID/address, a Request Event ID, and a request to other devices in the perceptual proximity that their ID/addresses are sent directly to the DPS attached to Device #1's ID/address and the Request Event ID.

(5) Device #1 scans the RFID tags of proximal devices to obtain the ID/addresses of their associated terminals. Then Device #1 forwards the ID/addresses of proximal users to the DPS.

(6) The DPS then independently determines the exact positions of each of the user's which were reported to be in Device #1's perceptual proximity. It compares each of those positions to the position (or range of positions) reported by Device #1 as being the location of the target. The DPS determines which user is closest to the target position submitted by Device #1 and then facilitates communication between those two devices.

Method #24: Identification on DPS in which Alternatives Limited to Proximal Users, but Image, Voice Samples, or Position Submitted by Each Proximal Device This method description applies to all three types of distinguishing characteristics: image, voice quality, and position. This method is the same as the previous three methods in that the instigating user, User #1, submits to a DPS the distinguishing factor of the target, and the DPS also acquires the ID/addresses of all devices in User #1's perceptual proximity to facilitate the comparison and matching process. But in these previous methods, if the distinguishing characteristic was an image or a voice sample, that information was stored with the devices ID/address in a database on the DPS; and if the distinguishing characteristic was a position, that information was independently determined by the DPS for every device in the perceptual proximity. In contrast, with this method, the distinguishing characteristic is submitted independently by each device that is in the perceptual proximity of Device #1. It is done so at the same time each device reports with its ID/address that it is in User #1's perceptual proximity, or alternately, after the DPS or Device #1 determines which devices are in the proximity and then prompts them (transmits a request) to submit the appropriate distinguishing characteristic to the DPS. All other aspects of this method are identical with the previous three methods (Methods #21, #22, and #23).

Method #25: Directional Broadcast to Determine Subgroup of Users in Perceptual Proximity This method is a variation of all methods in which a DPS determines the identity of a target by comparing a sample of the target submitted by the instigating user (User #1) with the distinguishing characteristics of all users determined to be in User #1's perceptual proximity. This variation concerns the method by which it is determined which users are to be included in this comparison process. It is advantageous for this group to be as small as possible to reduce network bandwidth used, to reduce the DPS processing time, and to increase accuracy of identification. More specifically this method is a variation of the following methods:

(1) Device #1 broadcasts its ID/address along with a request to other devices in the perceptual proximity that their ID/addresses are sent to Device #1. Then Device #1 forwards the ID/addresses of proximal users to the DPS.

(2) Device #1 broadcasts its ID/address, a Request Event ID, and a request to other devices in the perceptual proximity that their ID/addresses are sent directly to the DPS attached to Device #1's ID/address and the Request Event ID.

(3) Device #1 scans the RFD tags of proximal devices to obtain the ID/addresses of their associated terminals. Then Device #1 forwards the ID/addresses of proximal users to the DPS.

(4) Instead of broadcasting or scanning omni directionally, in this method, Device #1 broadcasts or scans directionally, by any method, in the general direction of the target, thus eliminating from consideration those devices that are in the opposite direction. In this way fewer potential targets are considered by the DPS.

Method #26: Identification on User's Device in which Image, Voice Samples, or Position Submitted by Each Proximal Device This Method is identical to Method #24 with the exception that all of the functions in that method that were performed by a DPS are here performed by the instigating device, Device #1. Whether this method functions with image, voice sample, or position is primarily a function of embodiments of the system which is employed, but it is possible that some combination of all of those distinguishing characteristics could be used in the same application and that a user may have the option of choosing which distinguishing characteristic to express.

In this method the user, User #1, either captures an image, a voice sample, or makes some determination of position of the target using a previously described method. At the same time, Device #1 broadcasts a request to other devices in User #1's perceptual proximity requesting either an image (or biometric profile thereof), or voice sample (or biometric profile thereof), or position be forwarded with an accompanying ID/address to Device #1's ID/address. After receiving user images (or voice samples, or positions) from each device in the perceptual proximity, Device #1 compares those images (or voice samples, or positions) with the captured image (or voice sample, or position) to determine the best match. After determining the best match, Device #1 then has identified the ID/address associated with the target device.

Method #27: User Selection of Both Image and Position Simultaneously From a Composite Image This method is novel in the manner in which it allows the user to express two distinguishing characteristics of the target simultaneously—image and position. The user's device constructs a virtual landscape by placing images of other proximal users together in a composite image according to where they would appear in relation to each other if viewing them in reality.

In response to a request from the user's device, Device #1, the user's device receives (from either a DPS, or each proximal device, or a combination of both sources) the ID/address, user image, and position of each device in Device #1's perceptual proximity. Device #1 then arranges each of the images on the display in a position that approximates where they would appear in the user's field of vision. For example, if person #2 is slightly to the right (from User #1's point of view) of person #1, and person #3 is much further to the right and further in the distance, then the display of Device #1 would show the image received from the device of person #2 displayed slightly to the right of the image of person #1. The image of person #3 would be much further to the right on the display and also much smaller, indicating distance. The user is given the ability to scroll the display to the right or the left via the user interface (for example, pressing one button to scroll to the right and a different button to scroll to the left) to allow User #1 to view the images of all other proximal users in a 360 degree radius. User #1 selects the target recipient of a communication by selecting the image of that target (by tapping the image, or toggling from image to image, etc.). The image is associated with that user's ID/address, and thus Device #1 has the capability of initiating communications with the target.

Method #28: User Selection of Both Image and Voice Quality Simultaneously

This method is similar to the previous method in that it allows the user to express two distinguishing characteristics of the target simultaneously; but in this case the two distinguishing characteristics are image and voice quality. The user's device displays a series of images, and associated with each image is a sample of that person's voice. The user, User #1, is able to hear the associated voice by via the user interface by, for example, selecting an image and pressing a "play voice" button. This method is identical to the previous method in the manner in which the distinguishing characteristics are collected for either a DPS or from other proximal devices, and in the way communication is initiated. If User #1 wishes to target a particular target, he or she selects the image/voice sample of the target (by tapping the image, for example) and communicating via the user interface (pressing a button, for example) that communications should be initiated. The image/voice sample is associated with that user's ID/address, and thus Device #1 has the capability of initiating communications with the target.

Method #29: User Selection of Both Voice Quality and Position Simultaneously

This method is similar to the previous method in that it allows the user to express two distinguishing characteristics of the target simultaneously; but in this case the two distinguishing characteristics are voice quality and position. The user's device constructs a virtual "soundscape" by placing voice samples of other proximal users together in a composite according to what direction they would appear to come from in relation to each other if hearing them in reality. The user's device (Device #1) plays a series of voice samples, the order changing according to whether the user is scrolling to the, right or to the left. The user, User #1, is able to hear the associated voice via the user interface by, for example, pressing a "move left" button or a "move right" button. This method is identical to the previous method in the manner in which the distinguishing characteristics are collected for either a DPS or from other proximal devices, and in the way communication is initiated. If User #1 wishes to target a particular target, he or she selects the voice sample of the target (by playing the voice sample, for example) and communicating via the user interface (pressing a button, for example) that communications should be initiated. The image is associated with that user's ID/address, and thus Device #1 has the capability of initiating communications with the target.

Method #30 (Previously Method #13): Addressing with a Visible Alphanumeric String The most obvious examples of visibly displayed strings of alphanumeric characters which are associated with people are sports jerseys and license plates. Using this method, the alphanumeric string is associated with an address using a database stored either on a DPS (in which case a user's device sends the message, along with the alphanumeric string of the intended recipient, to the DPS, which looks up the alphanumeric string in its database and forwards the communication to the associated address) or on the user's device (in which case the user's device associates the alphanumeric string with an address and initiates communication directly with the target person's address).

There are several distinct ways that a user (User #1 using Device #1) can express an alphanumeric string associated with a target person:

a. The user can enter the alphanumeric string directly into her device. Some examples of this are: using a keyboard; freehand writing with a stylus and translated (on users device or on a DPS) into a digital representation with handwriting recognition software; or verbally pronouncing each character in the string while voice recognition software translates (on users device or on a DPS) into a digital representation.
b. The user can capture an image of the alphanumeric string with a camera on her device, and then use optical character recognition (OCR) to translate into a digital representation of the alphanumeric string. OCR can be performed either on the user's device or on a DPS.
c. A method analogous to Method #1 in which, in response to a broadcasted request, all proximal terminals send to the user's terminal their ID/address paired with the alphanumeric string displayed by their user. The user then selects the alphanumeric string presented which is the same as the alphanumeric string seen on the intended target.

Suggested Security Features

A user has the ability to ban all future communications from any particular user. This consists of a permanent non-response to all transmissions from that user's device.

Users don't have direct access to device ID#'s or network addresses of other users. They address communications to other users by selecting the image of the user with which they wish to communicate.

Images, device ID#'s, and network addresses of other users self-delete within a short time (measured in seconds or minutes) if not used to send a message.

User #1 has the ability to instruct her device (Device #1) to issue an "erase" command to any other device (Device #2) at any time, as long as Device #1 has Device #2's device ID# and network address. This erase command causes the erasure of User #1's image, device ID# and network address from Device #2. But at the same time, Device #2's information is also erased from Device #1.

There is no capability of exporting from a device any information about other users.

All communications between devices is encrypted with a common system-wide key to prevent non-system devices from eavesdropping. This key is periodically changed, and the new key is automatically propagated and installed from device to device, whenever devices communicate. Devices retain previous keys in order to be able to communicate with other devices that have not yet been updated. The ability to automatically install a new encryption key is guarded by a system-wide password stored in the firmware of all devices, and invoked in all legitimate encryption key updates.

ADDITIONAL EXAMPLES

In addition to the examples previously presented applicant expressly contemplates the following numbered examples of the present invention:

Initiator Handset Examples, Set 1

Example 1

A method of exchanging data, comprising: specifying in a first electronic device a recipient electronic device via perceptual addressing; and sending a conditional message from the first electronic device to the specified recipient electronic device such that the conditional message is visible to a recipient device user only upon an expression of interest in the recipient electronic device in communicating with the first electronic device.

Example 2

The method of exchanging data of example 1, wherein the expression of an interest in communicating with the first electronic device comprises selecting the first electronic device using perceptual addressing.

Example 3

The method of exchanging data of example 1, further comprising receiving a conditional message in the first electronic device from the recipient electronic device that is visible upon the recipient electronic device's expression of interest.

Example 4

The method of exchanging data of example 1, wherein the conditional message comprises information that identifies a user of the first electronic device.

Example 5

The method of exchanging data of example 1, further comprising sending a nonconditional message from the first electronic device to the specified recipient electronic device that is visible before an expression of interest in the recipient electronic device in communicating with the first electronic device.

Example 6

The method of exchanging data of example 5, wherein the nonconditional message contains no information identifying a user of the first electronic device.

Example 7

The method of exchanging data of example 1, wherein the conditional message is stored in a server until the server receives an expression of interest in the recipient electronic device in communicating with the first electronic device.

Example 8

The method of exchanging data of example 1, wherein the conditional message is stored in at least one of the first electronic device and the recipient electronic device until the recipient electronic device receives a recipient electronic device user's expression of interest in communicating with the first electronic device.

Example 9

The method of exchanging data of example 1, wherein the first and recipient electronic devices are wireless electronic devices communicating directly with one another.

Example 10

The method of exchanging data of example 1, wherein the first and recipient electronic devices are wireless electronic devices communicating via a server.

Example 11

The method of exchanging data of example 1, wherein specifying a recipient electronic device comprises sending perceptual addressing information identifying the recipient electronic device.

Example 12

The method of exchanging data of example 1, wherein sending a conditional message such that the message is visible only upon an expression of interest comprises sending at least a portion of the message only upon an expression of interest.

Initiator Handset Examples, Set 2

Example 13

A method of exchanging data, comprising: specifying in a first electronic device a recipient electronic device; and sending a conditional message from the first electronic device to the specified recipient electronic device such that the entire sent message is visible to a recipient device user only upon an expression of interest in the recipient electronic device in communicating with the first electronic device.

Example 14

The method of exchanging data of example 13, wherein the first electronic device specifies the recipient electronic device via perceptual addressing.

Example 15

The method of exchanging data of example 13, wherein the recipient electronic device forms an expression of interest in communicating with the first electronic device via perceptual addressing of the first electronic device.

Example 16

The method of exchanging data of example 13, wherein the conditional message comprises an identity of a first electronic device user.

Example 17

The method of exchanging data of example 13, further comprising receiving a conditional message in the first electronic device from the recipient electronic device that is visible upon the recipient electronic device's expression of interest.

Example 18

The method of exchanging data of example 13, wherein the conditional message is stored in a server until the server receives an expression of interest in the recipient electronic device in communicating with the first electronic device.

Example 19

The method of exchanging data of example 13, wherein the conditional message is stored in at least one of the first electronic device and the recipient electronic device until the recipient electronic device receives an expression of interest in communicating with the first electronic device.

Example 20

The method of exchanging data of example 13, wherein the first and recipient electronic devices are wireless electronic devices communicating directly with one another.

Example 21

The method of exchanging data of example 13, wherein the first and recipient electronic devices are wireless electronic devices communicating via a server.

Example 22

The method of exchanging data of example 13, wherein specifying a recipient electronic device comprises sending perceptual addressing information identifying the recipient electronic device.

Example 23

The method of exchanging data of example 13, wherein sending a conditional message such that the message is visible only upon an expression of interest comprises sending at least a portion of the message only upon an expression of interest.

Receiving Handset Examples, Set 1

Example 24

A method of exchanging data, comprising: receiving in a receiving electronic device a conditional message from a sending electronic device; and viewing the conditional message in the recipient device, wherein the conditional message is viewable in the recipient device only upon an expression of interest via the recipient electronic device in communicating with the sending device, and wherein the expression of interest comprises selecting the sending electronic device using perceptual addressing.

Example 25

The method of exchanging data of example 24, wherein the conditional message received from the sending electronic device is sent to the receiving electronic device via perceptual addressing.

Example 26

The method of exchanging data of example 24, further comprising receiving a conditional message in the sending electronic device from the receiving electronic device that is visible upon the receiving electronic device's expression of interest.

Example 27

The method of exchanging data of example 24, wherein the conditional message comprises information that identifies a user of the sending electronic device.

Example 28

The method of exchanging data of example 27, further comprising receiving a nonconditional message from the sending electronic device that is visible before an expression of interest in the receiving electronic device in communicating with the sending electronic device.

Example 29

The method of exchanging data of example 24, wherein the nonconditional message contains no information identifying a user of the sending electronic device.

Example 30

The method of exchanging data of example 24, wherein the conditional message is stored in a server until the server receives an expression of interest in the receiving electronic device in communicating with the sending device.

Example 31

The method of exchanging data of example 24, wherein the conditional message is stored in at least one of the sending device and the receiving electronic device until the receiving electronic device receives a receiving electronic device user's expression of interest in communicating with the sending electronic device.

Example 32

The method of exchanging data of example 24, wherein the receiving and sending electronic devices are wireless electronic devices communicating directly with one another.

Example 33

The method of exchanging data of example 24, wherein the receiving and sending electronic devices are wireless electronic devices communicating via a server.

Receiving Handset Examples, Set 2

Example 34

A method of exchanging data, comprising: receiving in a recipient electronic device a conditional message from a sending electronic device, the entire received message visible in the recipient device only upon an expression of interest via the recipient electronic device in communicating with the sending device.

Example 35

The method of exchanging data of example 34, wherein the sending electronic device sends the message to the receiving electronic device via perceptual addressing.

Example 36

The method of exchanging data of example 34, wherein the receiving electronic device forms an expression of interest in communicating with the sending electronic device via perceptual addressing of the first electronic device.

Example 37

The method of exchanging data of example 34, wherein the conditional message comprises an identity of a sending electronic device user.

Example 38

The method of exchanging data of example 34, further comprising receiving a conditional message in the sending electronic device from the receiving electronic device that is visible upon the receiving electronic device's expression of interest.

Example 39

The method of exchanging data of example 34, wherein the conditional message is stored in a server until the server receives an expression of interest from the receiving electronic device in communicating with the sending electronic device.

Example 40

The method of exchanging data of example 34, wherein the conditional message is stored in at least one of the sending electronic device and the receiving electronic device until the receiving electronic device receives from a recipient electronic device user an expression of interest in communicating with the sending electronic device.

Example 41

The method of exchanging data of example 34, wherein the sending and receiving electronic devices are wireless electronic devices communicating directly with one another.

Example 42

The method of exchanging data of example 34, wherein the sending and receiving electronic devices are wireless electronic devices communicating via a server.

Server Examples, Set 1

Example 43

A method of exchanging data, comprising: receiving in a server a conditional message from a first electronic device specifying a second electronic device as a recipient via perceptual addressing; sending the conditional message from the server to the second electronic device such that the conditional message is visible to the second electronic device only upon an expression of interest in the second electronic device in communicating with the first electronic device.

Example 44

The method of exchanging data of example 43, wherein the conditional message is sent from the server to the second electronic device only after the server receives notice of an expression of interest in communicating with the first electronic device from the second electronic device.

Example 45

The method of exchanging data of example 43, wherein the conditional message is sent to the second electronic device such that the conditional message is not viewable on the second electronic device until the second electronic device receives an expression of interest in communicating with the first electronic device from a user of the second electronic device.

Example 46

The method of exchanging data of example 43, wherein at least one of the first and second electronic devices communicate with the server via a wireless connection.

Server Examples, Set 2

Example 47

A method of exchanging data, comprising: receiving in a server a conditional message from a first electronic device; sending the conditional message from the server to the second electronic device such that the entire message is visible to the second electronic device only upon an expression of interest in the second electronic device in communicating with the first electronic device.

Example 48

The method of exchanging data of example 47, wherein the conditional message is sent from the first electronic device to the second electronic device via perceptual addressing of the second electronic device.

Example 49

The method of exchanging data of example 48, further comprising receiving a nonconditional message not identifying a user of the first electronic device from the first electronic device, and sending the nonconditional message from the server to the second electronic device.

Example 50

The method of exchanging data of example 47, wherein the conditional message is sent from the server to the second electronic device only after the server receives notice of an expression of interest in communicating with the first electronic device from the second electronic device.

Example 51

The method of exchanging data of example 47, wherein the conditional message is sent to the second electronic device such that the conditional message is not viewable on the second electronic device until the second electronic device receives an expression of interest in communicating with the first electronic device from a user of the second electronic device.

Example 52

The method of exchanging data of example 47, wherein at least one of the first and second electronic devices communicate with the server via a wireless connection.

Example 53

A method of exchanging data, comprising: receiving a specification of a recipient in a first electronic device via perceptual addressing; sending a conditional message comprising a desire to communicate from the first electronic device to the specified recipient electronic device such that the conditional message is visible to a recipient device user only upon an expression of interest in the recipient electronic device in communicating with the first electronic device.

Other Examples, Set 1

Example 1

A method of sending a message from a first wireless electronic device to a second wireless electronic device, comprising: identifying a distinguishing characteristic of a user of a second wireless electronic device; estimating a distance between the first wireless device and the second wireless device within the perceptual proximity of the first wireless device; and sending a message from the first electronic device viewable in the second electronic device based on the second electronic device's matching the estimated distance from the first wireless device and matching the distinguishing characteristic identified in the first electronic device.

Example 2

The method of sending a message of example 1, wherein the distinguishing characteristic comprises at least one of voice, physical appearance, and location.

Example 3

The method of sending a message of example 1, wherein estimating a distance is performed by a first mobile device user.

Example 4

The method of sending a message of example 1, wherein estimating a distance is performed electronically.

Example 5

The method of sending a message of example 1, wherein estimating a distance electronically comprises using at least one of ultrasonic, infrared, laser, and optical ranging.

Example 6

The method of sending a message of example 1, wherein estimating a distance comprises estimating a number of people within the range from the first wireless electronic device and the second wireless electronic device.

Example 7

The method of sending a message of example 1, wherein sending a message comprises sending a conditional message viewable in the second electronic device only upon an expression of interest in the second electronic device in communicating with the first electronic device.

Example 8

A method of sending a message from a first wireless electronic device to a second wireless electronic device, comprising: identifying a distinguishing characteristic of a user of a second wireless electronic device; estimating a distance and direction from the first wireless device to the second wireless device within the perceptual proximity of the first wireless device; and sending a message from the first electronic device viewable in the second electronic device based on the second electronic device's matching the estimated distance and direction from the first wireless electronic device and matching the distinguishing characteristic identified in the first electronic device.

Example 9

The method of sending a message of example 8, wherein viewability in the second electronic device based on the second electronic device's matching the estimated distance and direction from the first wireless electronic device comprises comparing absolute positions of the first and second wireless electronic devices.

Example 10

The method of sending a message of example 9, wherein absolute position of at least one of the first and second wireless electronic devices is derived from at least one of Global Positioning System (GPS), triangulation, and by position relative to a device with a known absolute position.

Example 11

The method of sending a message of example 8, wherein the distinguishing characteristic comprises at least one of voice, physical appearance, and location.

Example 12

The method of sending a message of example 8, wherein estimating at least one of the distance and direction is performed by a first mobile device user.

Example 13

The method of sending a message of example 8, wherein estimating at least one of the distance and direction is performed electronically.

Example 14

The method of sending a message of example 13, wherein estimating a distance electronically comprises using at least one of ultrasonic, infrared, laser, and optical ranging.

Example 15

The method of sending a message of example 13, wherein estimating a direction electronically comprises using a flux gate compass.

Example 16

The method of sending a message of example 8, wherein sending a message comprises sending a conditional message viewable in the second electronic device only upon an expression of interest in the second electronic device in communicating with the first electronic device.

Example 17

A method of sending a message from a first wireless electronic device to a second wireless electronic device, comprising: identifying at least one distinguishing characteristic of a user of a second wireless electronic device; and sending a message from the first electronic device viewable in the second electronic device based on the second electronic device's matching the at least one distinguishing characteristic identified in the first electronic device, wherein matching the at least one distinguishing characteristic is determined in the second electronic device.

Example 18

The method of sending a message of example 17, wherein the message sent from the first electronic device to the second electronic device comprises the identified distinguishing characteristic information.

Example 19

The method of sending a message of example 17, wherein the sent message comprises a conditional component viewable in the second electronic device only upon receiving an expression of interest in the second electronic device in communicating with the first electronic device.

Example 20

The method of sending a message of example 17, wherein the distinguishing characteristic comprises at least one of voice, physical appearance, and position.

Example 21

A method of receiving a message from a first wireless electronic device in a second electronic device, comprising: receiving a message from the first electronic device in the second electronic device, the message comprising information identifying at least one distinguishing characteristic of a user of a second wireless electronic device; and making the message from the first electronic device viewable in the second electronic device based on the second electronic device's matching the at least one distinguishing characteristic identified in the first electronic device, wherein matching the at least one distinguishing characteristic is determined in the second electronic device.

Example 22

The method of receiving a message of example 21, wherein the received message comprises a conditional component viewable in the second electronic device only upon receiving an expression of interest in the second electronic device in communicating with the first electronic device.

Example 23

The method of receiving a message of example 21, wherein the distinguishing characteristic comprises at least one of voice, physical appearance, and position.

Example 24

A method of sending a message from a first wireless electronic device to a second wireless electronic device, comprising: photographing a user of the second electronic device within the perceptual proximity of the first electronic device using the first electronic device; identifying a user of the second electronic device in the photograph; and sending a message from the first electronic device viewable in the second electronic device based on the second electronic device's matching at least one of the photograph of the user of the second electronic device and the physical location of the user of the second electronic device.

Example 25

The method of sending a message of example 24, further comprising estimating at least one of a direction and distance to the photographed user of the second electronic device, and further using at least one of the estimated direction and distance data to determine the physical location of the user of the second electronic device.

Example 26

The method of sending a message of example 25, wherein estimating a direction to the photographed user of the second electronic device comprises using a flux gate compass.

Example 27

The method of sending a message of example 26, wherein estimating a direction to the photographed user of the second electronic device comprises using the flux gate compass in combination with the image of the user of the second electronic device in the photograph.

Example 28

The method of sending a message of example 25, wherein estimating a distance to the photographed user of the second electronic device comprises using at least one of ultrasonic, laser, infrared, and optical ranging.

Example 29

The method of sending a message of example 24, wherein the user identifies the user of the second electronic device in the photograph using at least one of a touchscreen, cursor controls, a joystick, a keypad, and a switch.

Example 30

The method of sending a message of example 24, wherein the physical location of the user of the second device is determined via a vector indicating the direction from the first electronic device to the second electronic device.

Example 31

The method of sending a message of example 30, wherein at least one of a server and the second electronic device determine whether the second electronic device lies within the vector relative to the first electronic device.

Example 32

The method of sending a message of example 30, wherein a server determines whether the second electronic device lies within the vector relative to the first electronic device based on the vector data and relative position data of one or more electronic devices within the first electronic device's perceptual proximity.

Example 33

The method of sending a message of example 32, wherein the relative position data of one or more electronic devices within the first electronic device's perceptual proximity is determined via a Global Positioning System (GPS).

Example 34

The method of sending a message of example 30, wherein at least one of the first and second wireless electronic devices determines whether the second electronic device lies along the vector relative to the first electronic device.

Example 35

A method of sending a message from a first wireless electronic device to a second wireless electronic device, comprising: identifying a distinguishing characteristic of a user of a second wireless electronic device; receiving a device identifier of the second wireless electronic device; and sending a message from the first electronic device viewable in the second electronic device based on the second electronic device's device identifier and matching the distinguishing characteristic identified in the first electronic device.

Example 36

The method of sending a message of example 35, further comprising sending a request for device identifiers from the first wireless electronic device to other wireless electronic devices within the first wireless electronic device's perceptual proximity.

Example 37

The method of sending a message of example 35, wherein the received device identifier of the second wireless device is a broadcast device identifier.

Example 38

The method of sending a message of example 35, wherein the received device identifier of the second wireless device is addressed to the first wireless electronic device.

Example 39

The method of sending a message of example 35, further comprising periodically broadcasting a device identifier from at least one of the first and second wireless electronic devices to other wireless electronic devices within the broadcaster's perceptual proximity.

Example 40

The method of sending a message of example 35, wherein the device identifier is a radio frequency identification (RFID) identifier.

Example 41

The method of sending a message of example 35, wherein the distinguishing characteristic is a voice sample.

Example 42

The method of sending a message of example 35, wherein the distinguishing characteristic is a physical characteristic.

Example 43

The method of sending a message of example 42, wherein the physical characteristic is compared only to physical characteristics of users of other wireless electronic devices in the first electronic wireless device's perceptual proximity.

Example 44

The method of sending a message of example 35, wherein the distinguishing characteristic is a photograph.

Example 45

The method of sending a message of example 44, wherein the photograph is compared only to photographs of users of other wireless electronic devices in the first electronic wireless device's perceptual proximity.

Example 46

The method of sending a message of example 45, wherein the second electronic wireless device is within the first wireless electronic device's perceptual proximity.

Example 47

The method of sending a message of example 46, wherein perceptual proximity is determined based on receipt of a signal in one of the first and second wireless electronic devices sent only to other wireless devices; the signal strength limiting receipt to other wireless devices within the signal sender's perceptual proximity.

Example 48

The method of sending a message of example 46, wherein perceptual proximity is determined based on Global Positioning System (GPS) coordinates.

Example 49

The method of sending a message of example 46, further comprising reporting to a server the devices within the perceptual proximity of a wireless electronic device.

Example 50

A method of sending a message from a first wireless electronic device to a second wireless electronic device, comprising: identifying a distinguishing characteristic of a user of a second wireless electronic device; determining one or more wireless electronic devices within the first wireless electronic device's perceptual proximity; sending information relating to the identified distinguishing characteristic and the one or more wireless devices within the first wireless device's perceptual proximity to a server; and sending a message to the server to be delivered to the second electronic wireless device upon identification in the server of the second electronic wireless device based on the sent information relating to the identified distinguishing characteristic and the one or more wireless devices within the first wireless device's perceptual proximity to a server, and further based on a database of distinguishing characteristic data of wireless device users.

Example 51

The method of sending a message of example 50, wherein the distinguishing characteristic is a voice sample.

Example 52

The method of sending a message of example 50, wherein the distinguishing characteristic is a physical characteristic.

Example 53

The method of sending a message of example 50, wherein the distinguishing characteristic is a photograph.

Example 54

The method of sending a message of example 50, wherein the sent distinguishing characteristic information is compared only to distinguishing characteristic information of users of other wireless electronic devices in the first electronic wireless device's perceptual proximity from the database.

Example 55

The method of sending a message of example 50, wherein the distinguishing characteristic is physical position.

Example 56

The method of sending a message of example 55, wherein physical position comprises an absolute position comprising a Global Positioning System (GPS) position or other absolute position data.

Example 57

The method of sending a message of example 55, wherein the physical position comprises a vector.

Example 58

A method of sending a message from a first wireless electronic device to a second wireless electronic device, comprising: identifying a distinguishing characteristic of a user of a second wireless electronic device; determining one or more wireless electronic devices within the first wireless electronic device's perceptual proximity; sending information relating to the identified distinguishing characteristic and the one or more wireless devices within the first wireless device's perceptual proximity to a server; and sending a message to the server to be delivered to the second electronic wireless device upon identification in the server of the second electronic wireless device based on the sent information relating to the identified distinguishing characteristic and the one or more wireless devices within the first wireless device's perceptual proximity to a server, and further based on a comparison of the distinguishing characteristic data to distinguishing characteristic data submitted by other wireless electronic devices within the first wireless electronic device's perceptual proximity.

Example 59

The method of sending a message of example 58, wherein the distinguishing characteristic data submitted by other electronic wireless devices comprises data submitted directly from the other wireless electronic devices to the server.

Example 60

The method of sending a message of example 58, wherein the first wireless device's perceptual proximity is limited by an estimated distance from the first wireless electronic device to the second wireless electronic device.

Example 61

The method of sending a message of example 58, wherein the first wireless device's perceptual proximity is limited by an estimated direction from the first wireless electronic device to the second wireless electronic device.

Example 62

A method of forwarding a message in a server, comprising: receiving a message from a first wireless electronic device; receiving information identifying other wireless devices within the first wireless device's perceptual proximity; receiving a distinguishing characteristic identifying an intended message recipient, the intended recipient comprising a user of a second wireless electronic device within the first wireless device's perceptual proximity; determining based on the distinguishing characteristic the second wireless electronic device's identity; and forwarding the received message to the identified second wireless electronic device.

Example 63

The method of forwarding a message in a server of example 62, wherein the message received from the first wireless device is a conditional message viewable in the second wireless electronic device only upon an expression of interest in the second wireless electronic device in communicating with the first wireless electronic device.

Example 64

The method of forwarding a message in a server of example 62, wherein the information identifying other wireless devices within the first wireless device's perceptual proximity comprises physical position data received from the wireless devices.

Example 65

The method of forwarding a message in a server of example 62, wherein the distinguishing characteristic is a voice sample.

Example 66

The method of forwarding a message in a server of example 62, wherein the distinguishing characteristic is a physical characteristic.

Example 67

The method of forwarding a message in a server of example 62, wherein the distinguishing characteristic is a photograph.

Example 68

The method of forwarding a message in a server of example 62, wherein determining based on the distinguishing characteristic comprises comparing the distinguishing characteristic data to distinguishing characteristic data for wireless electronic device users stored in a database.

Example 69

The method of forwarding a message in a server of example 68, wherein the sent distinguishing characteristic information is compared only to distinguishing characteristic information of users of other wireless electronic devices in the first electronic wireless device's perceptual proximity from the database.

Example 70

The method of forwarding a message in a server of example 62, wherein the distinguishing characteristic is physical position.

Example 71

The method of forwarding a message in a server of example 62, wherein the first wireless device's perceptual proximity is limited by an estimated distance from the first wireless electronic device to the second wireless electronic device.

Example 72

The method of forwarding a message in a server of example 62, wherein the first wireless device's perceptual proximity is limited by an estimated direction from the first wireless electronic device to the second wireless electronic device.

Example 73

A method of sending a message from a first wireless electronic device to a second wireless electronic device, comprising: receiving in the first wireless electronic device images of a plurality of wireless device users having wireless electronic devices in the first wireless device's perceptual proximity; displaying the received images of a plurality of wireless device users arranged to represent the physical relative positions of the plurality of wireless electronic devices; receiving in the first wireless electronic device a user selection of a second electronic wireless device from among the wireless electronic devices represented by the displayed images.

Example 74

The method of sending a message of example 73, further comprising sending a message from the first electronic device viewable in the second electronic device selected by the user.

Example 75

The method of sending a message of example 73, wherein the message comprises a conditional message visible in the second wireless electronic device only upon an expression of interest in the second wireless electronic device in communicating with the first electronic device.

Example 76

The method of sending a message of example 73, wherein the first wireless electronic device receives the images of a plurality of wireless device users from the plurality of other wireless electronic devices.

Example 77

The method of sending a message of example 73, wherein the first wireless electronic device receives the images of a plurality of wireless device users from a server.

Example 78

The method of sending a message of example 73, wherein receiving a user selection of a second electronic wireless device comprises receiving a touchscreen actuation in the region of a displayed user image.

Example 79

The method of sending a message of example 73, wherein receiving a user selection comprises receiving user input identifying one of the displayed images via at least one of a keypad, a button, and a switch.

Other Examples, Set 2

Example 1

A method comprising: performing a perceptual addressing operation to determine a communication address for a first person based upon an observable distinguishing characteristic of the first person, wherein the perceptual addressing operation is initiated by a second person; and performing a discreet messaging operation to enable viewing by the second person directed to the second person and initiated from the communication address, the initiation having occurred prior to the perceptual addressing operation being performed, wherein viewing of the communication by the second person was disabled prior to performing the perceptual addressing operation.

Example 2

The method of example 1 wherein the communication from the communication address was transmitted to either an intermediate location or to a communication terminal of the second person.

Example 3

The method of example 1 wherein the communication comprises contact information of the first person.

Example 4

The method of example 1 further comprises performing a second perceptual addressing operation to determine a communication address for the second person based upon an observable distinguishing characteristic of the second person, wherein the second perceptual addressing operation is initiated by the first person prior to transmitting the communication.

Example 5

The method of example 1 wherein the perceptual addressing operation and the discreet messaging operation are both performed by an intermediate processing system.

Example 6

The method of example 1 wherein the perceptual addressing operation is performed by an intermediate processing system in response to data provided by the second person.

Example 7

The method of example 1 wherein a notification is provided to the second person indicating that the communication was transmitted, wherein the notification does not indicate an identity of the first person or enable viewing of the communication.

Example 8

The method of example 7 wherein the data provided by the second person is obtained using a portable electronic device capable of capturing at least one of an image, a voice recording, an alpha numeric string, a relative position of the first person to the second person, the communication address of the first person, or a device identification of a device.

Example 9

The method of example 1 wherein performing the discreet messaging operation comprises transmitting a communication to an intermediate processing system.

Example 10

The method of example 1 wherein the observable distinguishing characteristic of the first person comprises a biometric characteristic of the first person.

Example 11

The method of example 10 wherein the biometric characteristic is either a facial image or voice of the first person.

Example 12

The method of example 1 wherein performing the perceptual addressing operation to determine the communication address for the first person comprises: presenting a representation of an observable distinguishing characteristic of the first person associated with a device in proximity to the second person; and determining the communication address of the first person associated with the device in proximity to the second person, wherein the first person is selected in response to input from the second person based upon the representation of the observable distinguishing characteristic of the first person associated with the device in proximity to the second person.

Example 13

The method of example 12 wherein determining the device identification for the device in proximity to the second person comprises determining a device identification for a plurality of devices in proximity to the second person.

Example 14

The method of example 13 wherein presenting the representation of the observable distinguishing characteristic of the first person associated with the device in proximity to the second person comprises presenting a representation of an observable distinguishing characteristic of a plurality of first persons associated with the plurality of devices in proximity to the second person.

Example 15

The method of example 14 wherein determining the communication address of the first person associated with the device in proximity to the second person comprises determining the communication address of one first person associated with a selected one of the plurality of devices in proximity to the second person, wherein the selected one of the plurality of devices in proximity to the second person is selected in response to input from the second person based upon the representations of the observable distinguishing characteristic of the plurality of first persons associated with the plurality of devices in proximity to the second person.

Example 16

The method of example 15 wherein the representation of the distinguishing characteristic comprises either an image, voice or position of the associated first persons, and wherein the selected one of the plurality of devices in proximity to a second person is selected in response to the second person selecting the first person based upon the image, voice or position of the first person.

Example 17

The method of example 12 wherein the representation of the distinguishing characteristic of the first person associated with the device in proximity to a second person comprises an image of the associated first persons.

Example 18

The method of example 12 wherein determining the device identification in proximity to a second person comprises: requesting the device identification from the device in proximity to a second person; and receiving a response from the device including an associated device identification.

Example 19

The method of example 18 wherein transmitting the request is executed by a device operated by the second person.

Example 20

The method of example 18 wherein requesting the device identification comprises polling radio frequency identification devices in proximity to the second person.

Example 21

The method of example 12 wherein the device identification for the device in proximity to the second person is determined by requesting the device identification from the device, and wherein the observable distinguishing characteristic of the first person associated with the device in proximity to the second person is provided by the device.

Example 22

The methods of examples 18 and 21 wherein requesting the device identification is performed as a broadcast to all devices in proximity to the second person.

Example 23

The method of example 12 wherein determining the device identification for the devices in proximity to the second person is performed by a remote processing system.

Example 24

The method of example 23 wherein the remote processing system comprises a communication system having a processor.

Example 25

The method of example 23 wherein the remote processing system maintains a log of device locations of a plurality of devices based upon data provided by each of the plurality of devices.

Example 26

The method of example 25 wherein the remote processing system is a local wireless network.

Example 27

The method of example 12 wherein determining the device identification for the device in proximity to a second person comprises receiving device identification data from a plurality of devices in proximity to the second person.

Example 28

The method of example 27 wherein each of a plurality of devices in proximity to the second person periodically broadcasts the device identification data.

Example 29

The method of example 12 wherein presenting the representation of the observable distinguishing characteristic of the first person associated with the device in proximity to the second person is performed in response to a request from the second person.

Example 30

The method of example 1 further comprises processing a first level of interest indication provided by the second person, wherein the first level of interest indication represents an interest level of the second person regarding the first person.

Example 31

The method of example 4 further comprises processing a second level of interest indication provided by the first person, wherein the second level of interest indication represents an interest level of the first person regarding the second person.

Example 32

The method of example 4 further comprises: processing a first level of interest indication provided by the second person, wherein the first level of interest indication represents an interest level of the second person regarding the first person; processing a second level of interest indication provided by the first person, wherein the second level of interest indication represents an interest level of the first person regarding the second person; and providing a notification to the first and second persons indicating either the first or second level of interest indication based upon a relative level of the first and second level of interest indications.

Example 33

A method comprising: receiving input from a first person indicating either an observable distinguishing factor of a second person that is in physical proximity to the first person that results in the determination of a communication address associated with the second person, or indicating the device identification or communication address associated with the second person determined by the observable distinguishing factor; comparing a list of social contacts for the first person to a list of social contacts for the second person; and providing contact information of the first person to the second person including an indication of any common social contact identified in both the list of contacts for the first and second persons.

Example 34

The method of example 33 wherein the list of social contacts for the first person and the list of social contacts for the second person are stored in respective communication devices of the first and second persons.

Example 35

The method of examples 33 and 34 wherein comparing is performed by a processing system remote from the first and second persons.

Example 36

The method of examples 33 and 34 wherein comparing is performed by a communication device of either the first or second person.

Example 37

The method of example 33 wherein the list of social contacts for the first person and the list of social contacts for the second person is maintained in a common database of a processing system.

Example 38

The method of examples 33 and 37 wherein the contact information of the first person is provided to the second person after both the first and second persons have indicated an interest in each other.

Example 39

The method of example 37 wherein the contact information of the first person is provided to the second person after both the first and second persons have indicated an interest in each other via the processing system.

Example 40

The methods of example 38 and 39 further comprising providing contact information of the second person to the first person if a common social contact is identified in both the list of contacts for the first and second persons.

Example 41

The method of example 33 further comprises notifying the second person of the identified common social contact.

Example 42

A method comprising: receiving input from a first person indicating either an observable distinguishing factor of a second person that is in physical proximity to the first person that results in the determination of a communication address associated with the second person or the device identification or communication address associated with the second person determined by the observable distinguishing factor; maintaining a database of people with a corresponding list of friends, family, and acquaintances; building a social network model for each of the people; determining a social link relationships between the first and second persons based upon the social network models; and providing social link relationship data to the first and second persons.

Example 43

A method comprising: receiving input from both a first person and a second person indicating an mutual interest in each other; maintaining a database of people with a corresponding list of friends, family, and acquaintances; building a social network model for each person; determining a social link relationships between two users based upon the social network models in response to the input; and providing social link relationship data to the two users.

Example 44

The methods of examples 42 and 43 wherein the social link relationship data indicates multiple levels of social separation between the first and second persons.

Example 45

A method comprising: in response to a request from a user via a first device to a plurality of other devices, presenting representations of an observable distinguishing factors of a plurality of persons, wherein each of the plurality of persons are associated with one of the plurality of other devices; and determining a communication address of a selected person, wherein the selected person is determined in response to input from the user based upon the presented representations of the observable distinguishing factors of the plurality of people.

Example 46

The method of example 45 wherein the representations of the observable distinguishing factor comprises an image, voice sample or relative position of the associated person.

Example 47

The method of example 45 further comprises: requesting a device identification from the plurality of other devices; and receiving a response from the plurality of other devices including an associated device identification.

Example 48

The method of example 47 wherein the plurality of other devices are radio frequency identification devices and requesting the device identification comprises interrogating the radio frequency identification devices.

Example 49

The methods of examples 45 through 48 further comprise performing a discreet messaging operation to enable viewing by the user of a communication from the communication address of the person.

Example 50

A method comprising: receiving an input requesting an associated device identification or communication address for a plurality of devices from an intermediate processing system; presenting a representations of biometric factors of a person associated with each of the plurality of devices to a user; and determining the associated device identification or communication address of a selected device in response to input from the user based upon the presented representations of the biometric factors.

Example 51

The method of example 50 wherein the intermediate processing system maintains a log of device locations of the plurality of devices based upon data provided by each of the plurality of devices.

Example 52

The method of example 51 wherein the remote processing system is a local wireless network.

Example 53

The method of example 50 wherein the intermediate processing system comprises a local area network where the plurality of devices are registered.

Example 54

The methods of examples 50 through 53 further comprise performing a discreet messaging operation to enable viewing by the user of a communication from the selected device.

Example 55

A method comprising: in response to a request from a user via a first device to a plurality of other devices, presenting voice sample data of a plurality of persons, wherein each of the plurality of persons are associated with one of the plurality of other devices; and determining a communication address of a selected person, wherein the selected person is determined in response to input from the user based upon the presented voice sample data of the plurality of people.

Example 56

A method comprising: in response to a request from a user via a first device, presenting a representation of an observable distinguishing factor of a person associated with a second device in proximity to the user and providing either a communication address of the person associated with the second device; and in response to input from the user based upon the representation of the observable distinguishing factor of the person associated with the second device, communicating a message to the communication address of the person.

Example 57

A method comprising: processing an image comprising alpha numeric data associated with a person, wherein processing the image extracts an alpha numeric data; and determining a device identification or communication address for a device associated with the alpha numeric data.

Example 58

The method of example 57 where the alpha numeric data comprises a vehicle identification tag.

Example 59

A method comprising: processing data associated with a person, wherein the data is captured using a first device operated by a user and comprises at least one of a position indication of the person or an audio voice sample of the person; and determining a device identification or communication address for a second device associated with the person.

Example 60

The method of example 59 wherein the captured data comprises the position of the person relative to other people, the method further comprises: displaying an icon representing the position of the person on an image captured by the first device; and providing an interface to allow the user to select the displayed icon.

Example 61

The method of example 59 wherein the captured data comprises the position of the person relative to other people, the method further comprises: displaying icons representing a position of the person and the other people on an image captured by the first device; and providing an interface to allow the user to select at least one of the displayed icons.

Example 62

The method of example 59 wherein the captured data comprises the position indication of the person, the method further comprises: displaying an icon representing the position of the user on a map image displayed on the first device; and providing an interface to allow the user to selecting the displayed icon.

Example 63

The method of example 59 wherein the captured data comprises the position indication of the person, the method further comprises requesting the position from second device using the first device.

Example 64

The method of example 59 further comprises: presenting an observable distinguishing factor of a second person associated with the device identification or communication address to the user; and providing an interface to allow the user to verify that the person and second person are the same.

Example 65

A method of discreetly communicating comprising: receiving a discreet message for a first person from a second person; storing the discreet message for future viewing by the first person, wherein the discreet message is classified as disabled from viewing and no notification indicating a content of the discreet message or an indication of an identity of the second person is provided to the first person; and reclassifying the discreet message to enable viewing by the first person in response to an activity performed by the first person not associated with the discreet message.

Example 66

The method of example 65 wherein the discreet message is erased in response to an expiration time if the discreet message remains classified as disabled from viewing.

Example 67

The method of example 65 further comprises erasing the stored discreet message in response to a command from the second person.

Example 68

The method of example 65 wherein the discreet message is received via a communication address determined in response to data provided by the second person indicating a distinguishing characteristic of the first person as observed by the second person.

Example 69

The method of example 65 wherein receiving and storing the discreet message are performed by a processing system remote from the first and second persons.

Example 70

A method comprising: performing a perceptual addressing operation to identify a first person and their associated profile in response to input from a second person; and comparing at least either a profile of the first person to criteria specified by the second person, or comparing a profile of the second person to criteria specified by the first person.

Example 71

The method of example 70 further comprising storing a message from the second person, wherein the message is stored at a location.

Example 72

The method of example 71 transmitting the message from the location to the first person via the communication address.

Example 73

The method of example 71 wherein the location is either at a device operated by the second person, or at an intermediate processing system.

Example 74

A method comprising: receiving input from a first person indicating a distinguishing characteristic of a second person determined to be in physical proximity to the first person that results in the determination of a communication address associated with the second person; then presenting to the first person for the first time a communication that was both directed to the first person, and initiated by the second person before the first person indicated the observable distinguishing characteristic of the second person.

Example 75

The method of example 74 further comprising presenting to a first person multiple representations of distinguishing characteristics that are associated with people in physical proximity to the first person wherein each representation is associated with only one of the people in physical proximity to the first person.

Example 76

The method of example 75 wherein the representations of distinguishing characteristics comprise one or more of a combination of images, spatial directions, distances, spatial positions, or voice samples.

Example 77

The method of example 74 further comprising capturing an identifying characteristic of the second person

Example 78

The method of example 77 wherein the identifying characteristic is one or more of an image, direction, distance, relative position, voice sample, alphanumeric string, device identification, or communication address.

Example 79

The method of example 74 wherein the input received from the first person results in directing a communication to the second person.

Example 80

An apparatus comprising: a means for performing a perceptual addressing operation to determine a communication address for a first person based upon an observable distinguishing characteristic of the first person, wherein the perceptual addressing operation is initiated by a second person; and a means for performing a discreet messaging operation to enable viewing by the second person of a communication from the communication address, the communication having been transmitted prior to the perceptual addressing operation being performed, wherein viewing of the communication by the second person was disabled prior to performing the perceptual addressing operation.

Example 81

An apparatus comprising: a means for receiving input from a first person indicating an observable distinguishing characteristic of a second person that is in physical proximity to the first person that results in the determination of a communication address associated with the second person; a means for comparing a list of social contacts for the first person to a list of social contacts for the second person; and a means for providing contact information of the first person to the second person including an indication of any common social contact identified in both the list of contacts for the first and second persons.

Example 82

An apparatus comprising: a means for receiving input from a first person indicating an observable distinguishing characteristic of a second person that is in physical proximity to the first person that results in the determination of a communication address associated with the second person; a means for maintaining a database of people with a corresponding list of friends, family, and acquaintances; a means for building a social network model for each of the people; a means for determining a social link relationships between the first and second persons based upon the social network models; and a means for providing social link relationship data to the first and second persons.

Example 83

An apparatus comprising: a means for receiving input from both a first person and a second person indicating an mutual interest in each other; a means for maintaining a database of people with a corresponding list of friends, family, and acquaintances; a means for building a social network model for each person; a means for determining a social link relationships between two users based upon the social network models in response to the input; and a means for providing social link relationship data to the two users.

Example 84

An apparatus comprising: a means for processing an image comprising alpha numeric data associated with a person, wherein processing the image extracts an alpha numeric data; and a means for determining a device identification or communication address for a device associated with the alpha numeric data.

Example 85

An apparatus of comprising: a means for processing data associated with a person, wherein the data is captured using a first device operated by a user and comprises at least one of a position indication of the person or an audio voice sample of the person; and a means for determining a device identification or communication address for a second device associated with the person.

Example 86

An apparatus comprising: a means for receiving a discreet message for a first person from a second person; a means for storing the discreet message for future viewing by the first person, wherein the discreet message is classified as disabled from viewing and no notification indicating a content of the discreet message or an indication of an identity of the second person is provided to the first person; and a means for reclassifying the discreet message to enable viewing by the first person in response to an activity performed by the first person not associated with the discreet message.

Example 87

An apparatus comprising: a means for performing a perceptual addressing operation to identify a communication address for a first person in response to input from a second person; and a means for transmitting a notice to the first person via the communication address, wherein the notice indicates that the perceptual address operation was performed to identify a communication address of the first person, and wherein the notice does not provide a means for the first person to identify the second person.

Example 88

An apparatus comprising: a means for performing a perceptual addressing operation to identify a communication address for a first person in response to input from a second person; and a means for transmitting a message to the first person via the communication address, wherein the message is viewable by the first person only if at least a profile of the first person matches criteria specified by the second person or a profile of the second person matches criteria specified by the first person.

Example 89

An apparatus comprising: a means for performing a perceptual addressing operation to identify a first person and their associated profile in response to input from a second person; and a means for comparing at least either a profile of the first person to criteria specified by the second person, or comparing a profile of the second person to criteria specified by the first person.

Example 90

An apparatus comprising: a means for receiving input from a first person indicating an observable distinguishing characteristic of a second person that is in physical proximity to the first person that results in the determination of a communication address associated with the second person; then a means for presenting to the first person for the first time a communication that was both directed to the first person, and initiated by the second person before the first person indicated the observable distinguishing characteristic of the second person.

Example 91

A computer system comprising: means for performing a perceptual addressing operation to identify a first person and their associated profile in response to input from a second person; and means for comparing at least either a profile of the first person to criteria specified by the second person, or comparing a profile of the second person to criteria specified by the first person.

Example 92

A computer system comprising: means for performing a perceptual addressing operation to determine a communication address for a first person based upon an observable distinguishing characteristic of the first person, wherein the perceptual addressing operation is initiated by a second person; and means for performing a discreet messaging operation to enable viewing by the second person of a communication from the communication address, the communication having been transmitted prior to the perceptual addressing operation being performed, wherein viewing of the communication by the second person was disabled prior to performing the perceptual addressing operation.

Example 93

A method comprising: presenting to a user multiple representations of voice samples of people proximal to the user; receiving an input from the user selecting one of the several the voice samples; and determining an address or device identification associated with the selected voice sample.

Example 94

A method comprising: receiving position data of multiple people proximal to a user; determining the position and directional orientation of a communication device associated with the user, wherein the device is pointing at a target person; and determining a communication address or device identification associated with the target person.

Example 95

A method comprising: capturing an image representing multiple people proximal to a user; receiving position data of multiple people proximal to the user; receiving an input from the user selecting one of the multiple people represented within the image; and determining an address or device identification associated with the selected one of the representation.

Example 96

A method comprising: performing a perceptual addressing operation to identify a communication address for a first person in response to input from a second person; and transmitting a notice to the first person via the communication address, wherein the notice indicates that the perceptual address operation was performed to identify a communication address of the first person, and wherein the notice does not provide a means for the first person to identify the second person.

Example 97

A method comprising: performing a perceptual addressing operation to initiated by a second person to identify a communication address for a first person; and sending a message to the first person such that the message is viewable by the first person only if at least a profile of the first person satisfies criteria specified by the second person or a profile of the second person satisfies criteria specified by the first person.

Although specific embodiments have been illustrated and described herein, those of ordinary skill in the art will appreciate that a variety of arrangements which are calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A system for mediating communications between people that can perceive each other, the system comprising:
   a processor; and
   a memory storing instructions that, when executed, enables the system to:
   direct to a first wireless communication terminal operated by a first person information about perceivable characteristics of at least one of individual persons or objects associated with the individual persons, in such a way that enables the first person to indicate to the first communication terminal a selection of a particular person who is in close enough physical proximity to the first person to be directly perceivable to the first person at the time the first person indicates the first person's selection to the first communication terminal;
   receive from the first communication terminal information indicating a selection of a particular second person;
   direct a second wireless communication terminal operated by the second person to convey to the second person a first message as a result of the receiving from the first communication terminal the information indicating the second person, wherein the directing the second communication terminal to convey the first message is performed while the first person is in close enough physical proximity to the second person to be directly perceivable to the second person, and wherein the conveying of the first message to the second person does not enable the second person to visually identify the first person as a person who has expressed interest in communicating with the second person in particular;
   direct to the second communication terminal information about perceivable characteristics of at least one of individual persons or objects associated with the individual persons, in such a way that enables the second person to indicate to the second communication terminal a selection of a particular person who is in close enough physical proximity to the second person to be directly perceivable to the second person at the time the second person indicates the second person's selection to the second communication terminal;
   receive from the second communication terminal information indicating a selection of the first person in particular, wherein the receiving of the information from the first communication terminal indicating the selection of the second person occurs prior to the receiving of the information from the second communication terminal indicating the selection of the first person; and
   direct the second communication terminal to convey to the second person a second message, wherein the directing the second communication terminal to convey the second message is performed after the receiving of both the information from the first communication terminal indicating the selection of the second person and the information from the second communication terminal indicating the selection of the first person, wherein the directing the second communication terminal to convey the second message is performed while the first person is in close enough physical proximity to the second person to be directly perceivable to the second person, and wherein the conveying of the second message to the second person enables the second person to visually identify the first person as a person who has expressed interest in communicating with the second person.

2. The system of claim 1, further comprising:
   the first wireless communication terminal; and
   the second wireless communication terminal.

3. The system of claim 1, wherein instructions stored in the memory, when executed, further enables the system to:
   direct the first communication terminal to convey a third message to the first person after the receiving of both the information from the first communication terminal indicating the second person and the information from the second communication terminal indicating the first person, wherein the directing the first communication terminal to convey the third message to the second person is performed while the second person is in close enough physical proximity to the first person to be directly perceivable to the first person, and wherein the third message comprises at least one of a means for the first person to contact the second person or information that indicates one person in particular perceivable to the first person in the first person's physical environment, the one person being the second person.

4. The system of claim 3, wherein each of the second and third messages comprises a notification of a third level of interest that is equivalent to the lesser level of interest of a first level of interest in the second person expressed by the first person and a second level of interest in the first person expressed by the second person.

5. The system of claim 1, wherein the system is a server.

6. The system of claim 1, wherein the system is further enabled to:
compare social contacts for the first person with social contacts for the second person, wherein the second message comprises information descriptive of at least one common social contact identified in both the list of contacts for the first person and the list of contacts for the second person.

7. The system of claim 1, wherein the second message comprises information descriptive of a social link relationship between the first and second persons.

8. The system of claim 7, wherein the information descriptive of the social link relationship indicates multiple levels of social separation between the first and second persons.

9. The system of claim 7, wherein the system is further enabled to:
maintain a database of people with a corresponding list of friends, family, and acquaintances;
determine a social network model for each of the people; and
determine a social link relationships between the first and second persons based upon the social network models.

10. The system of claim 9, wherein the information descriptive of the social link relationship indicates multiple levels of social separation between the first and second persons.

11. The system of claim 1, wherein at least one of the first message or second message comprises auditory information.

12. The system of claim 1, wherein at least one of the first message or second message comprises visual information.

13. A method of mediating communications between people that can perceive each other, performed by a data processing system, the method comprising:
directing to a first wireless communication terminal operated by a first person information about perceivable characteristics of at least one of individual persons or objects associated with the individual persons, in such a way that enables the first person to indicate to the first communication terminal a selection of a particular person who is in close enough physical proximity to the first person to be directly perceivable to the first person at the time the first person indicates the first person's selection to the first communication terminal;
receiving from the first communication terminal information indicating a selection of a particular second person;
directing a second wireless communication terminal operated by the second person to convey to the second person a first message as a result of the receiving from the first communication terminal the information indicating the second person, wherein the directing the second communication terminal to convey the first message is performed while the first person is in close enough physical proximity to the second person to be directly perceivable to the second person, and wherein the conveying of the first message to the second person does not enable the second person to visually identify the first person as a person who has expressed interest in communicating with the second person in particular;
directing to the second communication terminal information about perceivable characteristics of at least one of individual persons or objects associated with the individual persons, in such a way that enables the second person to indicate to the second communication terminal a selection of a particular person who is in close enough physical proximity to the second person to be directly perceivable to the second person at the time the second person indicates the second person's selection to the second communication terminal;
receiving from the second communication terminal information indicating a selection of the first person in particular, wherein the receiving of the information from the first communication terminal indicating the selection of the second person occurs prior to the receiving of the information from the second communication terminal indicating the selection of the first person; and
directing the second communication terminal to convey to the second person a second message, wherein the directing the second communication terminal to convey the second message is performed after the receiving of both the information from the first communication terminal indicating the second person and the information from the second communication terminal indicating the first person, wherein the directing the second communication terminal to convey the second message is performed while the first person is in close enough physical proximity to the second person to be directly perceivable to the second person, and wherein the conveying of the second message to the second person enables the second person to visually identify the first person as a person who has expressed interest in communicating with the second person.

14. The method of claim 13 further comprising:
directing the first communication terminal to convey a third message to the first person after the receiving of both the information from the first communication terminal indicating the second person and the information from the second communication terminal indicating the first person, wherein the directing the first communication terminal to convey the third message to the second person is performed while the second person is in close enough physical proximity to the first person to be directly perceivable to the first person, and wherein the third message comprises at least one of a means for the first person to contact the second person or information that indicates one person in particular perceivable to the first person in the first person's physical environment, the one person being the second person.

15. The method of claim 13 further comprising:
determining that the first person is in close enough physical proximity to the second person to be directly perceivable to the second person.

16. The method of claim 13 further comprising:
determining a list comprising people that are in close enough physical proximity to the second person to be directly perceivable to the second person.

17. The method of claim 16, wherein the directing of information about perceivable characteristics to the second communication terminal comprises directing information about perceivable characteristics of people on the list.

18. The method of claim 16 further comprising:
receiving the list from the second communication terminal.

19. The method of claim 14, wherein each of the second and third messages comprises a notification of a third level of interest that is equivalent to the lesser level of interest of a first level of interest in the second person expressed by the first person and a second level of interest in the first person expressed by the second person.

20. The method of claim 13, wherein the information about perceivable characteristics that is directed to the first communication terminal comprises information about characteristics of appearance.

21. The method of claim 13, wherein the information about perceivable characteristics that is directed to the first communication terminal comprises information about characteristics of spatial position.

22. The method of claim 13, wherein the information about perceivable characteristics that is directed to the first communication terminal comprises information about characteristics of voice.

23. The method of claim 13, wherein the data processing system is a server.

24. The method of claim 13, further comprising:
comparing social contacts for the first person with social contacts for the second person, wherein the second message comprises information descriptive of at least one common social contact identified in both the list of contacts for the first person and the list of contacts for the second person.

25. The method of claim 13, wherein the second message comprises information descriptive of a social link relationship between the first and second persons.

26. The method of claim 25, wherein the information descriptive of the social link relationship indicates multiple levels of social separation between the first and second persons.

27. The method of claim 25, further comprising:
maintaining a database of people with a corresponding list of friends, family, and acquaintances;
determining a social network model for each of the people;
determining a social link relationships between the first and second persons based upon the social network models.

28. The method of claim 27, wherein the information descriptive of the social link relationship indicates multiple levels of social separation between the first and second persons.

29. The method of claim 13, wherein at least one of the first message or second message comprises auditory information.

30. The method of claim 13, wherein at least one of the first message or second message comprises visual information.

* * * * *